United States Patent
Kanematsu et al.

[11] Patent Number: 5,975,678
[45] Date of Patent: *Nov. 2, 1999

[54] INK JET RECORDING APPARATUS AND METHOD USING PLURAL TYPES OF INK

[75] Inventors: Daigoro Kanematsu; Naoji Otsuka, both of Yokohama; Kazuhiro Nakata, Inagi; Kentaro Yano, Yokohama; Takashi Kasahara, Tokyo; Kiichiro Takahashi; Osamu Iwasaki, both of Kawasaki, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/546,966

[22] Filed: Oct. 23, 1995

[30] Foreign Application Priority Data

Oct. 27, 1994 [JP] Japan ................................. 6-263694
Oct. 27, 1994 [JP] Japan ................................. 6-263695

[51] Int. Cl.⁶ .............................. B41J 2/21; B41J 29/38; G06F 15/00; G06K 1/00
[52] U.S. Cl. ................................. 347/43; 347/5; 395/109
[58] Field of Search ................................ 347/43, 15, 14, 347/5; 358/529; 395/109

[56] References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,608,577 | 8/1986 | Hori | 347/66 |
| 4,723,129 | 2/1988 | Endo et al. | 347/56 |
| 4,740,796 | 4/1988 | Endo et al. | 347/56 |
| 5,168,552 | 12/1992 | Vaughn et al. | 395/109 |
| 5,241,396 | 8/1993 | Harrington | 358/296 |
| 5,475,800 | 12/1995 | Vaughn et al. | 395/109 |

FOREIGN PATENT DOCUMENTS

| | | |
|---|---|---|
| 0480637 | 4/1992 | European Pat. Off. . |
| 0540173 | 5/1993 | European Pat. Off. . |
| 0590854 | 4/1994 | European Pat. Off. . |
| 54-056847 | 5/1979 | Japan . |
| 59-123670 | 7/1984 | Japan . |
| 59-138461 | 8/1984 | Japan . |
| 60-071260 | 4/1985 | Japan . |

*Primary Examiner*—N. Le
*Assistant Examiner*—Thinh Nguyen
*Attorney, Agent, or Firm*—Fitzpatrick, Cella, Harper & Scinto

[57] ABSTRACT

An image is recorded on a recording medium by recording dots of a black ink and a color ink discharged onto the recording medium from a recording head. A boundary proximity-degree detecting circuit detects the degree of positional proximity, i.e., closeness, between the recording dots of the black ink and the recording dots of the color ink at the boundary between these dots. A dot substituting circuit performs, in accordance with the detected degree of positional proximity, substitution of the black pixels with recording dots of a color ink at the boundary. Thus, pixels of the image to be recorded are replaced with recording dots of a color ink by an extent which is determined based on the degree of positional proximity between the pixels of the different colors. A sharp black image can be obtained with minimized color mixing at the boundary between the black image region and the color region, regardless of the degree of positional proximity between these regions.

75 Claims, 45 Drawing Sheets

FIG. 3

| | | L | K | J | K | L | | |
|---|---|---|---|---|---|---|---|---|
| | I | H | F | E | F | H | I | |
| L | H | G | D | C | D | G | H | L |
| K | F | D | B | A | B | D | F | K |
| J | E | C | A | ● | A | C | E | J |
| K | F | D | B | A | B | D | F | K |
| L | H | G | D | C | D | G | H | L |
| | I | H | F | E | F | H | I | |
| | | L | K | J | K | L | | |

COEFFICIENT OF
PROXIMITY DEGREE

A : 0.125
B : 0.089
C : 0.063
D : 0.056
E : 0.041
F : 0.038
G : 0.044
H : 0.035
I : 0.032
J : 0.029
K : 0.026
L : 0.023

MAX : 3.116

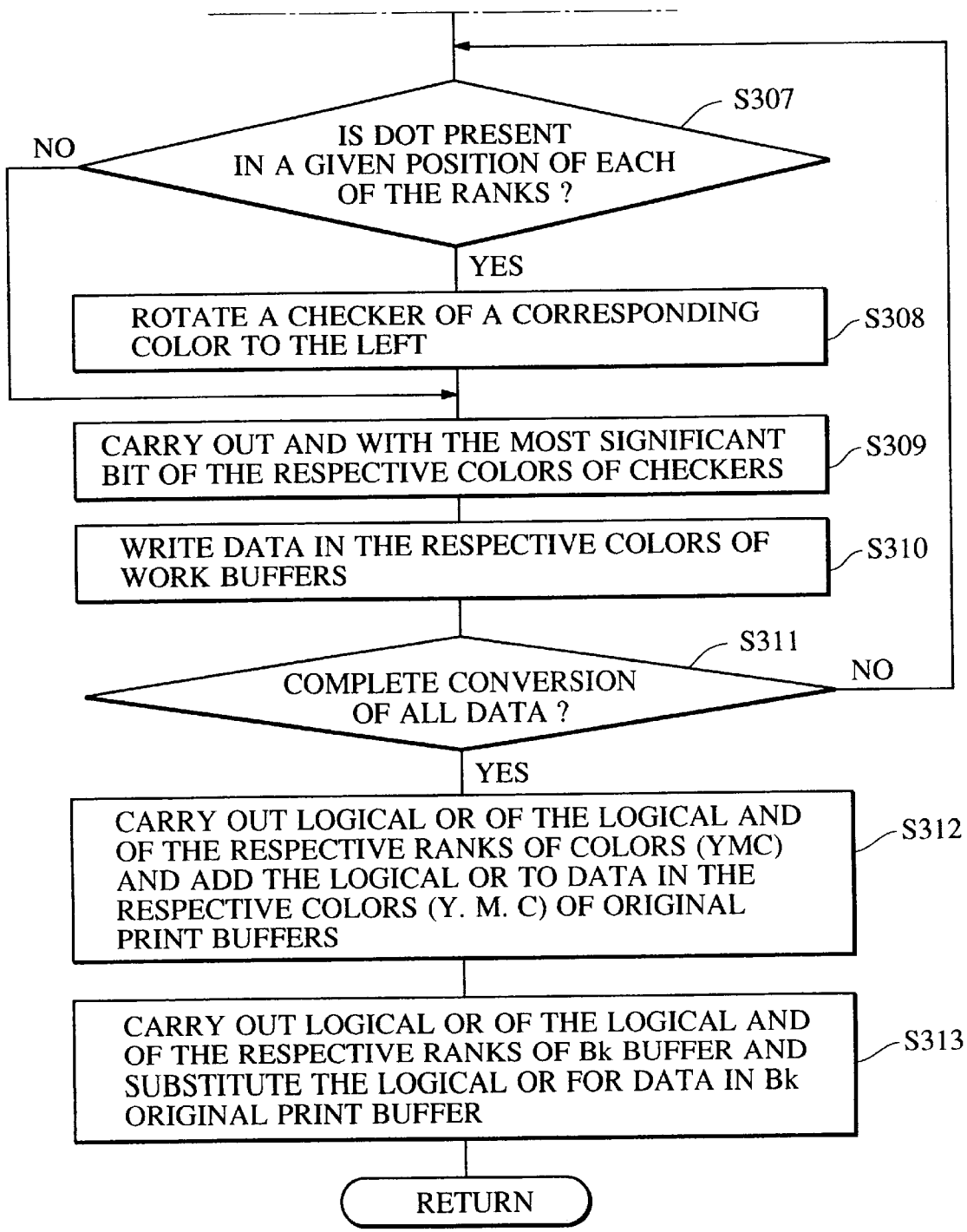

FIG. 15(a)
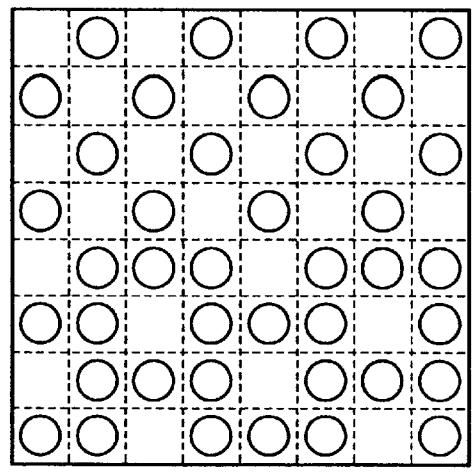
FIG. 15(b)
PCBk CONVERSION MASK
| Bk | C | Bk | C |
|----|---|----|---|
| C | Bk | C | Bk |
| Bk | C | Bk | C |
| C | Bk | C | Bk |
◯ : Cyan
⊛ : Bk
FIG. 15(c)
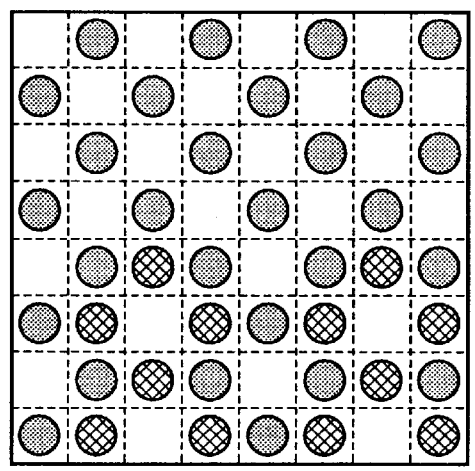
FIG. 15(d)
ROTATE
| Bk | C | Bk | C |
FIG. 15(e)
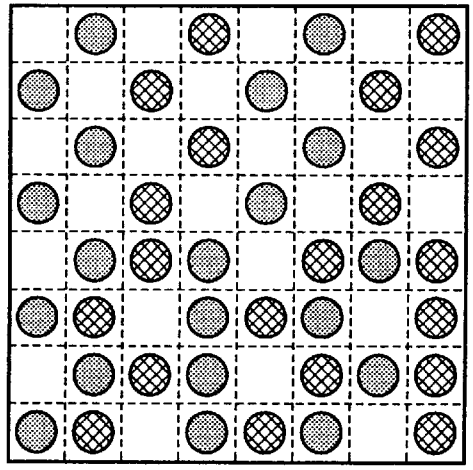

FIG. 16

| FIG. 16A |
| FIG. 16B |

FIG. 16B

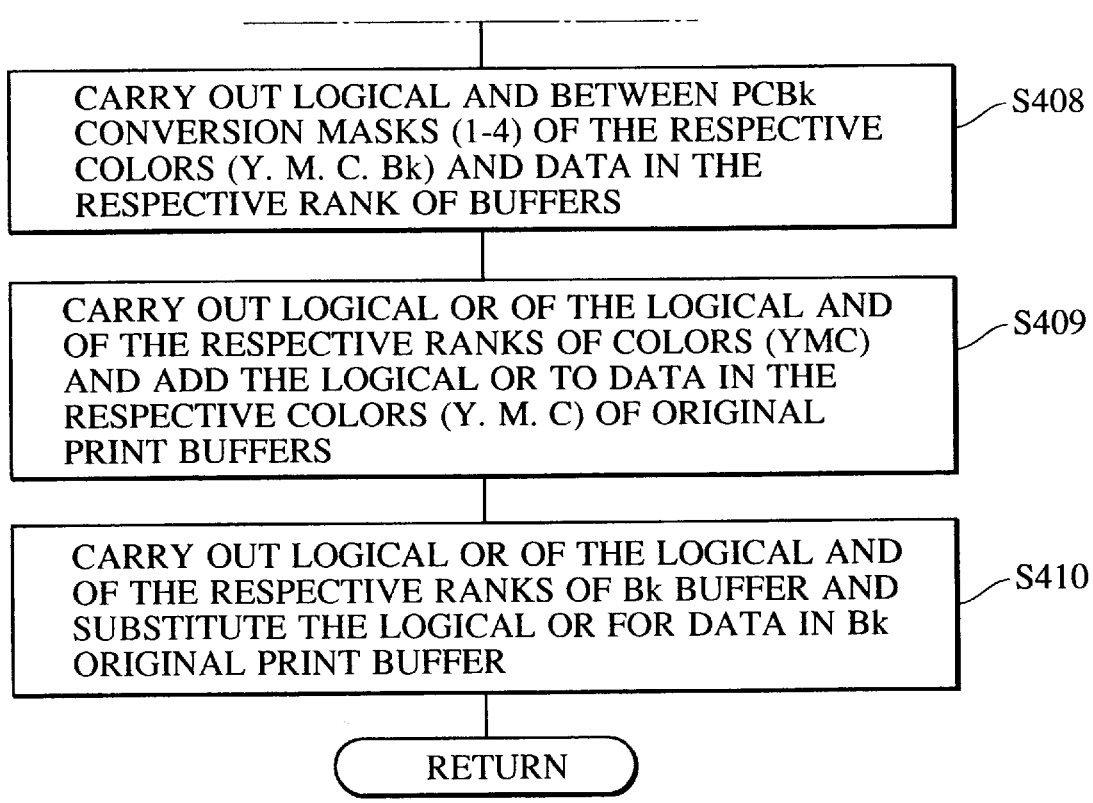

S408 — CARRY OUT LOGICAL AND BETWEEN PCBk CONVERSION MASKS (1-4) OF THE RESPECTIVE COLORS (Y. M. C. Bk) AND DATA IN THE RESPECTIVE RANK OF BUFFERS

S409 — CARRY OUT LOGICAL OR OF THE LOGICAL AND OF THE RESPECTIVE RANKS OF COLORS (YMC) AND ADD THE LOGICAL OR TO DATA IN THE RESPECTIVE COLORS (Y. M. C) OF ORIGINAL PRINT BUFFERS

S410 — CARRY OUT LOGICAL OR OF THE LOGICAL AND OF THE RESPECTIVE RANKS OF Bk BUFFER AND SUBSTITUTE THE LOGICAL OR FOR DATA IN Bk ORIGINAL PRINT BUFFER

RETURN

COLOR PALE ←————→ DARK
Bk DARK ←————→ PALE

FIG. 19
| FIG. 19A |
|---|
| FIG. 19B |
| FIG. 19C |
FIG. 19A
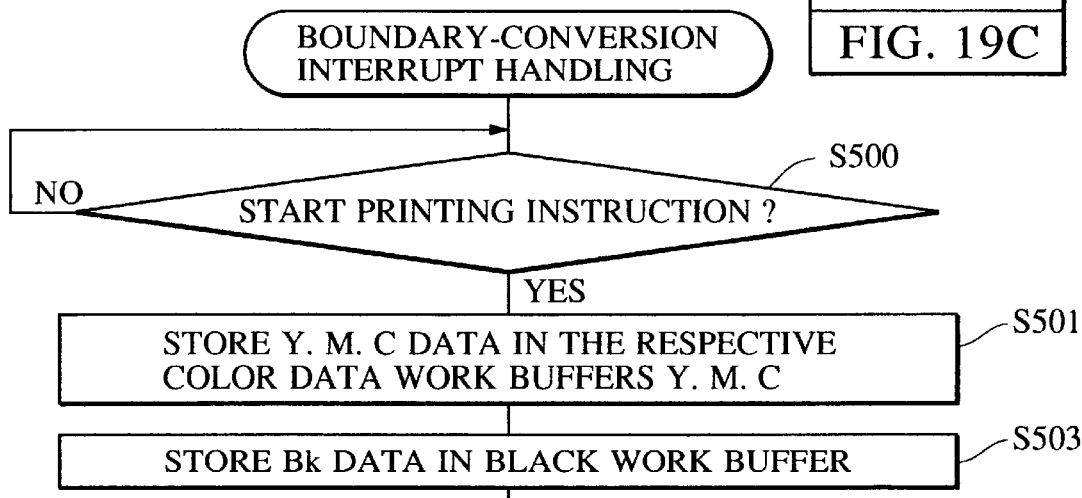
FIG. 19C
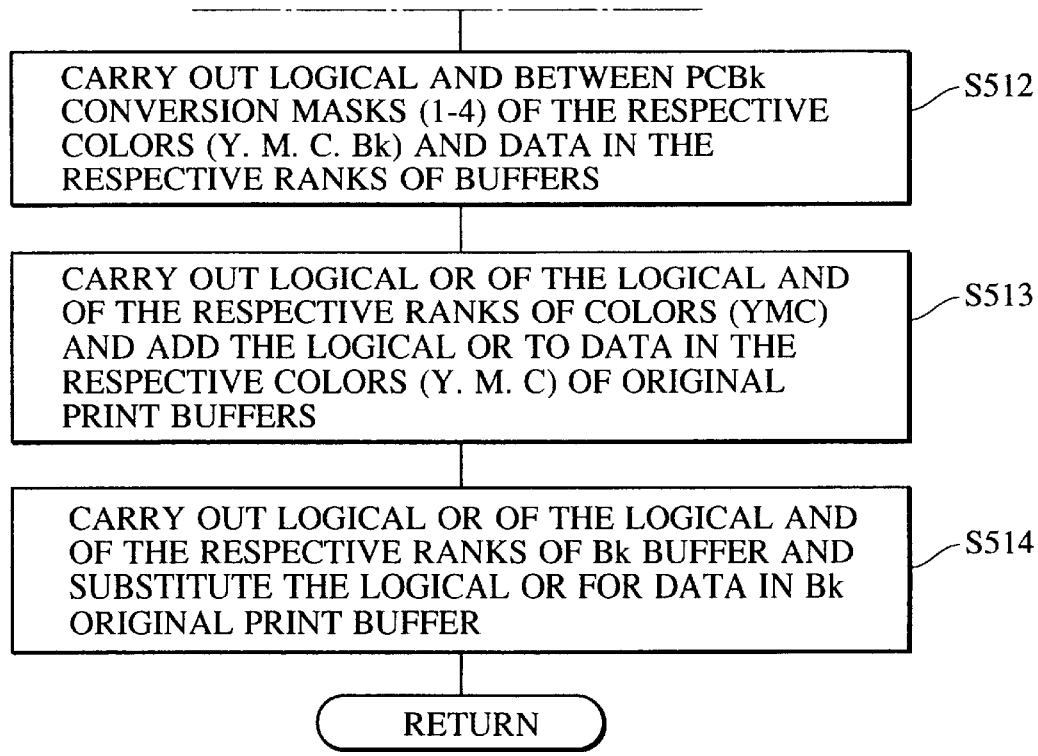

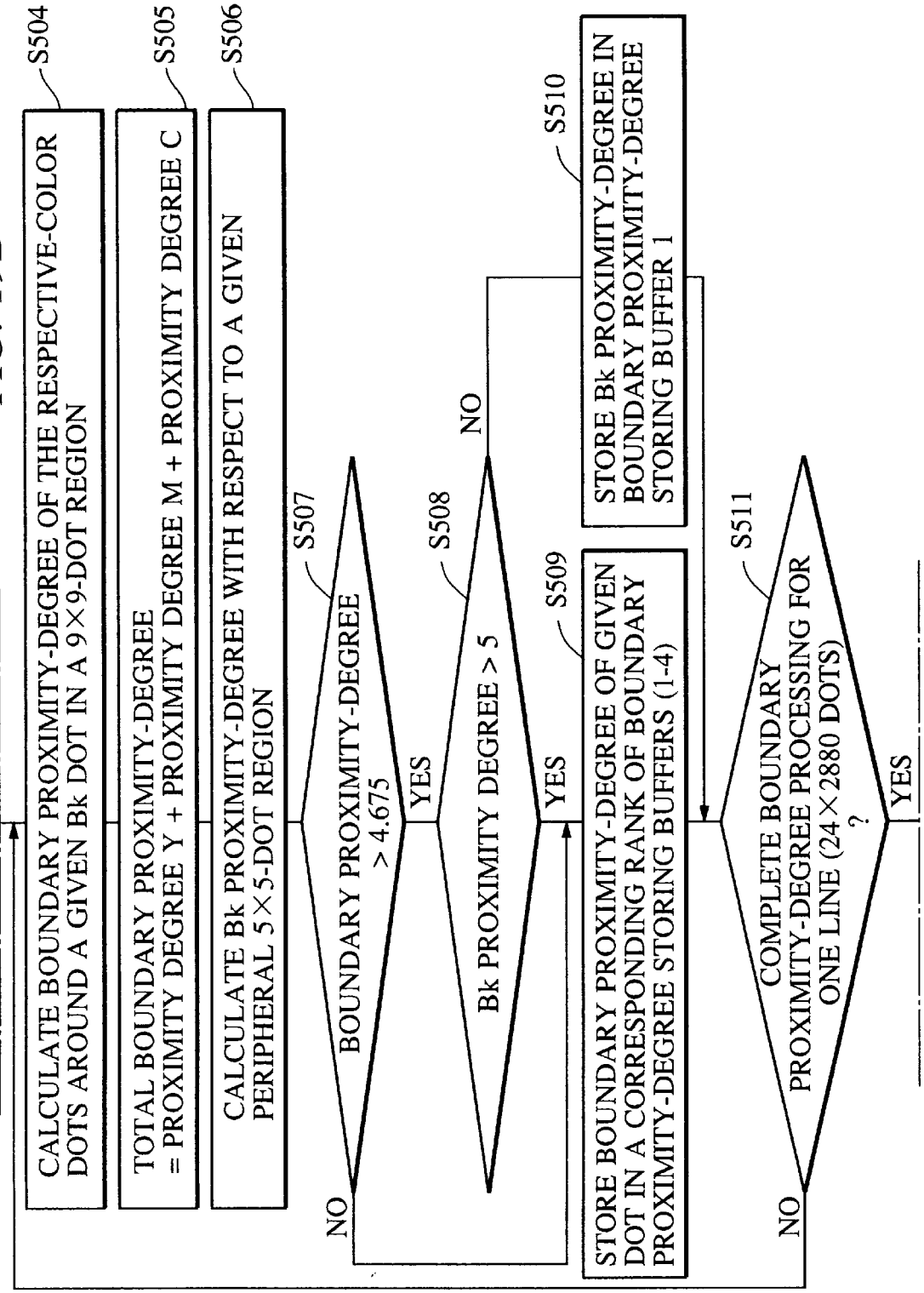

| 1 | 0 | 1 | 0 | 1 | 1 | 0 | 1 | 0 | 1 | 1 | 0 | 1 | 0 | 1 | 1 | 0 | 1 | 0 | 1 | 1 | 0 | 1 | 0 | 1 | 1 | 0 |
|---|---|---|---|---|---|---|---|---|---|---|---|---|---|---|---|---|---|---|---|---|---|---|---|---|---|---|
| 0 | 1 | 0 | 1 | 0 | 0 | 1 | 0 | 1 | 0 | 0 | 1 | 0 | 1 | 0 | 0 | 1 | 0 | 1 | 0 | 0 | 1 | 0 | 1 | 0 | 0 | 1 |
| 1 | 0 | 1 | 0 | 1 | 1 | 0 | 1 | 0 | 1 | 1 | 0 | 1 | 0 | 1 | 1 | 0 | 1 | 0 | 1 | 1 | 0 | 1 | 0 | 1 | 1 | 0 |
| 0 | 1 | 0 | 1 | 0 | 0 | 1 | 0 | 1 | 0 | 0 | 1 | 0 | 1 | 0 | 0 | 1 | 0 | 1 | 0 | 0 | 1 | 0 | 1 | 0 | 0 | 1 |
| 1 | 0 | 1 | 0 | 1 | 1 | 0 | 1 | 0 | 1 | 1 | 0 | 1 | 0 | 1 | 1 | 0 | 1 | 0 | 1 | 1 | 0 | 1 | 0 | 1 | 1 | 0 |
| 0 | 1 | 0 | 1 | 0 | 0 | 1 | 0 | 1 | 0 | 0 | 1 | 0 | 1 | 0 | 0 | 1 | 0 | 1 | 0 | 0 | 1 | 0 | 1 | 0 | 0 | 1 |
| 1 | 0 | 1 | 0 | 1 | 1 | 0 | 1 | 0 | 1 | 1 | 0 | 1 | 0 | 1 | 1 | 0 | 1 | 0 | 1 | 1 | 0 | 1 | 0 | 1 | 1 | 0 |
| 0 | 1 | 0 | 1 | 0 | 0 | 1 | 0 | 1 | 0 | 0 | 1 | 0 | 1 | 0 | 0 | 1 | 0 | 1 | 0 | 0 | 1 | 0 | 1 | 0 | 0 | 1 |
| 1 | 0 | 1 | 0 | 1 | 1 | 0 | 1 | 0 | 1 | 1 | 0 | 1 | 0 | 1 | 1 | 0 | 1 | 0 | 1 | 1 | 0 | 1 | 0 | 1 | 1 | 0 |

| 1 | 0 | 1 | 0 | 1 |
|---|---|---|---|---|
| 0 | 1 | 0 | 1 | 0 |

| 1|0|1|0|1|1|0|1|0|1|1|0|1|0|1|1|0|1|0|1|1|0|1|0|1|1|0|1|0|1|1|0 |
|---|

(binary grid pattern)

| 1 | 0 | 1 | 0 | 1 |
|---|---|---|---|---|
| 0 | 1 | 0 | 1 | 0 |

| 1 | 0 | 0 | 0 | 1 | 1 | 0 | 0 | 0 | 1 | 1 | 0 | 0 | 0 | 1 | 1 | 0 | 0 | 0 | 1 | 1 | 0 | 0 | 0 | 1 | 1 | 0 | 0 | 0 | 1 | 1 | 0 |
|---|---|---|---|---|---|---|---|---|---|---|---|---|---|---|---|---|---|---|---|---|---|---|---|---|---|---|---|---|---|---|---|
| 0 | 0 | 1 | 0 | 0 | 0 | 0 | 1 | 0 | 0 | 0 | 0 | 1 | 0 | 0 | 0 | 0 | 1 | 0 | 0 | 0 | 0 | 1 | 0 | 0 | 0 | 0 | 1 | 0 | 0 | 0 | 0 |
| 1 | 0 | 0 | 0 | 1 | 1 | 0 | 0 | 0 | 1 | 1 | 0 | 0 | 0 | 1 | 1 | 0 | 0 | 0 | 1 | 1 | 0 | 0 | 0 | 1 | 1 | 0 | 0 | 0 | 1 | 1 | 0 |
| 0 | 0 | 1 | 0 | 0 | 0 | 0 | 1 | 0 | 0 | 0 | 0 | 1 | 0 | 0 | 0 | 0 | 1 | 0 | 0 | 0 | 0 | 1 | 0 | 0 | 0 | 0 | 1 | 0 | 0 | 0 | 0 |
| 1 | 0 | 0 | 0 | 1 | 1 | 0 | 0 | 0 | 1 | 1 | 0 | 0 | 0 | 1 | 1 | 0 | 0 | 0 | 1 | 1 | 0 | 0 | 0 | 1 | 1 | 0 | 0 | 0 | 1 | 1 | 0 |
| 0 | 0 | 1 | 0 | 0 | 0 | 0 | 1 | 0 | 0 | 0 | 0 | 1 | 0 | 0 | 0 | 0 | 1 | 0 | 0 | 0 | 0 | 1 | 0 | 0 | 0 | 0 | 1 | 0 | 0 | 0 | 0 |
| 1 | 0 | 0 | 0 | 1 | 1 | 0 | 0 | 0 | 1 | 1 | 0 | 0 | 0 | 1 | 1 | 0 | 0 | 0 | 1 | 1 | 0 | 0 | 0 | 1 | 1 | 0 | 0 | 0 | 1 | 1 | 0 |
| 0 | 0 | 1 | 0 | 0 | 0 | 0 | 1 | 0 | 0 | 0 | 0 | 1 | 0 | 0 | 0 | 0 | 1 | 0 | 0 | 0 | 0 | 1 | 0 | 0 | 0 | 0 | 1 | 0 | 0 | 0 | 0 |
| 1 | 0 | 0 | 0 | 1 | 1 | 0 | 0 | 0 | 1 | 1 | 0 | 0 | 0 | 1 | 1 | 0 | 0 | 0 | 1 | 1 | 0 | 0 | 0 | 1 | 1 | 0 | 0 | 0 | 1 | 1 | 0 |

| 1 | 0 | 0 | 0 | 1 |
|---|---|---|---|---|
| 0 | 0 | 1 | 0 | 0 |

| 1 | 0 | 1 | 0 |
|---|---|---|---|

FIG. 32(b)

| 1 | 0 | 1 | 0 | 1 |
|---|---|---|---|---|
| 0 | 1 | 1 | 1 | 0 |

FIG. 32(c)

| 1 | 0 | 0 | 0 | 1 | 0 | 0 | 0 | 0 |
|---|---|---|---|---|---|---|---|---|
| 0 | 0 | 1 | 0 | 0 | 0 | 1 | 0 | 0 |
| 0 | 0 | 0 | 1 | 0 | 0 | 0 | 1 | 0 |
| 0 | 1 | 0 | 0 | 0 | 0 | 0 | 0 | 0 |

INK JET RECORDING APPARATUS AND METHOD USING PLURAL TYPES OF INK

BACKGROUND OF THE INVENTION

1. Field of the Invention

The present invention relates to an ink jet recording apparatus which performs recording of data by using two or more types of ink, e.g., a penetrating-type ink used as a color ink and a drying-type ink used as black ink, as well as to an ink jet recording method using such an apparatus. More particularly, the present invention is concerned with a record data processing method which improves the quality of recorded images at and around the boundary between regions of different types of ink, and also an ink jet recording apparatus and method employing such a record data processing method.

2. Description of the Related Art

In recent years, office machines such as personal computers, wordprocessors and so forth are finding spreading use. These machines are usually equipped with print-out means for printing data which are output therefrom. Nowadays, various types of print-out or recording means have been developed and used, such as wire-dot type printers, thermal transfer-type printers, ink jet recorders, and so forth. Among these recording methods or systems, the ink jet recording system is being considered most promising, since it can provide color output of high quality at low cost, while coping with current demands for inexpensive color recording which is becoming strong as a result of spreading use of DTP (Desk Top Publishing) systems.

The nature of the recording ink is one of the factors that control the quality of images recorded by ink jet recording systems. In general, recording ink is an aqueous liquid and can broadly be classified into two types according to the mechanism or principle of fixing to recording mediums.

The ink of the first type is generally referred to as "penetrating-type ink" which, by virtue of an additive such as a surfactant added thereto, exhibits improved penetration into ordinary plain paper sheets such as copying paper sheets used as a recording medium. Thanks to the improved penetration, this type of ink exhibits an extremely short fixing time, e.g., several milliseconds to one second. The term "fixing time" is used to mean the time required for the ink to be fixed to a recording medium to such an extent that it is never transferred to any member which would be brought into contact with the recording medium. The ink of the second type is generally referred to as "drying-type ink" which does not significantly penetrate into the recording medium but is fixed by being dried on the surface of the recording medium. It takes about several tens of seconds for this type of ink to be fixed.

Inks of the penetrating type, by virtue of rapid penetration, are rather free from the problem of bleeding which tends to occur when dots of different inks of different colors are formed in close proximity of each other during recording of a color image. This type of ink, however, suffers from a problem in that coloring of dots cannot be enhanced due to the fact that the dye of the ink penetrates deep into the recording medium. Another problem encountered with this type of ink is that the recorded image tends to be made obscure due to low contrast at the boundary between printed and non-printed regions.

Meanwhile, ink of the drying type tends to suffer from the above-mentioned problem of bleeding at the boundary between dots of different color inks, although it exhibits superior coloring and contrast thanks to the tendency of slow penetration and minimal spread of the dye.

Thus, two types of inks have their own merits and demerits and are used selectively according to the nature of the recording to be performed.

In general, inks of the drying type are preferably used in printing of characters partly because use of different colors of inks in close proximity of each other takes place only seldom in this kind of printing and partly because the printing of characters requires a high level of contrast. Inks of the penetrating type are preferably used in printing of such images that require prevention of bleeding rather than keeping a high level of contrast, e.g., images of pictures of natural sceneries. Thus, Bk (black) inks which are commonly used as inks for printing characters are usually of the drying type, whereas color inks such as Y (yellow), M (magenta) and C (cyan) inks are usually penetrating-type inks.

It may become necessary, according to the type of the image to be recorded, that dots of color inks of the penetrating type are formed in close proximity of dots formed of the drying-type Bk ink. No substantial bleeding takes place at the boundaries between the regions formed by the penetrating-type inks of Y, M and C colors. The problem of bleeding, however, is critical at boundaries between a region formed by a penetrating-type color ink and a drying-type Bk ink.

FIGS. 21(a) and 21(b) are enlarged views of a portion of an image in which a region formed by a drying-type Bk ink and a region formed with a penetrating-type color ink are adjoining each other at a boundary indicated at A—A. More specifically, a half-tone region on the upper side of the boundary A—A is the color image region formed by the penetrating-type color ink, whereas the solid region below the boundary A—A is the Bk image region. It is preferred that the recording is effected without bleeding as shown in FIG. 21(a), however the image regions of the Bk ink and the color ink may be close to each other. Actually, however, there is a risk that the Bk ink spreads into the color image region formed by the color ink, thus causing bleeding at the boundary, as illustrated in FIG. 21(b).

Various measures have been proposed for the purpose of overcoming the above-described problem of bleeding, such as the method disclosed in European Patent Application Nos. 540173 and 590854. It has been proposed, in the specification of Japanese Laid-Open Patent Application No. 05-270582, a method having the steps of detecting a boundary between a region recorded by a penetrating-type ink and a drying-type ink, and substituting the image portion recorded by the drying-type Bk ink at the detected boundary with the penetrating-type ink. Use of a drying-type ink and a penetrating-type ink on adjacent dots or regions causes a color mixing at the boundary between these dots or regions, irrespective of which one of these two types of ink is recorded first.

More specifically, when two adjacent image regions are to be formed with Bk ink and a color ink, respectively, a conversion is performed so as to substitute the Bk color with process black (PCBk) constituted by yellow, magenta, cyan and black colors, in the boundary zone of the Bk image region having a predetermined width, e.g., a width corresponding to four dots, thereby preventing mixing of colors at the boundary between these two adjacent regions.

FIGS. 22(a) to 22(c) show the manner in which bleeding takes place at the boundary between two adjacent regions. In each of these Figures, the halftone region above the boundary indicated by a line A—A is the color image region, while the solid region below the boundary A—A is the Bk image region.

More specifically, FIG. 22(a) indicates an original image from which the boundary is detected by suitable means. A boundary zone defined between the boundary line A—A and a line B—B is the zone to be converted. The Bk image within the above-mentioned boundary zone is subjected to an image conversion into a color ink image to be formed by another color ink, whereby an image as shown in FIG. 22(c) is obtained.

It will be seen that, even the image after the conversion as shown in FIG. 22(c) contains bleeding of the Bk ink into the boundary zone between the lines A—A and B—B. However, since the image in the boundary zone between these lines is a Bk image zone which is constituted by a PCBk formed by adding color inks, the bleeding of the Bk ink into this zone does not produce any substantial appearance of "bleeding".

The quality of the image is improved significantly by the above-described control which is conducted by suitably using two types of ink, i.e., ink of the penetrating type and ink of the drying type.

It is to be understood, however, that the PCBk image formed by combined use of different colors through the above-described conversion is inferior to a Bk image formed by pure Bk ink, in terms of brightness and hue, from a strict point of view. Nevertheless, a better image can be obtained when the Bk dots are replaced by PCBk dots when the boundary zone between a color image region and a Bk region has a high duty ratio, because in such a case heavy bleeding is caused as explained in connection with FIGS. 21(a), 21(b) and FIGS. 22(a) to 22(c).

This method, however, suffers from the following problem. Namely, the PCBk conversion, i.e., conversion into PCBk dots, is effected unconditionally on the boundary zone defining the boundary between a Bk image region and a color image region, even when the bleeding problem is so slight as not to cause any critical problem. In such a case, the PCBk conversion undesirably impairs the quality of the recorded image as compared with the original image.

The PCBk conversion includes "four pixels boldfacing" in which a region formed by a single dot is expanded by an amount corresponding to four pixels in each of left, right, upward and downward directions from the single dot. This means that the region of the single dot is expanded into a square region constituted by 9 lines and 9 columns of pixels, i.e., 81 pixels. There is a substantial difference in the degree of necessity of PCBk conversion between the case where the duty ratio is so low that only one color dot exists in the above-mentioned region of 81 pixels and the case where the duty ratio is so high as to have all the 81 pixels colored. In the known method described above, the same boldfaced image is inconveniently obtained for both cases, because the same processing is applied to both cases, regardless of the significant difference in the degree of necessity of the PCBk conversion.

FIG. 23(a) to 23(d) illustrate an example of the above-described inconvenience. In FIG. 23(a), a belt-like solid area indicated by solid black is a Bk image region, while the area which is on the upper side of the Bk image region and which contains island-like or isolated dots is a color image region. FIG. 23(b) shows a state of the dots after the boldfacing in which each color dot is expanded to cover 81 pixels around the color dot, conducted for the purpose of detecting the boundary between two image regions. The area of the 81 pixels partly overlaps the original Bk region. The boundary zone is detected as the logical product (AND) of the bold-faced color image and the original Bk image region. Thus, the overlap area is determined as the boundary zone, as shown in FIG. 23(c).

All the pixels contained in this boundary zone are subjected to conversion. In this case, since the original Bk image region is a belt-like area of 3-dot width, all the pixels in the original Bk image region are converted into PCBk dots, as shown in FIG. 23(d). In the illustrated case, almost no bleeding is caused at the boundary, because of the small duty ratio in the color image region, as will be easily imagined from FIG. 23(a). Nevertheless, PCBk conversion is performed in the same way as that conducted for the case where the duty ratio in the color image region is 100%, so as to effect the substitution with PCBk even on the dots which actually do not require such a conversion.

This problem is due to the large area of the boldfacing which includes 81 pixels around each color dot and, therefore, would be overcome to some extent by reducing the area of the boldfacing down to 9 pixels, i.e., by two dots in each of left, right, upward and downward directions. Such a small amount of boldfacing, however, does not provide sufficient anti-bleeding effect, because the bleeding may take place beyond the boundary zone. The span of two pixels is as small as 0.14 mm in current major printers having resolution of 360 DPI (dot/inch). Such a small or narrow PCBk conversion zone can never provide a satisfactory anti-bleeding effect.

When the image to be recorded includes a Bk image region against a color image region of a low duty ratio, no substantial problem is caused by PCBk conversion, because the conversion converts only a portion of the contour region of the large Bk image region.

PCBk conversion, however, produces a noticeable detrimental effect when, for example, characters are to be printed with Bk ink against a halftone color background. It will be understood that no substantial bleeding takes place even when the recording is performed without the PCBk conversion. The characters printed with the Bk ink exhibit a high level of contrast which is peculiar to the Bk ink, thus offering high quality of the recorded image. The character image usually is constituted by line images having small widths. The following problem is therefore encountered when the recording is performed with PCBk conversion. Namely, almost all the pixels constituting the narrow line images are undesirably converted into PCBk dots, thus failing to provide the high level of contrast which is essential in the recording of this type of image. Thus, the size or area over which the PCBk conversion is effected should be minimized without reducing the anti-bleeding effect, so as not to impair the high level of contrast which is to be presented by the Bk ink.

This problem will be discussed in more detail with specific reference to FIG. 12 which shows a record image containing black characters A, B, C, D and E against a color gradation background. According to the above-described method, PCBk conversion is effected on the 4-dot-width boundary zones (shown as white) of all the black characters. More specifically, the PCBk conversion is effected equally and unconditionally on the 4-dot width boundary zones, regardless of variation in the printing duty ratio of the background. It is true that this PCBk conversion in one hand can prevent color mixing at the boundary, however the duty of the color background may be high but on the other hand poses a problem in that the PCBk zones at the boundary zone of the character are less distinctive in the lower part of the whole image where the duty ratio of print of the background is low. This is attributable to the fact that the contrast of black characters against the background as recognized by human eyes is higher in the area where the print duty ratio of the color background is lower.

SUMMARY OF THE INVENTION

Accordingly, an object of the present invention is to provide an ink jet recording apparatus and method which can prevent degradation of images caused by close positioning of image regions formed by different types of ink, so as to ensure a high level of image quality, thereby overcoming the above-described problems of the known arts.

It is another object of the present invention to provide an ink jet recording apparatus and method which can provide a black image of a sharp contrast with minimized color mixing in a boundary zone between the black image and a region which is formed by a different type of ink, e.g., a color ink in close proximity of the black image, regardless of the degree of positional proximity between the positions of the black image region and the color image region.

It is still another object of the present invention to provide a record data processing method in which the extent of PCBk conversion is reduced to a minimum required level so as to provide a high quality of color image recording without being affected by properties of inks used in the recording, as well as an ink jet recording apparatus and method which rely on the record data processing method.

It is a further object of the present invention to provide a record data processing method which can provide a black image of a sharp contrast with minimized color mixing in a boundary zone between the black image and a region which is formed by a color ink in close proximity of the black image, regardless of the degree of positional proximity between the positions of the black image region and the color image region, as well as an ink jet recording apparatus and method which use the record data processing method.

To these ends, according to one aspect of the present invention, there is provided an ink jet recording apparatus in which plural types of ink are discharged from a recording head onto a recording medium so as to form record dots, thereby recording an image represented by image pixels, the apparatus comprising boundary proximity-degree detecting means for detecting a degree of positional proximity between image pixels corresponding to the record dots to be formed by different types of ink at a boundary between the image pixels; and substituting means for substituting image pixels corresponding to record dots to be formed with one type of ink with substitute pixels corresponding to record dots to be formed with a different type of ink in accordance with the degree of positional proximity detected by the boundary proximity-degree detecting means.

According to another aspect of the present invention, there is provided an ink jet recording method in which plural types of ink are discharged from a recording head onto a recording medium so as to form record dots, thereby recording an image represented by image pixels, the method comprising the steps of detecting a degree of positional proximity between the image pixels corresponding to record dots to be formed by different types of ink at a boundary between the image pixels; substituting image pixels corresponding to record dots to be formed with one type of ink with substitute pixels corresponding to record dots to be formed with a different type of ink, in accordance with the degree of positional proximity detected in the step of detecting the degree of positional proximity; and discharging inks in accordance with the image pixels and the substitute pixels after the step of substituting.

According to still another aspect of the present invention, there is provided a record data processing method for recording an image based on image pixels by forming corresponding record dots with plural types of ink discharged from a recording head, the method comprising the steps of detecting a degree of positional proximity between image pixels corresponding to record dots to be formed by different types of ink at a boundary between the image pixels; and substituting image pixels corresponding to record dots to be formed with one type of ink with substitute image pixels corresponding to record dots to be formed with a different type of ink, in accordance with the degree of positional proximity detected in the detecting step.

According to still another aspect of the present invention, there is provided an ink jet recording apparatus which records an image represented by image pixels by discharging a plurality of types of inks of different colors from a recording head, the recording apparatus comprising boundary detecting means for detecting, a plurality of times under different detecting conditions, a degree of positional proximity between image pixels corresponding to record pixels to be formed by inks of different colors; and boundary converting means for substituting an ink for forming record pixels corresponding to the image pixels with an ink of a different color, under a condition corresponding to the conditions of the plurality of times of detection performed by the boundary detecting means.

According to a further aspect of the present invention, there is provided an ink jet recording method in which an image represented by image pixels is recorded by a plurality of types of inks of different colors discharged from a recording head, the recording method comprising the steps of detecting, a plurality of times under different detecting conditions, a degree of positional proximity between image pixels corresponding to record pixels to be formed by inks of different colors; substituting an ink for forming record pixels corresponding to the image pixels with an ink of a different color, under a condition corresponding to the conditions of the plurality of times of detection performed in the detecting step; and discharging inks in accordance with the substitution performed in the substituting step.

According to a still further aspect of the present invention, there is provided a record data processing method for recording an image based on image pixels with a plurality of types of inks of different colors discharged from a recording head, the processing method comprising the steps of detecting, a plurality of times under different detecting conditions, a degree of positional proximity between image pixels corresponding to record pixels to be formed by inks of different colors; and substituting image pixels corresponding to record pixels to be formed by ink of one color with substitute pixels corresponding to record pixels to be formed by an ink of a different color, under a condition corresponding to the conditions of the plurality of times of detection performed in the detecting step.

According to the invention, by virtue of the features stated above, regions of different types of ink can be formed in close proximity of each other, thus offering a high quality of the record image, by virtue of the substitution of selected record pixels with pixels of different ink in accordance with the degree of positional proximity between these regions at the boundary therebetween.

The invention also reduces any detrimental effect which may be caused by a conversion effected on pixels in the boundary zone, because the extent or proportion of the pixels which are actually subjected to the conversion is suitably controlled in accordance with the printing duty ratio at the boundary. The above-mentioned proportion is controlled in accordance with the degree of positional proximity such that a greater proportion is employed in the area where the closeness or positional proximity is high between a Bk image region and a color image region, thus introducing gradation into the PCBk-converted zone, thereby minimizing the extent of the PCB conversion.

Thus, the present invention offers high quality color recording by reducing the extent or area of the conversion to be performed on the boundary zone, without being influenced by variation in the characteristics of the inks employed in the recording.

The above and other objects, features and advantages of the present invention will become clear from the following description of the preferred embodiments when the same is read in conjunction with the accompanying drawings.

BRIEF DESCRIPTION OF THE DRAWINGS

FIG. 3 illustrates coefficients of proximity degree in a n×m-pixel region in the first embodiment;

FIGS. 15(a) to 15(e) illustrate a mask processing of an 8×8-pixel region explained in a fifth embodiment of the present invention;

FIG. 19, which is comprised of FIGS. 19A to 19C, is a flow chart illustrating a seventh embodiment of the present invention;

FIGS. 32(a) to 32(c) illustrate mask patterns used in a ninth embodiment;

DETAILED DESCRIPTION OF THE PREFERRED EMBODIMENTS

Embodiments of the present invention will now be described in detail with reference to the drawings.
(Recording Apparatus)

Figure 8:
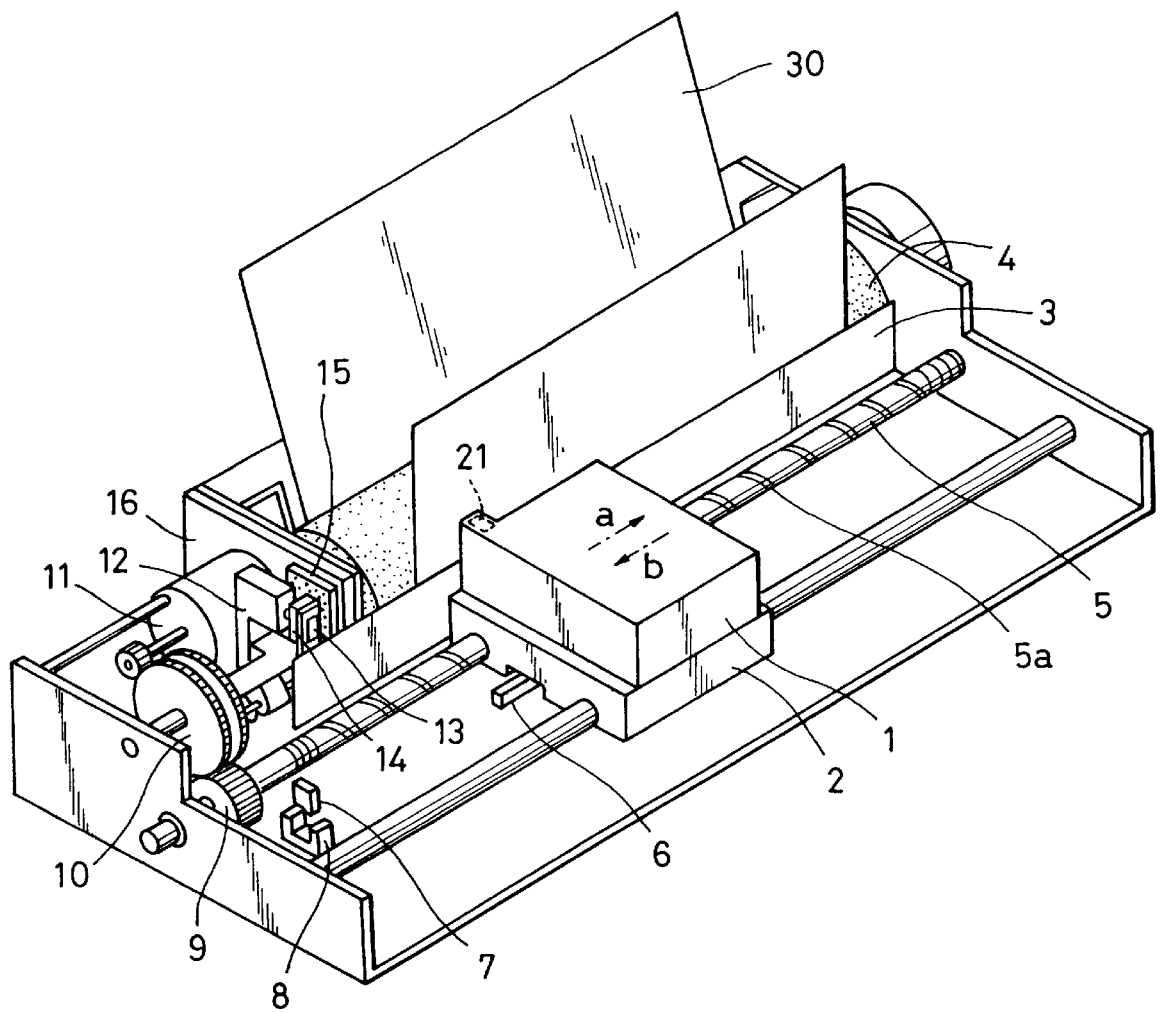
FIG. 8 is a schematic perspective view illustrating the construction of an embodiment of an ink jet recording apparatus according to the present invention.

FIG. 8 is a schematic perspective view illustrating the construction of an embodiment of an ink jet recording apparatus according to the present invention. As shown in FIG. 8, normal and reverse rotations of the output shaft of a drive motor 11 are transmitted to a lead screw 5 via driving-force transmission gears 9 and 10, whereby the carriage 2 is reciprocated in the directions 5 indicated by the arrows a and b in FIG. 8. The carriage 2 is loaded with an ink jet cartridge 1 in which an ink tank (not shown) for storing recording ink therein is integrally formed with a recording head (not shown) for ejecting ink onto recording paper 30. A platen 4 for feeding the recording paper 30 is rotatably disposed to opposedly face the ink jet cartridge 1.

The recording paper 30 fed by the platen 4 is pressed against the platen 4 by a paper hold plate 3 in a position in which the paper 30 oppposedly faces the ink jet cartridge 1, and is held with respect to the cartridge 1 with a predetermined gap or spacing. A recording operation performed by ejecting ink from the recording head while the carriage 2 is moved by the drive motor 11 is conducted under the control of recording control means.

Two photocouplers 7 and 8 are disposed on the left-hand side of FIG. 8 in the moving direction of the carriage 2. These photocouplers 7 and 8 serve as home position detection means for checking the presence of a lever 6 in an area around the photocouplers 7 and 8 and switching the rotating directions of the output shaft of the drive motor 11.

A cap member 13 supported by a cap support member 14 is arranged in a position in which the ink jet cartridge 1 is located during a suction operation, beyond the region of the reciprocating movement of the ink jet cartridge 1 for performing a recording operation. The cap member 13 is used for capping the front face (ejection face) of the recording head provided for the ink jet cartridge 1. In this state, suction means 12 carries out a sucking operation on the cap member 13 so as to perform a head recovery operation, such as removing thickened ink and bubbles within the recording head. A cleaning blade 15 held by a blade support means 16 is disposed on a lateral surface of the cap member 13. The cleaning blade 15 is held by the blade support means 16 in such a manner that it can project toward the ink jet cartridge 1 so as to abut against the front face of the recording head. With this arrangement, after the sucking operation, the cleaning blade 15 is protruded in the path of movement of the ink jet cartridge 1 so as to clean the front face of the recording head in accordance with the movement of the ink-jet cartridge 1. The cleaning blade 15 is not restricted to the aforementioned type, and instead, a known cleaning blade is applicable.

(Recording Head)

Figure 9:
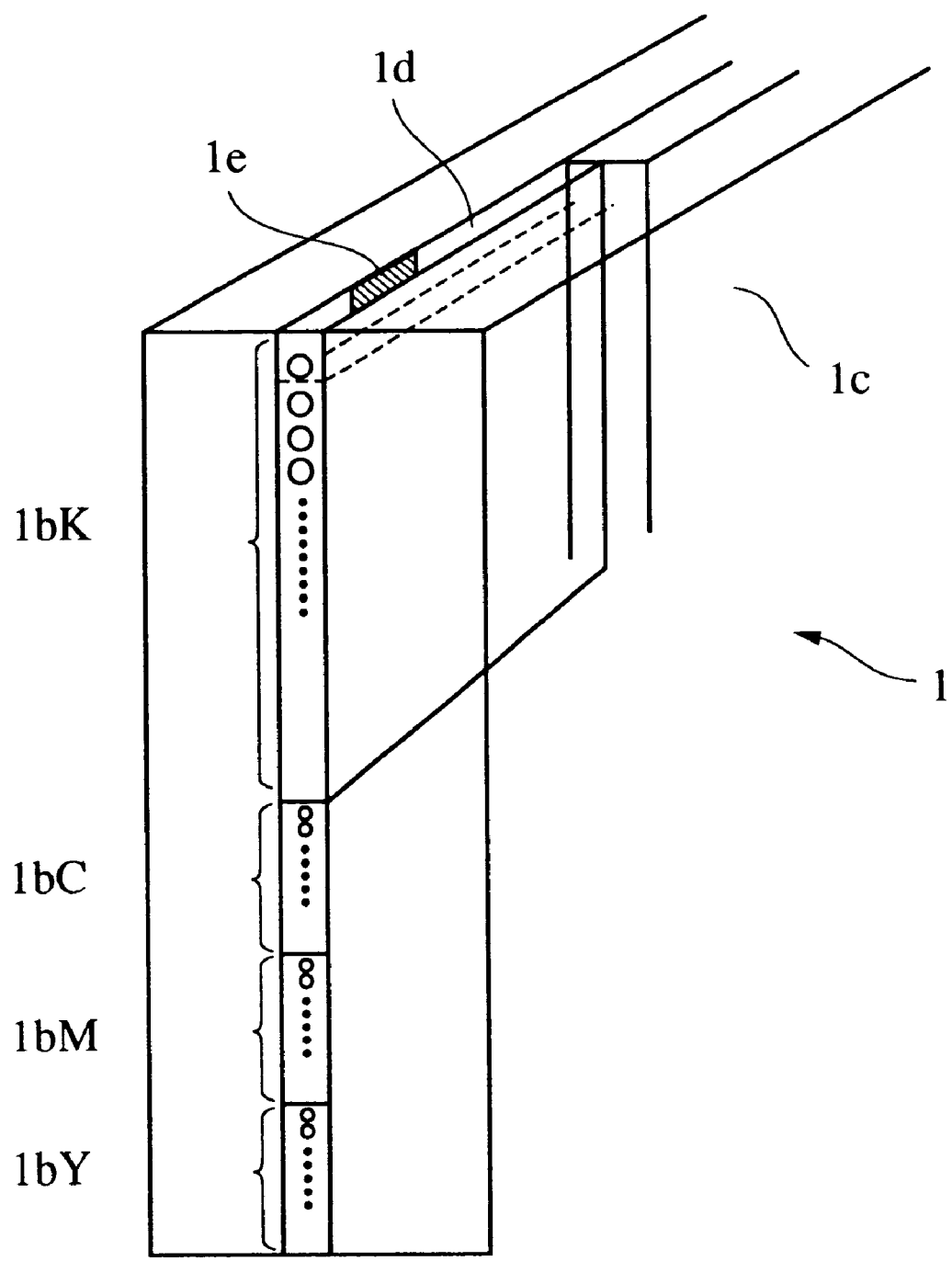
FIG. 9 is a perspective view of the essential portion of a recording head for use in the ink jet cartridge shown in FIG. 8.

The above-described recording head will now be explained with reference to FIG. 9. FIG. 9 is a perspective view of the essential portion of the recording head provided for the ink jet cartridge 1 shown in FIG. 8. As illustrated in FIG. 9, a plurality of ejection openings 1bY, 1bM, 1bC and 1bK for ejecting the different types of inks, i.e., Y (yellow), M (magenta), C (cyan) and Bk (black), are formed at predetermined pitches on the surface of the recording head which opposedly faces the recording paper (see FIG. 8) across predetermined spacing. An electrothermal transducer 1e for generating ink-ejecting energy is disposed along the wall surface of each liquid channel 1d for interconnecting between a common liquid chamber 1c and each of the ejection openings 1b. The common liquid chamber 1c is interconnected to the ink tank of the above-described ink jet cartridge 1 (see FIG. 8) so that ink can be supplied to the chamber 1c from the ink tank. The ink supplied to the common liquid chamber 1c from the ink tank and temporarily stored therein enters the liquid channel 1d by virtue of capillary action and forms a meniscus in the ejection opening 1b so that the ink fills the liquid channel 1d. In this state, the electro-thermal transducer 1e is supplied with power through an electrode (not shown) so as to emit heat. The ink contacting the electro-thermal transducer 1e is thus abruptly heated, and bubbles are generated in the liquid channel 1d and then expanded, thereby ejecting the ink from the ejection opening 1b.

(Construction of Control System)

Figure 10:
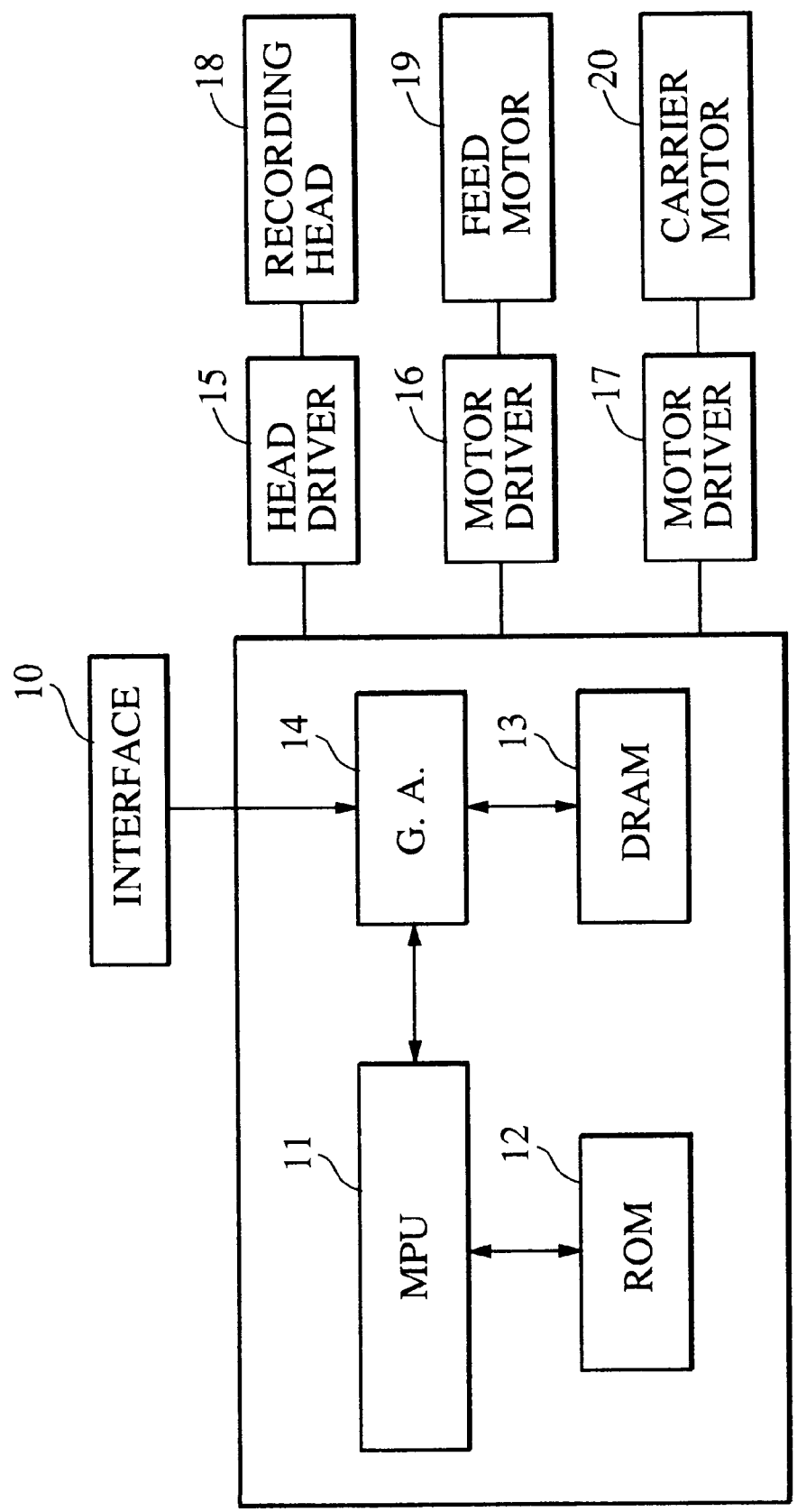
FIG. 10 is a block diagram illustrating the control system of the respective elements of an embodiment of an ink jet recording apparatus according to the present invention.

A description will now be given with reference to a block diagram of FIG. 10 of the construction of a control system used for executing a recording control over the respective elements of the apparatus. FIG. 10 illustrates a control circuit which comprises an interface 10 for inputting a recording signal, an MPU 11, a program ROM 12 for storing a control program executed by the MPU 11, and a dynamic RAM (DRAM) 13 for storing various types of data (the aforementioned recording signals, recording data, etc.). The dynamic RAM 13 is also able to store other types of data, such as the number of printed dots, the number of replacements of ink recording heads and so on. A gate array 14 controls the supply of recording data to the recording head and also controls the data transfer among the interface 10, the MPU 11 and the RAM 13. A carrier motor 20 serves to convey the recording head, while a feed motor 19 serves to feed recording paper. A head driver 15 is used for driving the head 18, and motor drivers 16 and 17 are used for driving the feed motor 19 and the carrier motor 20, respectively.

Figure 11:
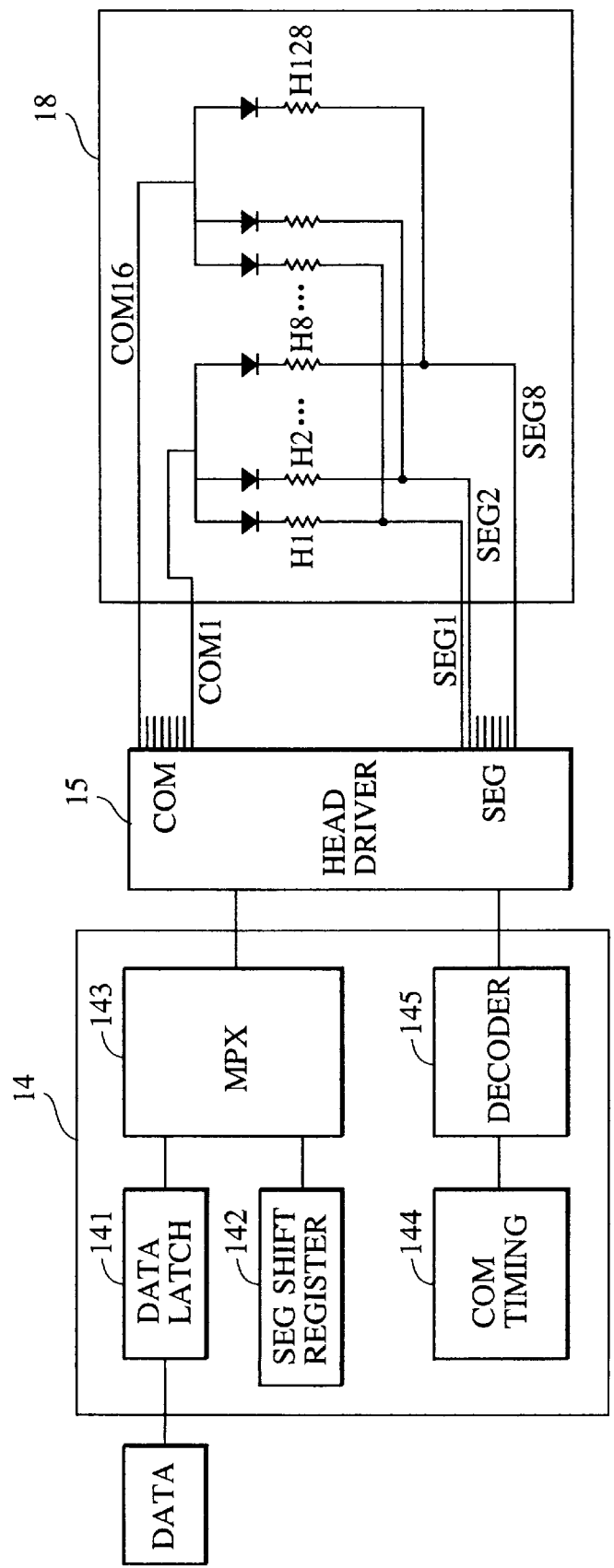
FIG. 11 is a circuit diagram illustrating in detail the respective elements of the ink jet recording apparatus shown in FIG. 10.
Figure 12:
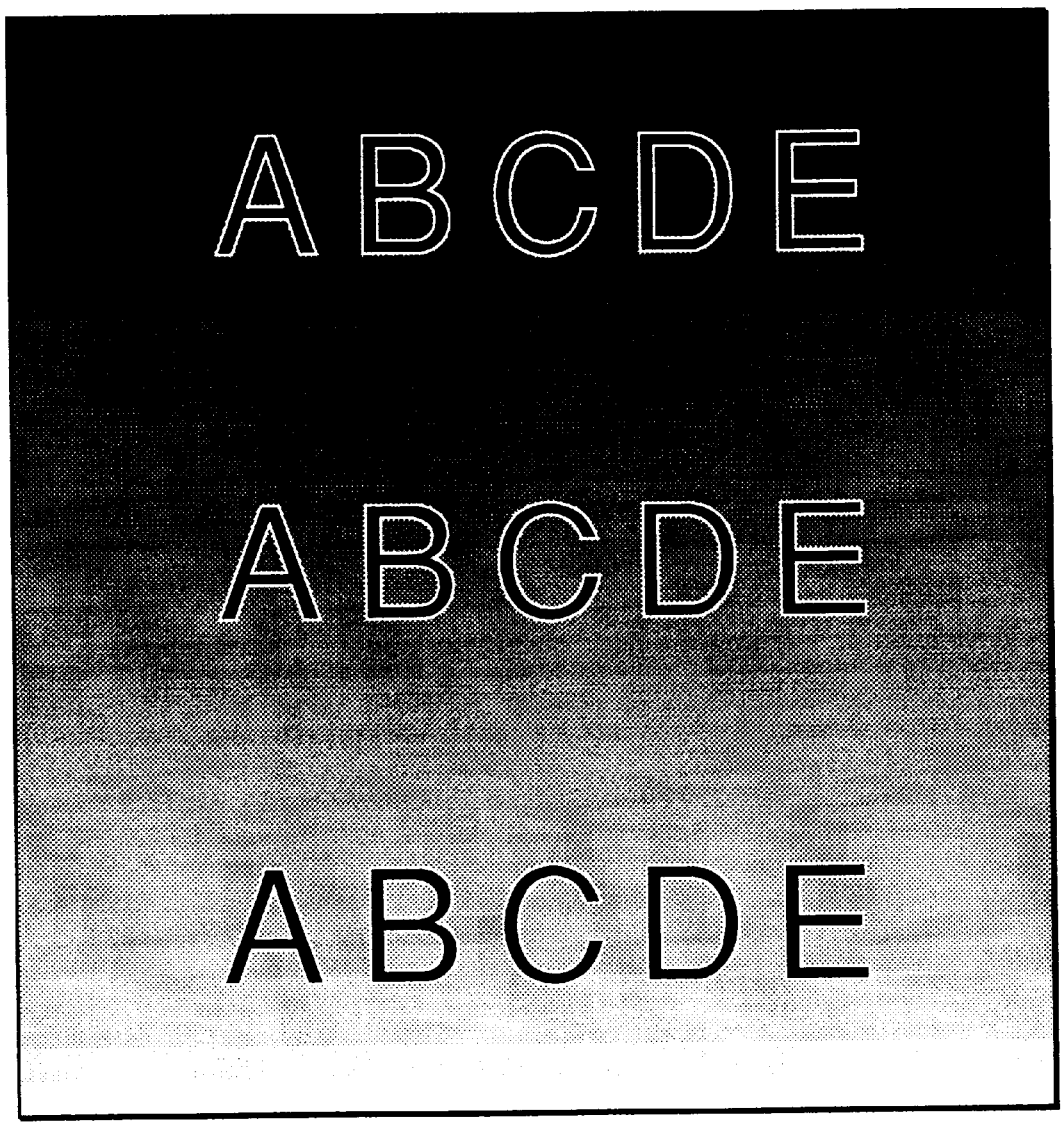
FIG. 12 shows black characters in the background of color gradations according to a conventional method.

FIG. 11 is a circuit diagram illustrating in detail the respective elements of the recording apparatus shown in FIG. 10. The gate array 14 has a data latch 141, a segment (SEG) shift register 142, a multiplexor (MPX) 143, a common (COM) timing generating circuit 144, and a decoder 145. The recording head 18 is constructed in the form of a diode matrix. More specifically, a drive current flows into one of the ejection heaters (H1 to H128) whose common signal COM and segment signal SEG coincide with each other, whereby the ink is heated and ejected.

The aforementioned decoder 145 decodes the timing generated in the common timing generating circuit 144 and selects one of the common signals COM 1 to 8. The data latch 141 latches the recording data read from the RAM 13 by the unit of eight bits. Then, the multiplexor 143 outputs this recording data as the segment signals SEG 1 to 8 according to the segment shift register 142. The output from the multiplexor 143 may be variously changed, such as in the form of the unit of one bit, two bits, eight bits, etc., according to the contents of the segment shift register 142.

The operation of the above-described construction of the control system will now be explained. A recording signal is input to the interface 10, and then, it is converted to print recording data between the gate array 14 and the MPU 11. The motor drivers 16 and 17 are then driven, and simultaneously, the recording head is driven according to the recording data supplied to the head driver 15, thereby performing a printing operation.

First Embodiment

An object of this embodiment is to provide an ink jet recording apparatus which achieves the following type of recording. When color printing is performed by use of the above-described recording apparatus, a mixture of different colors of inks can be prevented in a boundary in which different colors are adjacent to each other, which makes black images appear as close as possible to pure black color so as to present sharp edges.

Four types of inks, i.e., Y, M, C and Bk, are used as recording ink in this embodiment. Bk ink is composed of a dye and a solvent which is formed of water as a main component and contains a non-volatile component. Ink having a surface tension of approximately 50 dyn/cm is used as Bk ink. On the other hand, Y, M and C inks are obtained by the following process. Acetylenol is added to dye and a solvent which is formed of water as a main component and contains a non-volatile component so as to increase wetting characteristics. Then, the resulting ink is adjusted so that the surface tension will become approximately 27 dyn/cm.

The critical surface tension of ordinary recording paper is approximately 35 dyn/cm. Bk ink is slow to absorb into the recording paper, thus taking a longer time to dry. However, since a dye contained in Bk ink is moved (fixed) to a depth of as low as 20 μm from the surface layer of the recording paper, the ink exhibits comparatively high-density and high-color developing characteristics, thus further producing a high contrast with the recording paper. Hence, the above-described composition of Bk ink has been determined in consideration of the improved image quality.

In contrast, C, M and Y inks have a low surface tension, as described above. Accordingly, these inks are very easy to absorb into the recording paper and can be fixed very quickly. On the other hand, since inks of this type, which are called color inks (C, M and Y inks), disadvantageously penetrate to the depths of the recording paper, they are inferior to Bk ink in color developing characteristics, and thus exhibit a contrast with recording paper not as sharp as Bk ink. However, these defects do not present any significant problem in practical use. Based on this fact, the color inks are constituted of the above-described composition which can prevent boundary bleeding.

In the above-described boundary processing, when black characters are printed in the background of color gradations, all the boundary regions are equally and unconditionally subjected to PCBk conversion. It is very unlikely, however, that a mixture of color inks and black ink will occur in black characters in a background of a low-duty color, which makes PCBk conversion unnecessary. If PCBk conversion is carried out for such black characters, the sharpness of edges is impaired and the resulting black characters deviate from the original black color.

A detailed explanation will now be given of means employed in this embodiment to overcome the aforementioned drawbacks.

Figure 1:
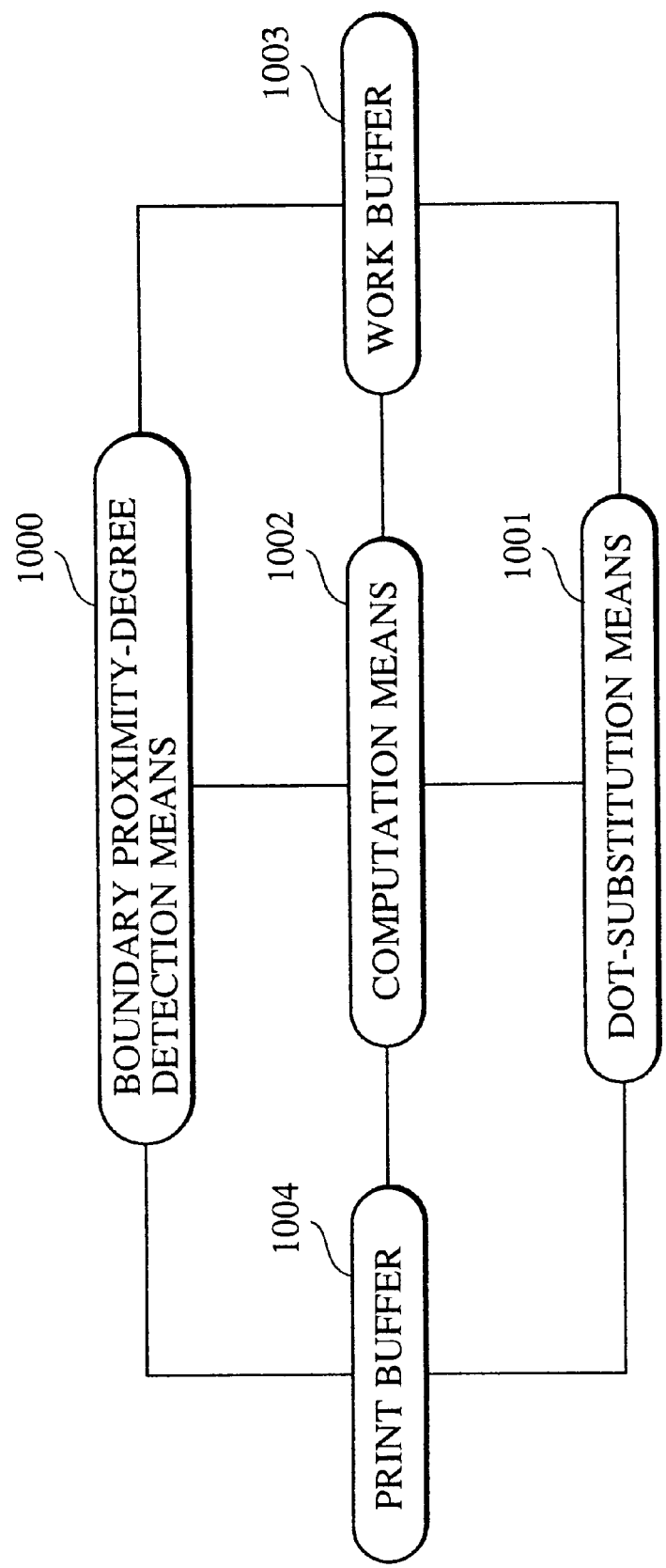
FIG. 1 is a schematic view of a first embodiment of the present invention.

FIG. 1 shows the construction of a control system illustrating a first embodiment of the present invention. The construction of a control system of this embodiment comprises: boundary proximity-degree detection means 1000 for detecting how close different types of inks are adjacent to each other in a boundary therebetween (hereinafter referred to as a proximity degree); dot-substitution means 1001 for performing dot-substitution by use of a different color of ink according to the proximity degree of the boundary; computation processing means 1002; a print buffer 1004 for storing data from a host; and a work buffer 1003 for temporarily storing the computation results.

Figure 2:
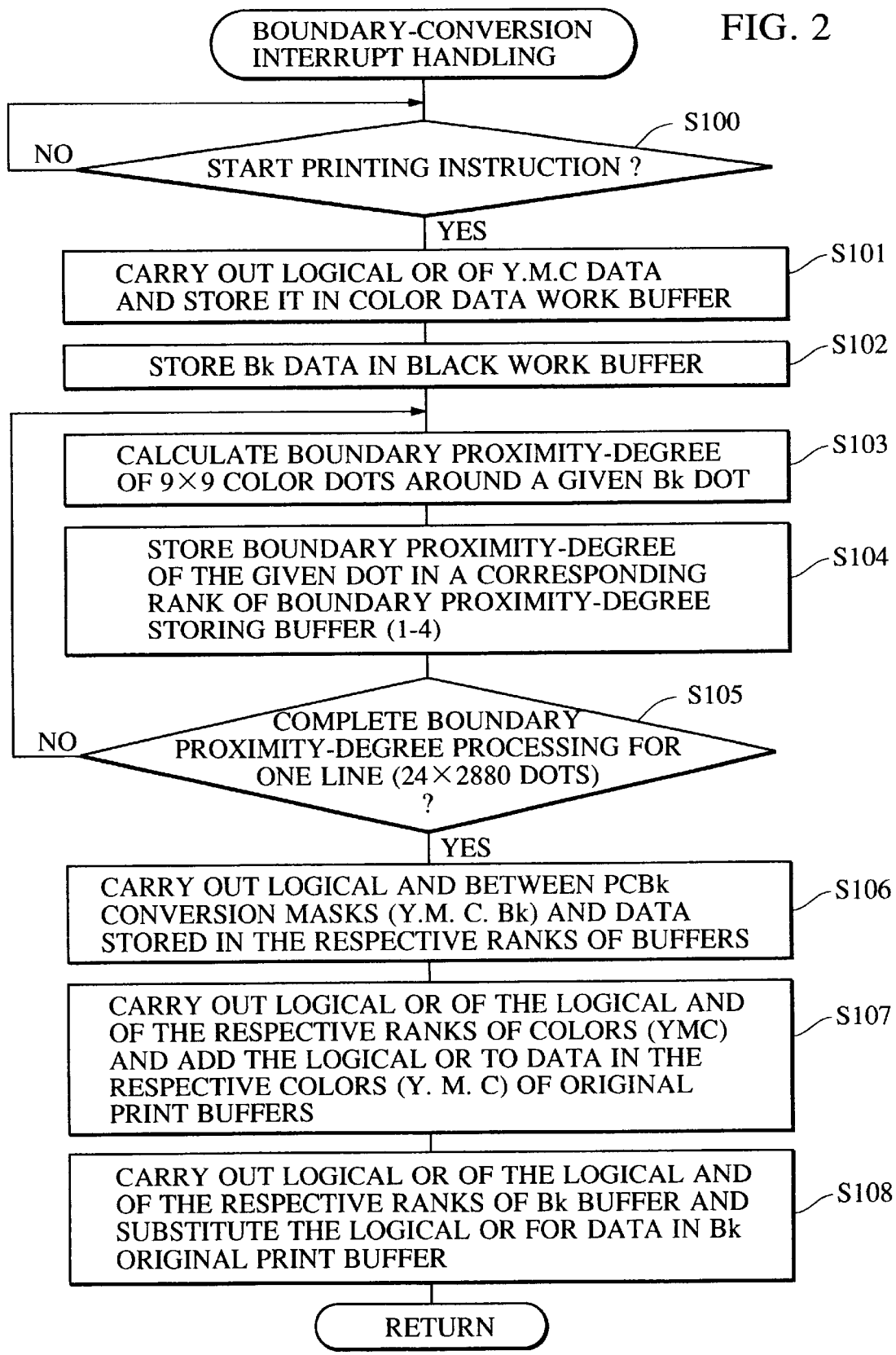
FIG. 2 is a flow chart illustrating the first embodiment of the present invention.

FIG. 2 is a flow chart illustrating the first embodiment of the present invention.
(Computation of Boundary Proximity-degree)

In the recording apparatus, prior to the actual recording operation, recording data by color is expanded into depicting data indicated by bits 1 or 0 for representing whether dots are formed (a memory used for data expansion will hereinafter be referred to as a print buffer).

When a printing start instruction is given (S100), the logical OR is performed on data concerning the respective colors (Y, M and C) stored in the respective print buffers, and the resultant data is stored in a color data work buffer (S101). The data on Bk is independently stored in a black work buffer (S102).

Subsequently, coefficients of a boundary proximity-degree, which have been determined with respect to a square region constituted by 9 rows and 9 columns of pixels around a given Bk dot, i.e., peripheral 9×9 color dots around the given Bk dot, are sequentially added, thereby determining the overall boundary proximity-degree in the region (S103). It is then determined under which rank among a predetermined plurality of ranks the overall boundary proximity-degree fall (in this embodiment four ranks are employed, however, the optimal number of ranks is preferably determined in accordance with the construction of the recording apparatus or characteristics of ink). The given Bk dot is stored in the corresponding rank of the boundary proximity-degree storing buffers 1 to 4 (S104). The above-described processing is executed on all the Bk dots (S105). As a consequence, all the Bk dots are stored in any of the boundary proximity-degree storing buffers 1 to 4.

FIG. 3 shows a coefficient of boundary proximity-degree of a region formed of n×m pixels (9×9 pixels in this embodiment, however, the number of pixels is preferably determined in accordance with the construction of the recording apparatus or characteristics of ink) around the given dot. The following is the relationship between the cumulative value of the coefficients of boundary proximity-degree of the given dot and the corresponding rank.

| Rank | Boundary proximity-degree |
|---|---|
| RANK 1 | 0.000–0.779 |
| RANK 2 | 0.800–1.558 |
| RANK 3 | 1.559–2.337 |
| RANK 4 | 2.338–3.116 |

There is no restriction on the dot size in rows and columns (bit map size), which is equal to a region subjected to processing at one time, as long as the dot size covers the sufficient number of dots used for detecting the boundary proximity-degree (in this embodiment a pixel width equivalent to four peripheral pixels, i.e., a 9×9-pixel size). However, the dot size whose row is equal to one line of a recording size and whose column is equal to a nozzle of a head usually enhances easy boundary processing.

Further, the logical OR and AND may be processed by use of a function of a CPU or a hard logic. Moreover, processing may be executed by any of the units of bit, byte and word. It is needless to say, however, that higher-speed processing can be achieved by a larger unit.
(Substitution for Boundary Pixels)

Theoretically, a black pixel can be produced by superimposing Y, M and C inks (a black pixel produced by a mixture of Y, M and C inks will hereinafter be referred to as PCBk). Since Y, M and C inks are inks of the penetrating type as described above, PCBk produced by the penetrating-type inks can be free from mixing with Y, M and C pixels. If all the colors including black are produced by Y, M and C inks, bleeding in a boundary between different types of inks can be prevented. Practically, however, it is very unlikely that a black image formed of PCBk produced by a mixture Y, M and C inks will become pitch-black, which is desired by the user. This applies not only to ink for use in an ink jet recording apparatus, but also to ink for use in the field of gravure printing. This problem can be easily imagined from the fact that a type of ink specifically used for black color is mostly used in the gravure printing.

As described above, a high-contrast pitch black is desired. Accordingly, ink of the penetrating type in which dye penetrates to the depths of a recording medium is not suitable, and instead, ink of drying type is employed, which on the other hand causes the problem of bleeding in a boundary.

In order to solve this problem, the following measure is taken in the present invention. The degree of proximity in a boundary between color and black is detected. If the color duty is higher in the boundary, recording is performed by use of PCBk as much as possible. Conversely, if the color duty is lower in the boundary, recording is performed by use of True Black (sole black ink). With this arrangement, a black image of higher quality can be obtained.

In the manner described above, after the proximity degree of a boundary between a color pixel and a Bk pixel is detected by the forgoing boundary proximity-degree detection means, the Bk data concerning the boundary is substituted with the PCBk data in accordance with the duty of the adjacent color. This arrangement can improve the quality of the overall Bk image and also solve the problem of image blurring in a boundary between different types of inks.

Figure 4:
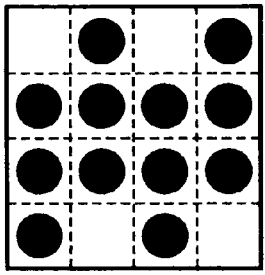
FIG. 4 illustrates PCBk conversion masks used in the first embodiment.

FIG. 4 illustrates PCBk conversion masks 1 to 4 corresponding to the respective ranks of the boundary proximity-degree. In this embodiment, PCBk is formed of Bk ink and CYAN ink, and four types of masks having the ratio of Bk ink to CYAN ink of 100:0, 75:25, 62.5:37.5 and 50:50, respectively, are employed, for simple explanation. Y and M may certainly be added to Bk and C inks in accordance with the black shade of PCBk, and the larger number of masks having various ratios of these colors may be used.

The logic AND between the boundary proximity-degree storing buffers 1 to 4 and the PCBk conversion masks 1 to 4 (CYAN, Bk) corresponding to the ranks of the buffers is carried out (S106). Subsequently, the logic OR among the logic AND values of the respective ranks of a color (CYAN in this embodiment) is carried out (S107). According to this process, ink used for recording a black image (ink used for black pixels to be substituted with PCBk) can be obtained for each pixel.

The OR results with respect to the colors (CYAN in this embodiment) are respectively added to original data stored in the respective colors of print buffers (S107). On the other hand, the logic OR with respect to Bk is substituted for the original data stored in the Bk print buffer (S108), thereby eliminating unnecessary black pixels.

Since all the pixels to be substituted with PCBk are Bk pixels, the Bk pixels are removed from the Bk original pixels, and simultaneously, Y, M and C pixels corresponding to the removed Bk pixels are added to the original pixels. In other words, the logic OR between the original data on the original image stored in the respective colors Y, M and C of the original print buffer and the aforementioned added pixels is carried out, whereby the addition of the above-described pixels can be processed.

In the manner as described above, color pixels are added to the data on the original image stored in the respective Y, M and C and colors of the buffers, while black pixels are removed from the data on the black original print buffer, thereby solving the problem of boundary bleeding.

Figure 5:
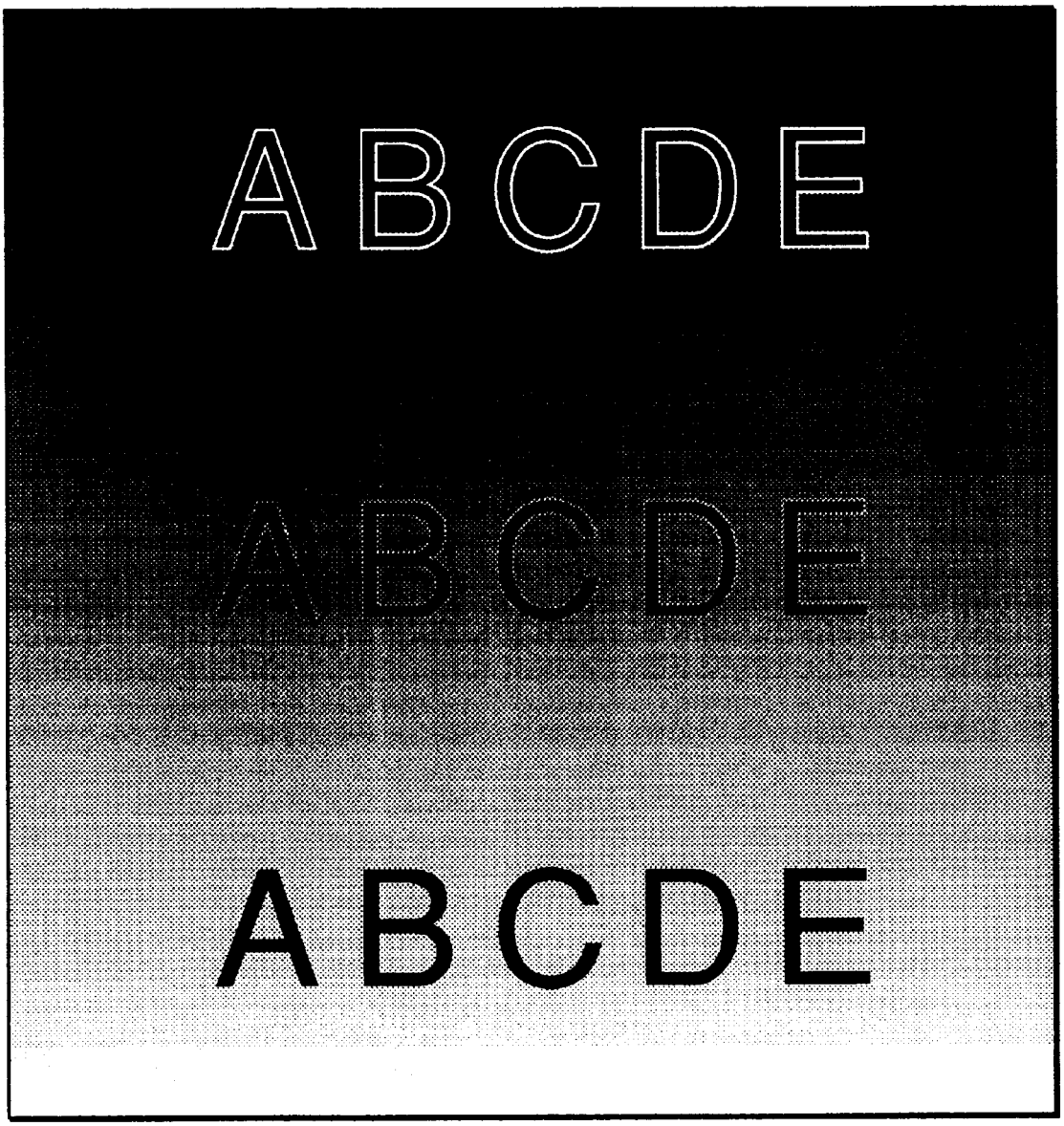
FIG. 5 shows black characters in the background of color gradations by the application of the first embodiment.

FIG. 5 illustrates a recorded image formed by the application of this embodiment. FIG. 5 shows that the substitution for black pixels is not performed in a region in which the color density (duty) is low, and a black image is recorded in black ink, which makes the black image sharp. A color image having a low density (duty) is originally resistant to bleeding caused by a mixture with a black image. On the other hand, the substitution for black pixels are performed in a high color-density region, thereby preventing bleeding between a black image and a color image.

As is clearly seen from the foregoing description, in this embodiment, boundary processing is suitably carried out in accordance with color gradations, which makes it possible to record sharp black images without causing a mixture in a boundary between a black image and a color image, thereby offering improved quality of recorded images.

Second Embodiment

In this embodiment, the boundary proximity-degree between a Bk pixel and color pixels is detected more precisely, considering that color pixels adjacent to a Bk pixel in a boundary therebetween are secondary colors (Red, Green and Blue).

By use of a recording apparatus for recording binary data, ink supplied per pixel of a color image is generally one type of ink or two different types of inks selected from the group of yellow, magenta and cyan inks (these inks are mixed to obtain secondary colors, i.e., red, green and blue). Accordingly, a black image adjacent to red, green and blue is more inclined to be mixed with such colors than a black image adjacent to yellow, magenta and cyan.

In light of this fact, in this embodiment, boundary proximity-degrees Y, M and C with respect to data stored in the respective colors (Y, M and C) of the print buffers are determined from the coefficients of boundary proximity-degree. Then, the thus-obtained boundary proximity-degrees Y, M and C with respect to the respective colors are added, and the resulting value is determined to be the overall boundary proximity-degree of a given Bk dot.

Figure 6A:
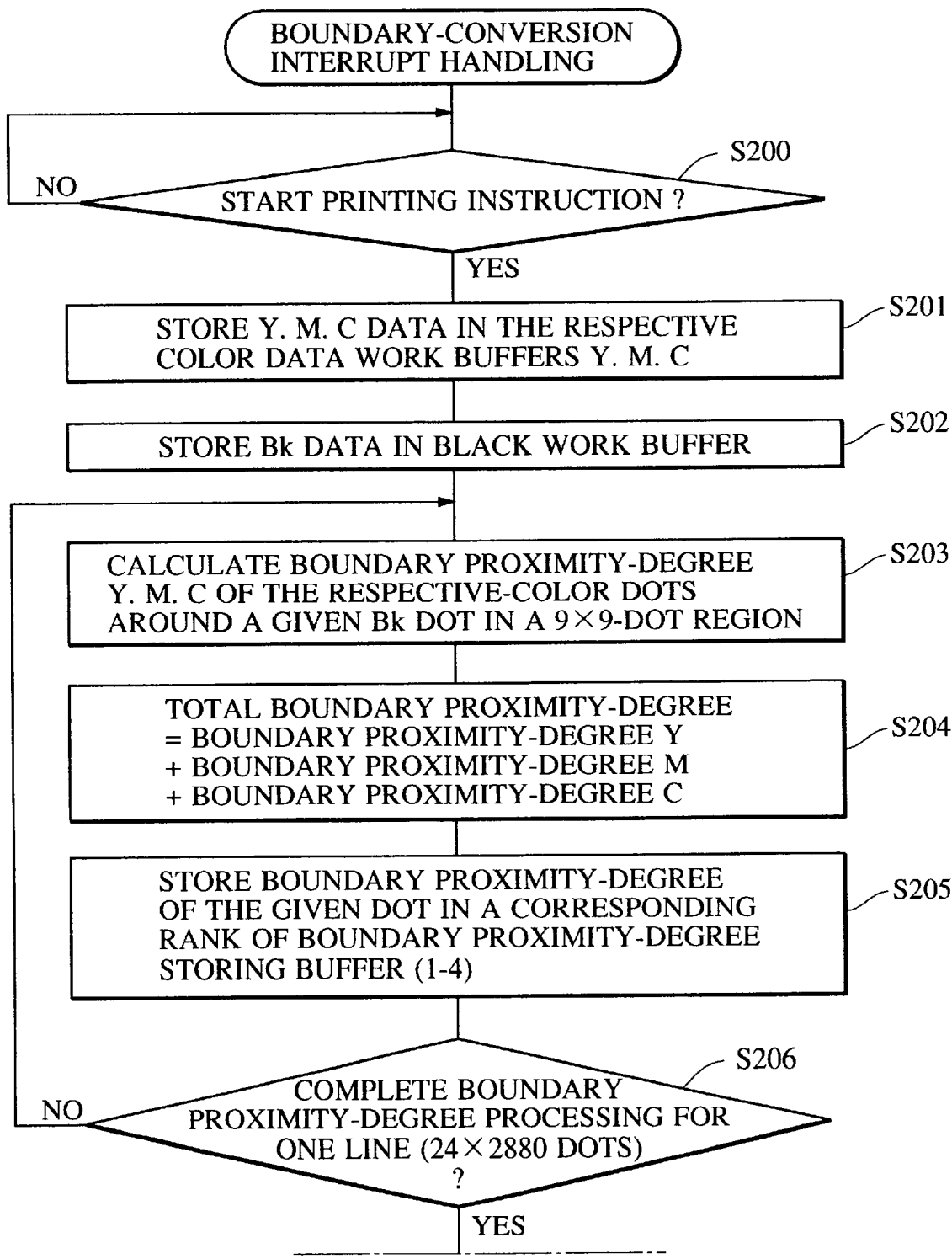
FIG. 6, which is comprised of FIGS. 6A and 6B, is a flow chart illustrating a second embodiment of the present invention.
Figures 6, 6A, 6B:
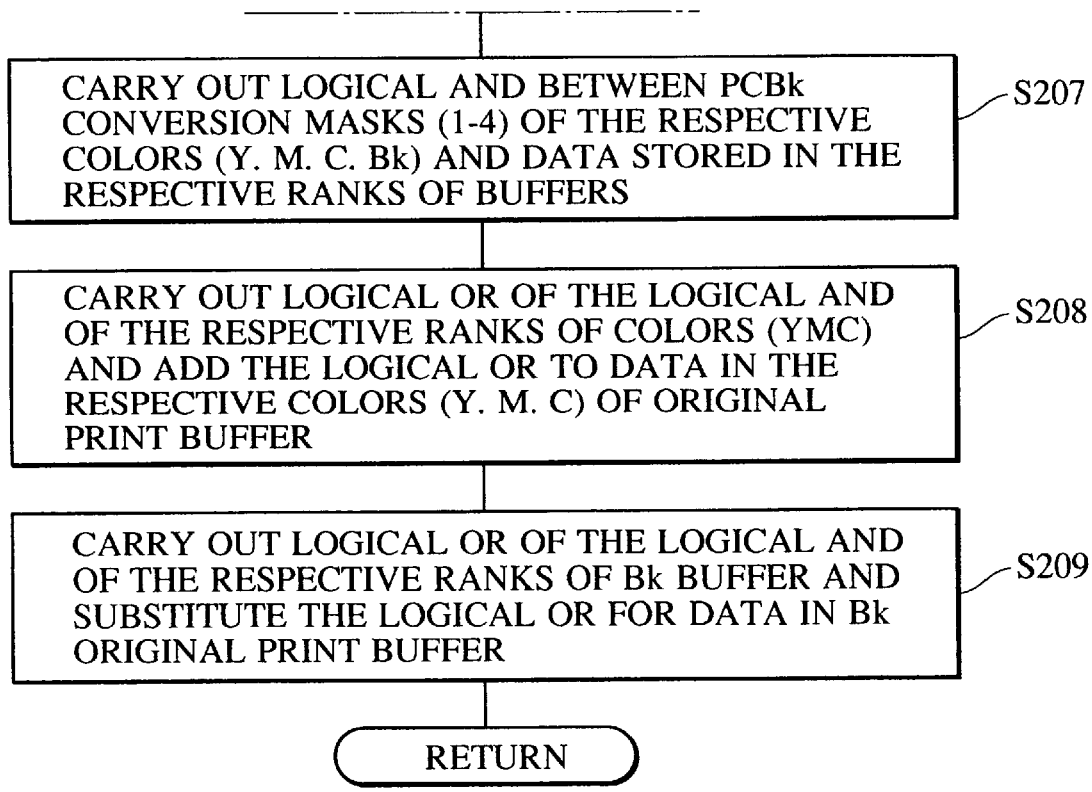

FIG. 6, which is comprised of FIGS. 6A and 6B, is a flow chart illustrating this embodiment.

When a start printing instruction is given (S200), Y, M and C data items stored in the respective print buffers are stored in the respective color data work buffers Y, M and C (S201). Bk data is stored in a black work buffer (S202).

Subsequently, the coefficients of boundary proximity-degrees by individual colors (Y, M and C) which have been determined with respect to a 9×9-pixel region around a given Bk dot are sequentially added, thereby determining the boundary proximity-degrees of the respective Y, M and C colors (S203). The thus-obtained boundary proximity-degrees of the individual colors are added to obtain the overall boundary proximity-degree of the given Bk dot (S204).

It is determined under which rank among a plurality of predetermined ranks the overall boundary proximity-degree fall (in this embodiment four ranks are employed, however, the optimal number of ranks is preferably determined in accordance with the construction of the recording apparatus or characteristics of ink). Then, the overall boundary proximity-degree is stored in the corresponding rank of the boundary proximity-degree storing buffers 1 to 4 (S205). Upon completion of the above-described boundary proximity-degree processing for one line (S206), boundary dot-substitution processing is sequentially performed (S207–S209). These steps S207 to S209 are similar to steps S106–S108 of the first embodiment, and an explanation thereof will thus be omitted.

The coefficients of the boundary proximity-degree of a 9×9-pixel region around a given dot are identical to those used in the first embodiment.

The following is the relationship between the boundary proximity-degree of a given dot and the corresponding rank. This relationship shows that the values of boundary proximity-degree in the respective ranks are twice as much as the values defined in the first embodiment since the boundary proximity-degrees calculated by color are added to obtain the overall boundary proximity-degree.

| Rank | Overall boundary proximity-degree |
| --- | --- |
| RANK 1 | 0.000–1.558 |
| RANK 2 | 1.559–3.116 |
| RANK 3 | 3.117–4.674 |
| RANK 4 | 4.675–6.232 |

In the manner described above, taking into consideration that a color pixel formed of two dots is more inclined to be mixed with a Bk dot than a color pixel formed of one dot, the occurrence of color mixture in a boundary between a Bk pixel and color pixels can be predicted more precisely than in the first embodiment. It is thus possible to suitably perform dot-substitution in a boundary.

Third Embodiment

An explanation will now be given of an embodiment in which the above-described boundary proximity-degree detection means and the dot-substitution means are processed at higher speed.

The boundary detection and the substitution for recording pixels certainly may be processed on the basis of software according to the previously-described algorithm. However, an excessively heavy load is applied if all the processes are carried out on the basis of software. Data processing for one line will now be taken as an example, and the basic idea of a load applied during processing will now be considered.

The recording head used in this embodiment comprises four types of heads, i.e., Y, M, C and Bk heads, each head having 64 nozzles and exhibiting 360 DPI resolution as described above. A4-size recording paper is used. Under these conditions, the print buffer size for one line is 2880 dots in one row and 64 dots (8 bytes) in one column. If all the processes are executed by making an access to this buffer by a unit of one byte, only the logical OR processing of the respective Y, M and C pixels requires 69,120 times of loading (8×2880×3) to the RAM and 23,040 times of writing operations to the RAM. Moreover, after the data on the boundary proximity-degree has been obtained, the logical AND between such data and the mask patterns of the respective colors is executed. Then, the logical OR between the logical AND of the respective colors and the original image data on the original image of the respective colors is further executed. These OR and AND processes require at least 200,000 reading operations from the RAM and 90,000 writing operations to the RAM. However, the actual processing is merely a simple loop operation in which the output results are not fed back to change the contents of a subsequent process. Accordingly, this type of processing is very easy to execute on the basis of hardware.

Figure 7:
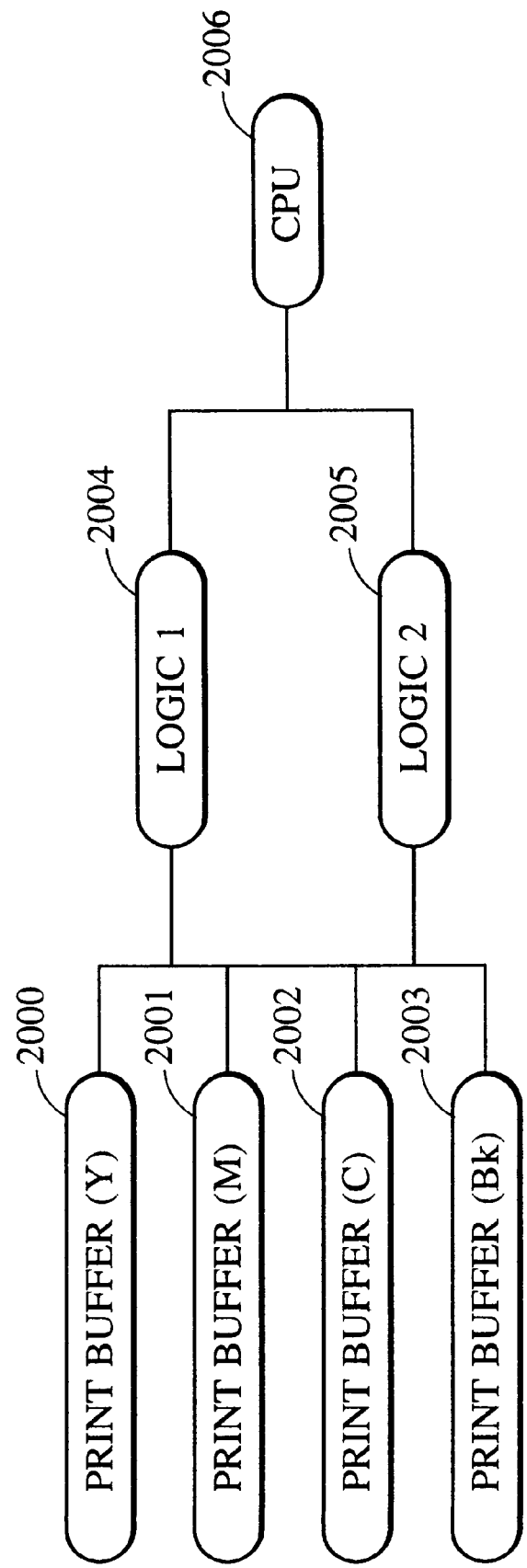
FIG. 7 is a schematic view of the construction of a hardware control system illustrating a third embodiment of the present invention.

FIG. 7 illustrates the construction of a control system when the above-described processing is executed on the basis of hardware. The outline of the hardware processing will now be explained with reference to FIG. 7. Leading addresses of the Y, M, C and Bk print buffers of the original image 2000 to 2003 are input into first logic circuitry 2004. The data items of the respective colors are regularly stored and supplied from the respective leading addresses. Recording pixel data is stored in the form of consecutive addresses. In this embodiment, the logic circuitry 2004, which has received the leading addresses of the respective colors, reads the data (by the unit of one byte in this embodiment) from the leading addresses and stores it in a memory within the logic circuitry.

Upon completion of this process, the logic circuitry 2004 increments the leading addresses of the respective colors by one byte within the logic circuitry and automatically generates an address to be read in a subsequent process so as to read a desired item of data. There is no restriction on the order of reading a plurality of items of data. The logic circuitry 2004 is able to read a desired item of data at a desired time without an instruction from a CPU 2006 (DRAM processing is possible).

In the manner described above, it is essential only that the CPU 2006 sets the leading addresses of the respective Y, M, C and Bk print buffers having the original image. Then, the logic circuitry 2004 automatically reads the original image from the leading addresses. Then, the logic circuitry 2004 further executes the logical OR among the respective colors (Y, M and C) and calculates the boundary proximity-degrees of the Bk data with respect to the resulting OR, and also groups the obtained proximity degrees into a plurality of ranks. It is thus possible to execute control processing of the output of the ranked Bk data from a specified address in accordance with a specified rule. The output Bk data is then stored in a work buffer (not shown).

To execute the foregoing processing on the basis of software, it is necessary that the CPU performs reading and writing as much as several tens of thousands of times from and to the RAM. In contrast, on the basis of hardware processing, only address setting for four bytes (four colors) is necessary, and processing similar to that required on the basis of software can be completed. Also, since the above-described processing can be performed merely by repeating a simple process, it is not necessary to construct the logic circuitry on a large scale.

Although the output addresses of the ranked Bk data are fixed in this embodiment, the logic circuitry may be constructed to possess general versatility to set the output addresses.

After the ranked Bk data (ranks 1 to 4 in this embodiment) has been produced, it is only essential that 12-byte data representing the leading address of the work buffer in which the Bk data is stored, and the leading addresses in which the Y, M, C and Bk original images are stored, the leading address in which the Y, M, C and Bk mask patterns are stored, is set in second logic circuitry 2005 of the CPU 2006. Then, the following processing is executed: the logical AND between the respective Bk data of the ranks 1 to 4 and the respective colors (Y, M, C and Bk) of the mask patterns, the logical OR between the resulting AND and the respective colors (Y, M and C) of the original image data, and the logical AND between the resulting OR and the Bk original image data. The results are output to the predetermined addresses of the respective colors (Y, M, C and Bk).

In a manner similar to the logic circuitry 2004, the respective addresses are automatically incremented in the logic circuitry 2005, which then generates a desired address and continues to perform processing a predetermined number of times. As a consequence, the output items of data are input into the print buffers 2000 to 2003 of the data on the actual image to be recorded obtained after boundary pixel-substitution has been completed.

In the manner described above, boundary detection and dot substitution are processed on the basis of hardware, whereby it is possible to establish extremely high-speed boundary control means within the limit of the practical costs.

Fourth Embodiment

In the foregoing first, second and third embodiments, the following measures are taken to meticulously identify a boundary between a color dot and a black dot and to minimize the extent of dot substitution. The number of different types of ink dots (color dots) present in an n×m-pixel region around a given Bk dot is first corrected by weight coefficients which have been provided for the respective pixels, and then counted. The resulting values are grouped into a plurality of ranks. The data of each of the ranks is masked at a predetermined ratio of colors. According to this process, dot substitution is performed.

However, the foregoing embodiments may encounter the following problem when the predetermined masks are applied to the respective ranks of data on ink to be substituted in accordance with the boundary proximity-degree. That is, the data on ink to be substituted having a regular pattern, as shown in FIG. 15(a), may sometimes undesirably match the mask pattern.

When the logical AND between the data shown in FIG. 15(a) (the data being stored in the boundary proximity-degree storing buffer rank 2) and the Bk-CYAN mask of the rank 2 is carried out, the upper half data matches the mask shown in FIG. 15(b), resulting in data only consisting of CYAN, as shown in FIG. 15(c). Also, although the lower half data is converted to Bk and CYAN at a ratio of approximately 50:50, it results in a regular pattern.

In order to solve the aforementioned problem, this embodiment shows a dot-substitution method for preventing the above-described undesired matching between data on ink to be substituted and the corresponding mask.

Figure 13:
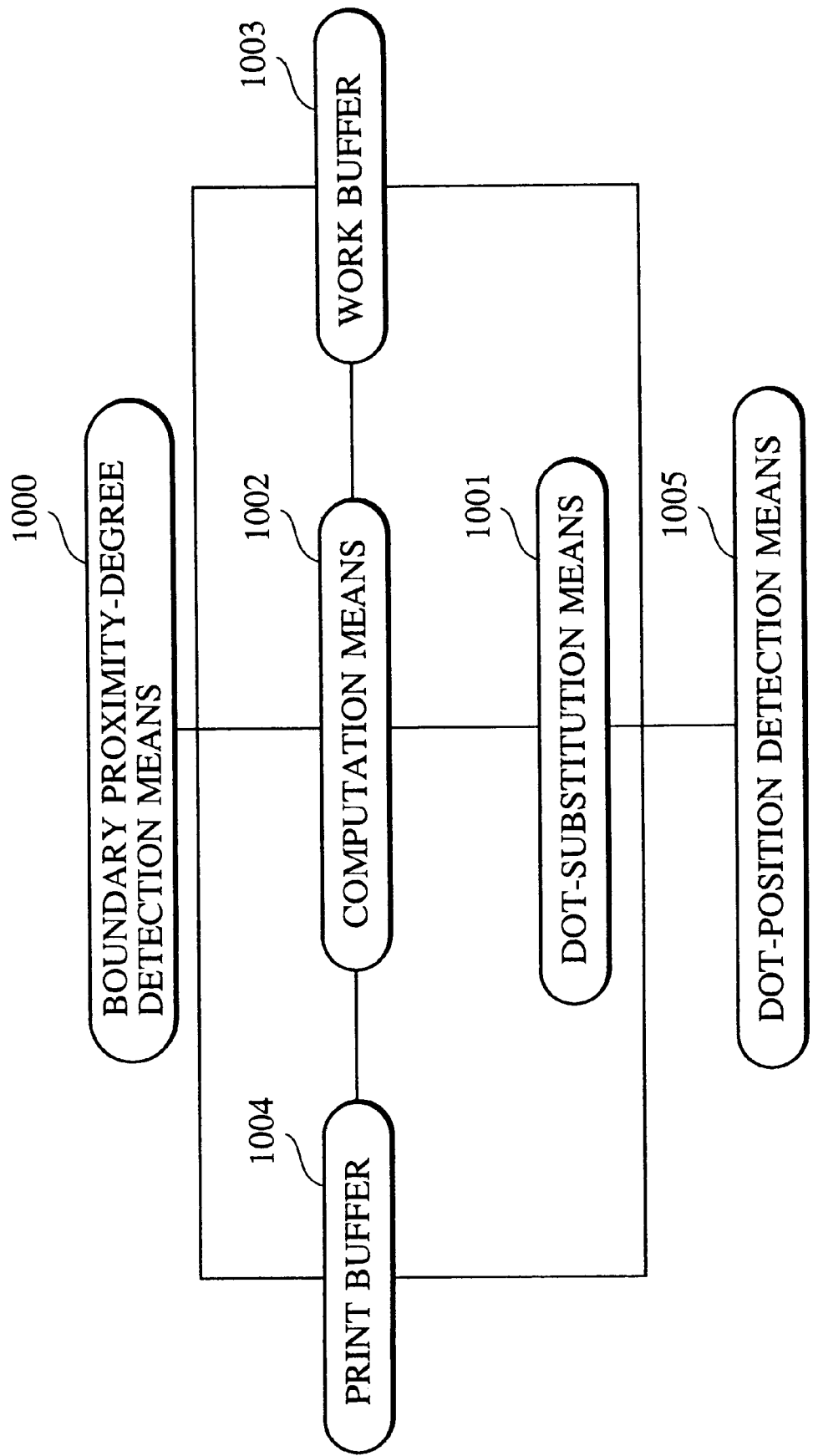
FIG. 13 is a schematic view of the structure of a control system illustrating a fourth embodiment of the present invention.

FIG. 13 shows the construction of a control system illustrating this embodiment. In this control system, dot-position detection means 1005 for detecting a recording dot from data stored in the work buffer 1003 is added to the control system shown in FIG. 1, whereby the dot-substitution means 1001 is able to perform dot substitution based on the position of the dot.

Figure 14A:
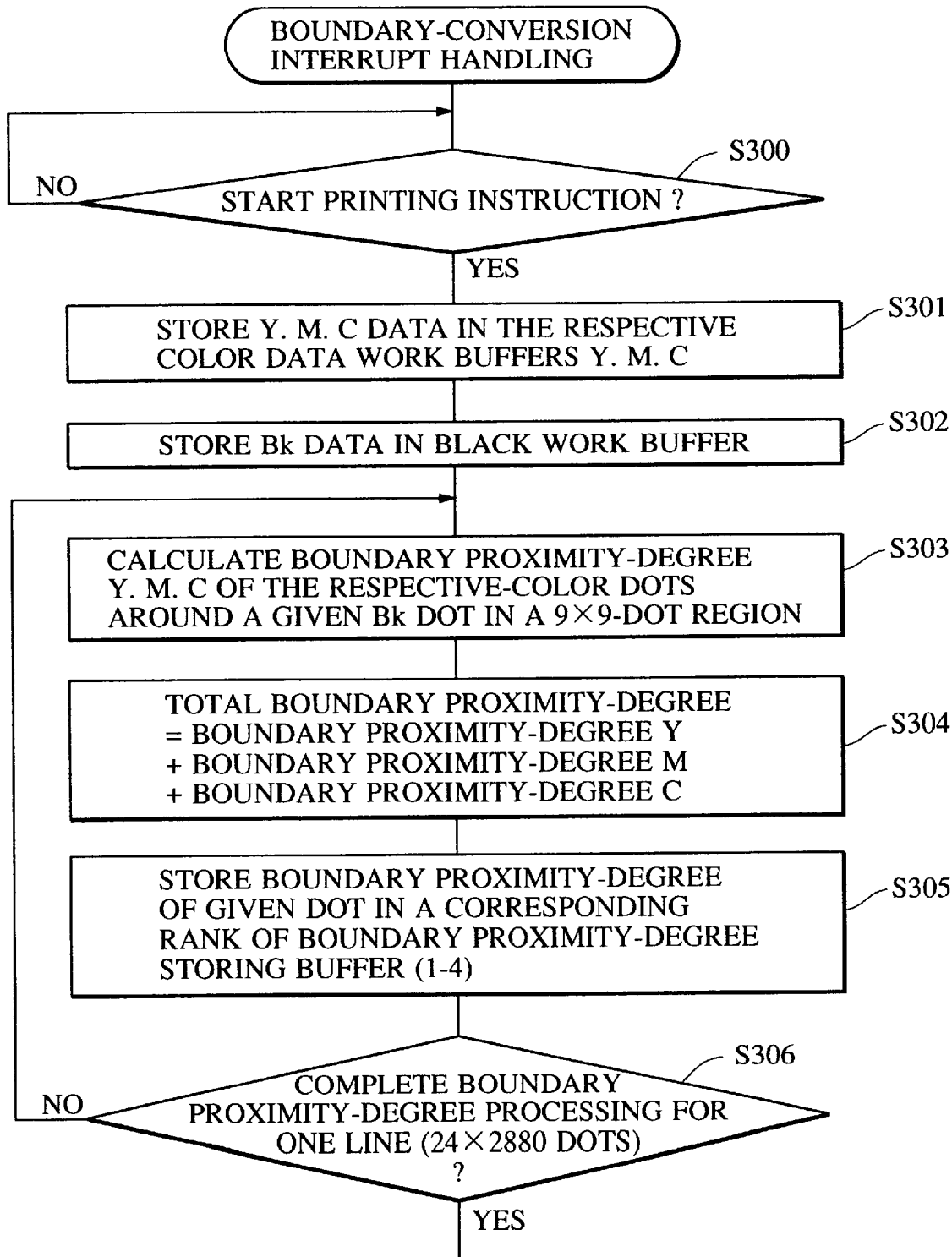
FIG. 14, which is comprised of FIGS. 14A and 14B, is a flow chart illustrating the fourth embodiment of the present invention.

FIG. 14, which is comprised of FIGS. 14A and 14B, is a flow chart illustrating this embodiment.

The following method of boundary dot-substitution is employed. Several n×m-pixel masks prepared by color and by rank shown in FIG. 4 have been provided for data stored in the boundary proximity-degree storing buffers 1 to 4. The logical AND between the masks and the data stored in the respective boundary proximity-degree storing buffers is carried out. The resulting AND data, which is used as dots to be substituted for the original Bk data, is added to or substituted for the original data within the respective colors of the print buffers. The thus-obtained new data is used as actual recording data.

Steps (S300–S306) for storing the calculated boundary proximity-degree in the boundary proximity-degree storing buffers 1 to 4 are similar to the steps (S200–S206) in the second embodiment shown in FIG. 6. An explanation thereof will thus be omitted.

For simple explanation, it will be assumed that no data is present in the boundary proximity-degree storing buffers 1–3, and that the 8×8-pixel original data shown in FIG. 15(a) is stored in the boundary proximity-degree storing buffer 4.

The dot-position detection means 1005 first prepares a four-bit checker {1010} equivalent to a 50% Bk mask (shown in FIG. 15(d)) in order to extract Bk data. It is then determined with respect to the most significant raster data {01010101} stored in the boundary proximity-degree storing buffer 4 shown in FIG. 15(a) whether the most significant bit of the raster data is 0 or 1 (S307). If the most significant bit is 1, it undergoes the logical AND with the most significant bit of the checker (S309). The resulting AND is written into the work buffer as a one-bit Bk data, and the checker is rotated to the left by one bit to result the data {1010} (S308). If the most significant bit is 0, the Bk data is written into the work buffer as null data, and the checker is not rotated (S310). Similar processing is then performed so that the Bk data obtained after dot substitution has been performed on the most significant raster results {01000100}. Similar processing is further performed for eight rasters (S311).

Subsequently, a four-bit checker {0101} equivalent to the 50% CYAN mask (shown in FIG. 15(b)) is prepared. It is then determined with respect to the most significant raster data {01010101} stored in the boundary proximity-degree storing buffer 4 shown in FIG. 15(a) whether the most significant bit of the raster data is 0 or 1. If the most significant bit is 1, it undergoes the logical AND with the most significant bit of the checker. The resulting AND is used as one-dot CYAN data, and the checker is rotated to the left by one bit to result in the data {1010}. If the most significant data is 0, the CYAN data is determined to be null, and the checker is not rotated. Similar processing is then performed so that the CYAN data obtained after dot substitution has been performed on the most significant raster results {00010001}. Similar processing is further performed for eight rasters.

In this embodiment, dot substitution is carried out at a ratio of Bk to CYAN 50:50 in order to minimize color mixture. It is more preferable, however, that Yellow and Magenta be added to Bk and CYAN, and then, similar processing is executed, resulting in a conversion ratio in accordance with the construction of the recording apparatus or characteristics of ink. Upon completion of conversion of all the data, the logical OR among the respective ranks of the work buffers is carried out, and the resulting OR values with respect to the respective colors are added to the data in the respective colors Y, M, C of the original print buffers, while the resulting OR with respect to Bk is substituted for the data in the Bk original print buffer (S312 and S313).

Bk and CYAN data obtained after the dot substitution has been conducted according to the above-described method is shown in FIG. 15E.

As is seen from the foregoing description, the dot-position detection means is employed to perform boundary dot-substitution so as to prevent the mask matching which may occur during dot substitution. It is thus possible to prevent color mixture in a boundary between a color image and a black image while the original Bk image is retained, thereby making it possible to offer improved quality of recorded Bk and color images.

Fifth Embodiment

In this embodiment, an explanation will now be given of a method for offering even more improved quality of recorded images by assessing the positional proximity of the boundary between a Bk dot and color dots with higher precision.

Figure 17A:
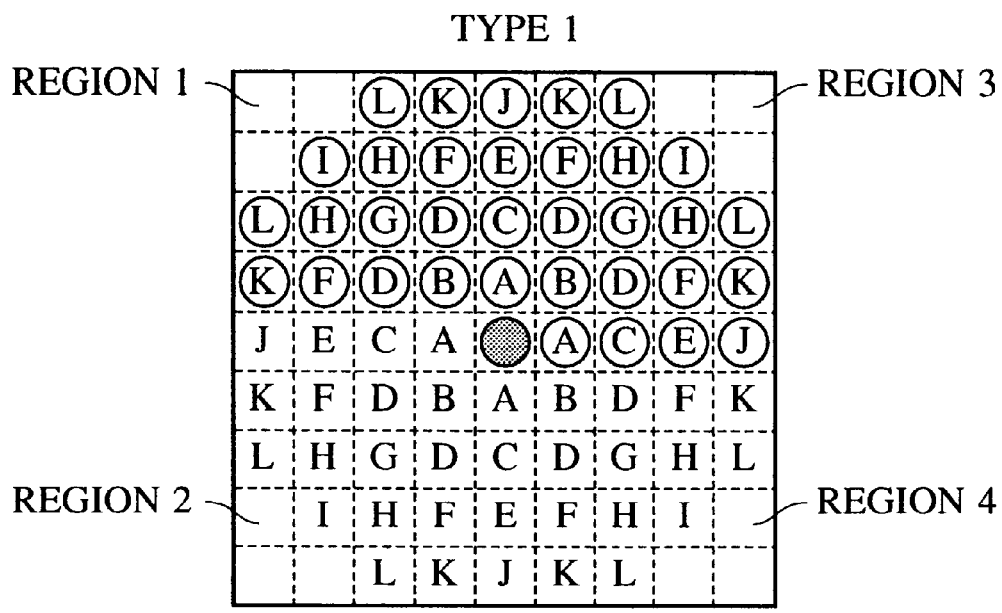
FIGS. 17(a) and 17(b) illustrate two types of positional proximity of different types of inks explained in the fifth embodiment.
Figure 17B:
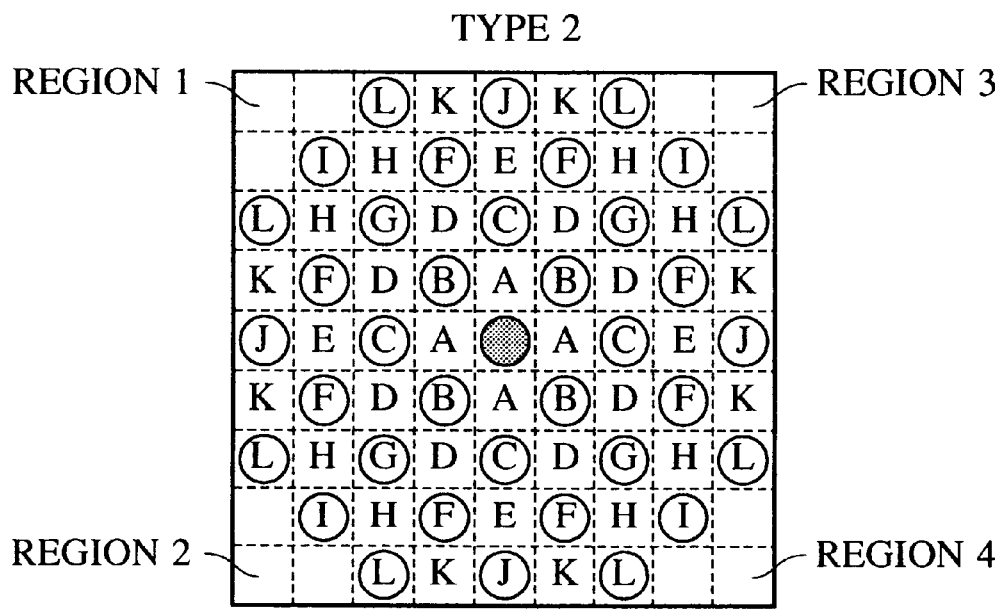

Two different types of boundary regions, as shown in FIGS. 17(a) and 17(b), disadvantageously exhibit similar values of boundary proximity-degrees of given Bk dots, as indicated by the following calculations.

TYPE 1 Boundary proximity-degree=2*(A+C+E+J)+2*(B+G+I)+4*(D+F+H+K+L)=1.558

TYPE 2 Boundary proximity-degree=2*(2*(B+C+G+I+J)+4*(F+L))=1.516

In reality, however, the TYPE 1 in which color dots having 100% duty are adjacent to a given Bk dot has a possibility of causing a color mixture twice as high as the TYPE 2 in which color dots having 50% duty are adjacent to a given Bk dot.

In order to overcome this drawback, the following measures are taken in this embodiment. An n×m-pixel (9×9-pixel in this embodiment) region around a given Bk dot is divided into a plurality of areas (four 5×5-pixel areas including the given dot located in the upper and lower and left and right portions of the region in this embodiment). The boundary proximity-degrees of the respective divided areas are calculated. The greatest value among the proximity degrees of the four areas is determined to be the overall boundary proximity degree of the given dot, which is then written into the corresponding rank of the boundary proximity-degree storing buffer.

The relationship between the boundary proximity-degrees and the corresponding ranks in this embodiment is shown below. The boundary proximity-degrees of this embodiment is one fourth of the boundary proximity-degrees defined in the second embodiment.

| Rank | Overall boundary proximity-degree |
|---|---|
| RANK 1 | 0.000–0.390 |
| RANK 2 | 0.391–0.779 |
| RANK 3 | 0.780–1.169 |
| RANK 4 | 1.170–1.558 |

Calculations are then made to the boundary proximity-degrees of given dots in the two different types of boundary regions shown in FIGS. 17(a) and 17(b) according to the above-described method, thereby reliably exhibiting the overall boundary proximity-degrees which accurately represent the possibility of a color mixture, as shown in the detailed calculations.

TYPE 1 Boundary proximity-degree of area 1=A+B+C+E+G+I+J+2*(D+F+H+K+L)=0.779
Boundary proximity-degree of area 2=0
Boundary proximity-degree of area 3=B+G+I+2*(A+C+D+E+F+H+J+K+L)=1.037
Boundary proximity-degree of area 4=A+C+E+J=0.258
Overall boundary proximity-degree of a given dot=1.037 . . . RANK 3

TYPE 2 Boundary proximity-degree of area 1=B+G+I+2*(C+J+F+L)=0.471
Boundary proximity-degree of area 2=B+G+I+2*(C+J+F+L)=0.471
Boundary proximity-degree of area 3=B+G+I+2*(C+J+F+L)=0.471
Boundary proximity-degree of area 4=B+G+I+2*(C+J+F+L)=0.471
Overall boundary proximity-degree of a given dot=0.471 . . . RANK 2

Figure 16A:
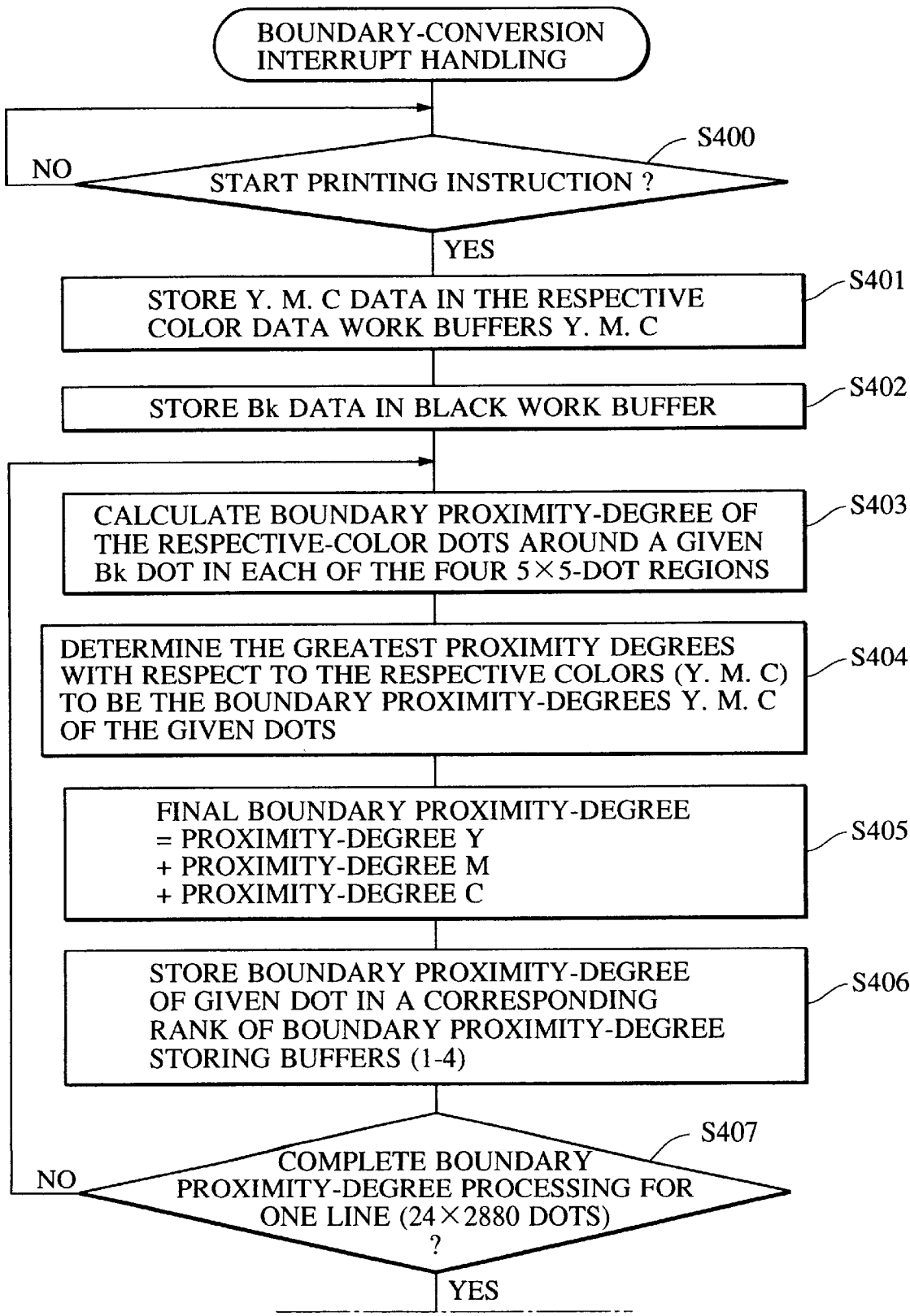
FIG. 16, which is comprised of FIGS. 16A and 16B, is a flow chart illustrating the fifth embodiment of the present invention.

A flow chart illustrating this embodiment is shown in FIG. 16, which is comprised of FIGS. 16A and 16B.

When a start printing instruction is given (S400), the data items of the respective colors Y, M, C and Bk stored in the respective colors of the print buffers are stored in the respective colors of work buffers (S401 and S402). A peripheral 9×9-pixel region around a given dot is divided into four areas (each area has 5×5 pixels including the given dot). The boundary proximity-degrees (1Y to 4Y) by area with respect to Yellow data are determined. Similarly, the boundary proximity-degrees of the four areas with respect to Magenta and Cyan (1M to 4M and 1C to 4C) are also calculated (S403). The greatest value among the proximity degrees 1Y to 4Y is determined to be the overall boundary proximity-degree Y. Likewise, the overall boundary proximity-degree M and the overall boundary proximity-degree C are determined (S404). The overall proximity degrees (Y, M and C) of the respective colors are added to obtain the final boundary proximity-degree of the given dot (S405). The thus-obtained data is stored in the corresponding rank of the boundary proximity-degree storing buffer (1 to 4) (S406). The above-described process is executed for one line (S407).

Subsequent processes (S408–S410) are similar to the processes (S207–S209) used in the second embodiment shown in FIG. 6, and an explanation thereof will thus be omitted.

In the manner described above, prior to calculations of the boundary proximity-degree, a peripheral n×m-pixel (9×9 pixels in this embodiment) region around a given dot is divided into a plurality of areas (four areas in this embodiment). Calculations are made of the boundary proximity-degrees of the respective divided areas, and based on the these values, the final boundary proximity-degree of the given dot is determined. With this arrangement, optimal dot-substitution can be performed, thus making it possible to offer improved quality of recorded images.

Sixth Embodiment

A further explanation will be given of a method for solving a problem which may occur when the method described in the fifth embodiment is employed.

Figure 18:
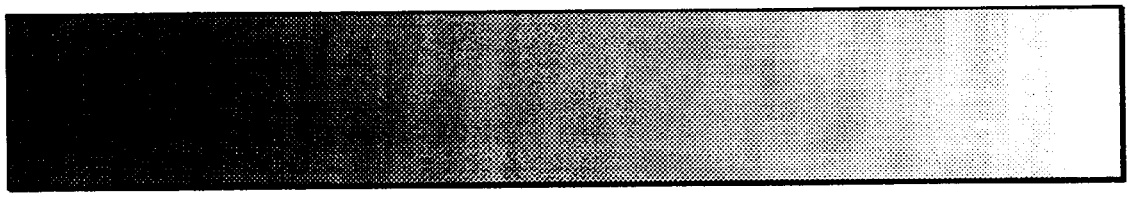
FIG. 18 shows gradations between color and black for illustrating a sixth embodiment of the present invention.

As explained in the method employed in the previous embodiment, a peripheral n×m-pixel (9×9-pixel in this embodiment) region around a given Bk dot is divided into a plurality of areas (four 5×5-pixel areas located in the upper and lower and left and right portions of the region in this embodiment). The boundary proximity-degrees by area are calculated, and the greatest value among the four proximity degrees is determined to be the overall boundary proximity-degree of the given dot. According to this method, in an image having gradations in which color and Bk are gradually mixed, as shown in FIG. 18, all the low-duty Bk dots will be equally and unconditionally subjected to dot substitution. However, in the image shown in FIG. 18, since a color mixture in a boundary between Bk and color does not appear to be so noticeable, all the Bk dots are preferably recorded in True Black.

For solving this problem, the following measures are taken in this embodiment. The disparity between the maximum value and the minimum value among the boundary proximity-degrees of the four areas is determined to be the overall boundary proximity-degree of a given dot. The resulting Bk data is written into the corresponding rank of the boundary proximity-degree storing buffer.

The relationship between the boundary proximity-degrees and the corresponding ranks defined in the fifth embodiment may be used for the relationship therebetween in this embodiment. According to the above-described method, the boundary proximity degrees of given dots in the two different types of boundary regions shown in FIGS. 17(a) and 17(b) are calculated to obtain the following results. It is seen that the boundary proximity-degree approximates 0 for dots which are not required to undergo dot substitution, while the proximity degree exhibits a large value for dots which should be subjected to dot substitution.

TYPE 1 Boundary proximity-degree of area 1=A+B+C+E+G+I+J+2*(D+F+H+K+L)=0.779
Boundary proximity-degree of area 2=0
Boundary proximity-degree of area 3=B+G+I+2*(A+C+D+E+F+H+J+K+L)=1.037
Boundary proximity-degree of area 4 =A+C+E+J=0.258
Boundary proximity-degree of a given dot=1.037–0=1.037 . . . RANK 3

TYPE 2 Boundary proximity-degree of area 1=B+G+I+2*(C+J+F+L)=0.471
Boundary proximity-degree of area 2=B+G+I+2*(C+J+F+L)=0.471

Boundary proximity-degree of area 3=B+G+I+2*(C+J+F+L)=0.471

Boundary proximity-degree of area 1=B+G+I+2*(C+J+F+L)=0.471

Boundary proximity-degree of a given dot=0.471−0.471=0 . . . RANK 1

In the manner described above, prior to calculations of the boundary proximity degree, a peripheral n×m-pixel (9×9-pixel in this embodiment) region around a given dot is divided into a plurality of areas (four areas in this embodiment). The boundary proximity degrees of the respective divided areas are calculated. The disparity between the maximum value and the minimum value among the boundary proximity degrees is determined to be the overall boundary proximity degree of the given dot. According to this method, it is possible to perform optimal dot-substitution, thereby offering improved quality of recorded images.

Seventh Embodiment

In the sixth embodiment, when an ink dot to be substituted is an isolated dot or forms one ruled line, a color mixture between such a dot and a dot of a different type of ink does not appear to be so noticeable on an actual recorded image. Even in this case, however, the calculated boundary proximity-degree may exhibit a considerably great value. Accordingly, such a dot will be disadvantageously subjected to dot substitution, which may cause a color deviation due to the previously-described mask matching.

In order to solve the aforementioned problem, in this embodiment, the proximity degree of the same type of ink is detected for the case in which an ink dot to be substituted is an isolated dot or forms a ruled line, thereby enabling optimal dot-substitution.

Figure 20:
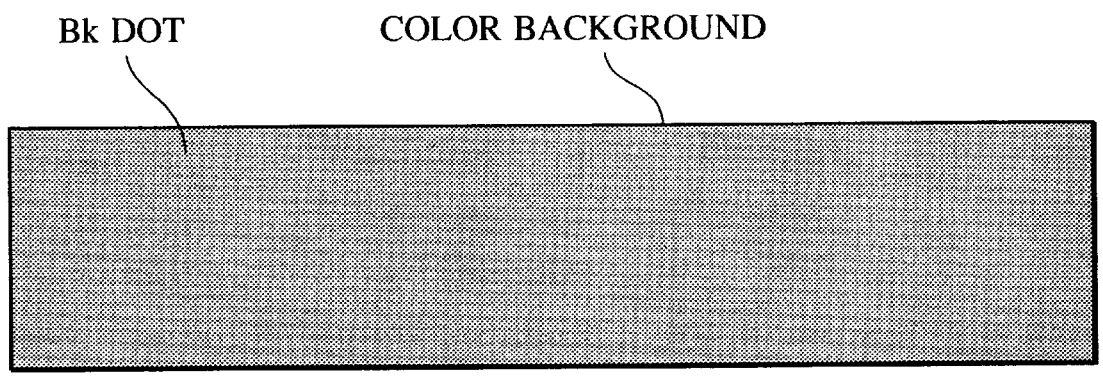
FIG. 20 shows positional proximity between different types of inks for illustrating a seventh embodiment of the present invention.
Figure 21A:
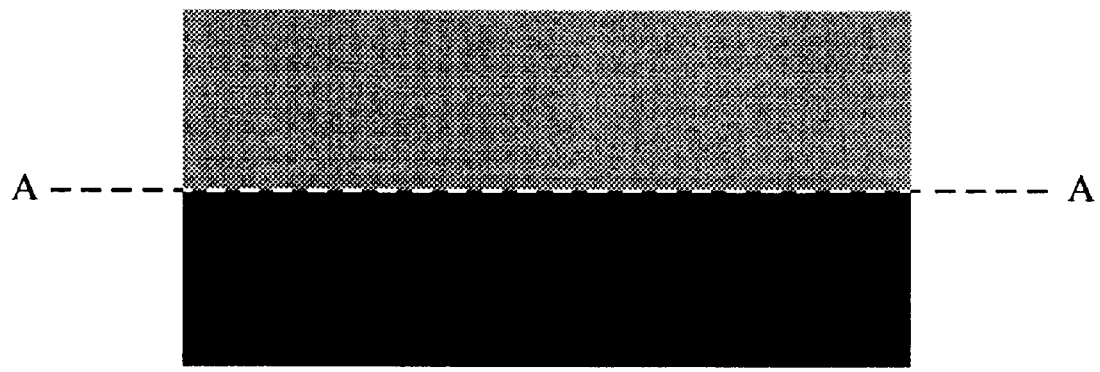
FIGS. 21(a) and 21(b) illustrate ink bleeding in an image boundary.
Figure 21B:
Figure 22A:
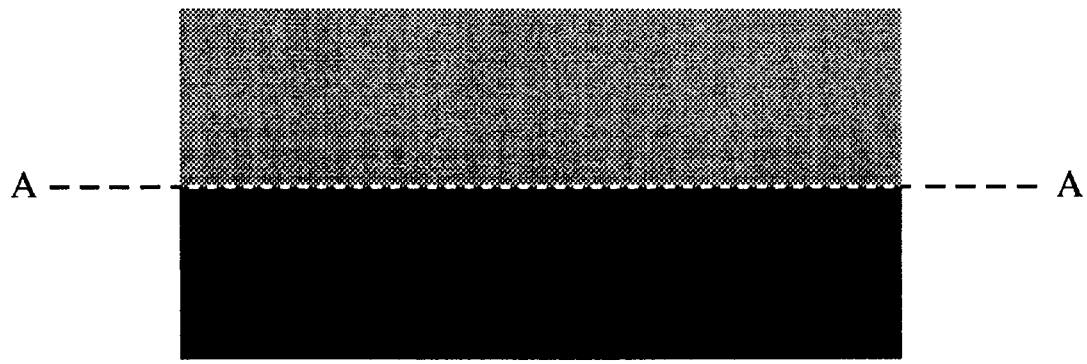
FIGS. 22(a), 22(b) and 22(c) illustrate ink bleeding when an image boundary is subjected to PCBk conversion.
Figure 22B:
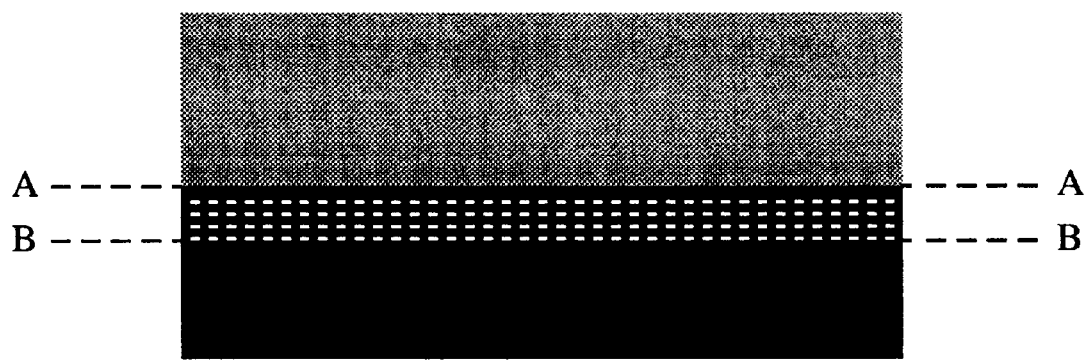
Figure 22C:
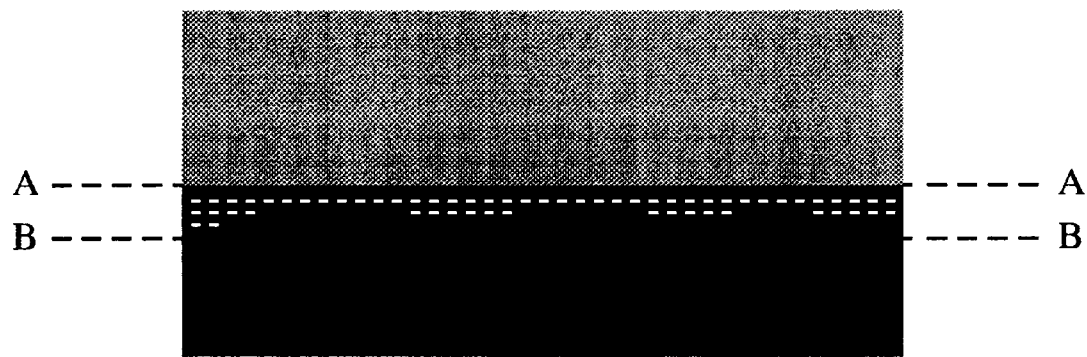
Figure 23A:
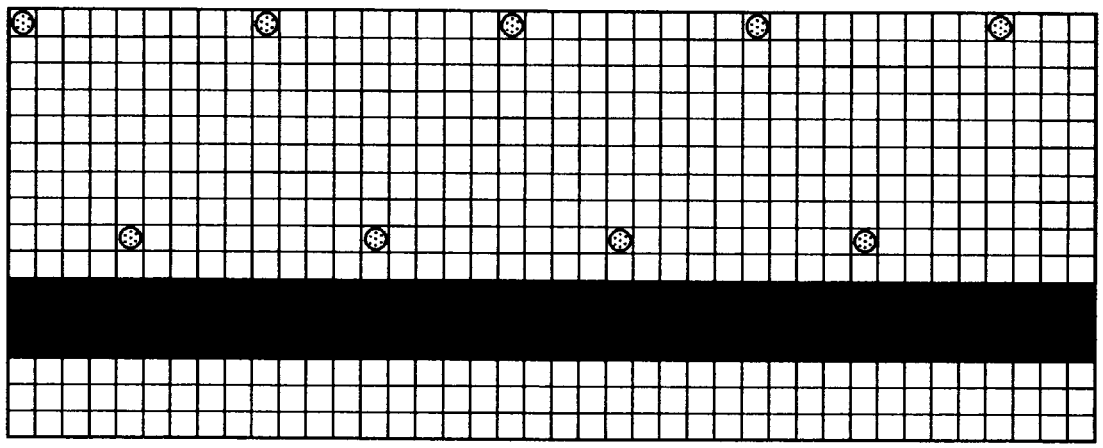
FIGS. 23(a), 23(b), 23(c) and 23(d) illustrate boundary conversion of an image boundary.
Figure 23B:
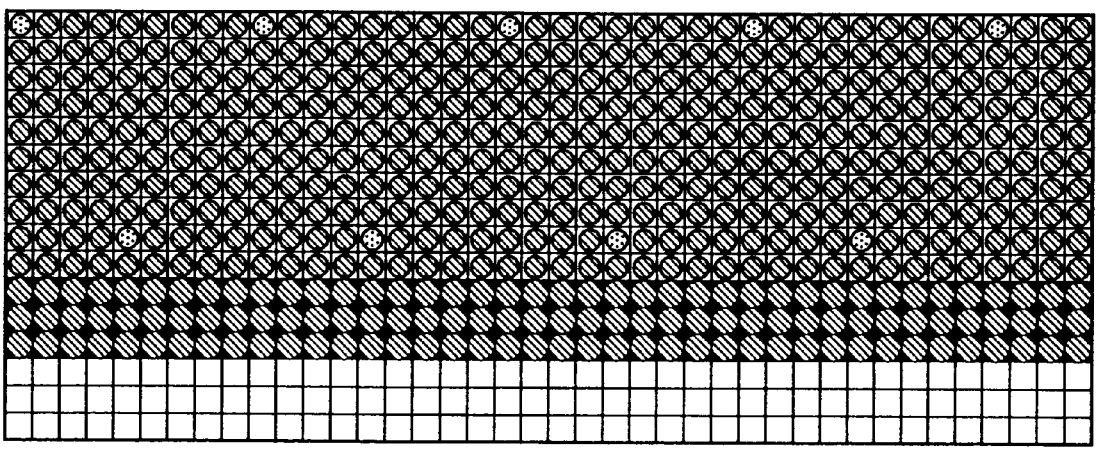
Figure 23C:
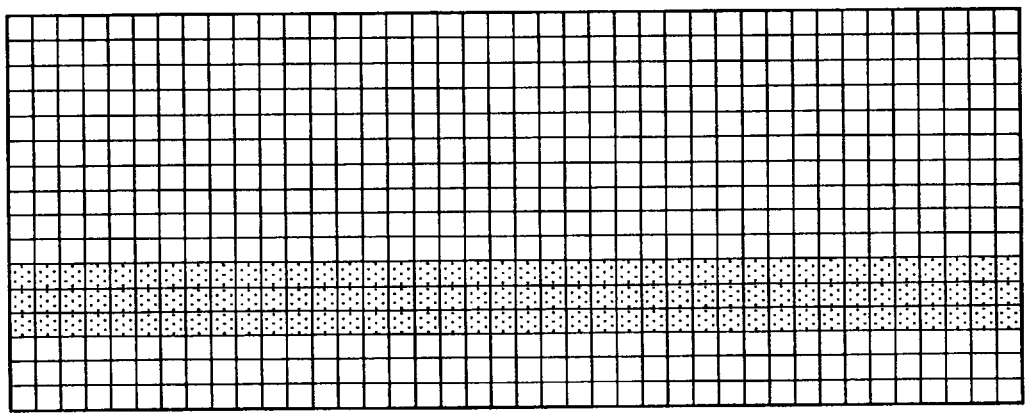
Figure 23D:
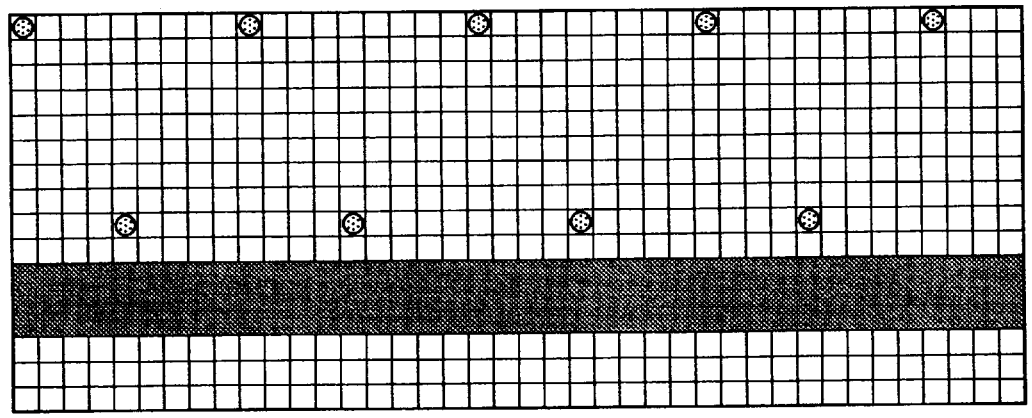

In the image shown in FIG. 20 in which very low-duty ink dots to be substituted are present in the background of a different type of ink, the boundary proximity-degree of a given dot surrounded by different types of ink dots in all directions is calculated to obtain a considerably great value. Thus, the given dot will be disadvantageously subjected to dot substitution. However, color mixture or bleeding, which may occur because such an isolated dot shown in FIG. 20 is adjacent to a different type of ink, does not appear to be so noticeable.

This is because this type of color mixture or bleeding is different from normal bleeding caused by color mixture between adjoining different types of ink dots . That is, in the above-described case, color mixture or bleeding occurs because ink forming a plurality of dots adjacent to a given dot spreads into dots of a different color ink. It is very unlikely that color mixture or bleeding occurs to a single dot which has a very small amount of ink. Namely, it is necessary that dot substitution not be performed on an isolated dot or a dot forming a ruled line even though a greater value of boundary proximity-degree is obtained.

In order to achieve this object, in this embodiment the boundary proximity-degree of a given dot with respect to a dot of a different color ink is determined, and simultaneously, the proximity degree of the same type of ink is also detected. Upon these determinations, even though the boundary proximity-degree exhibits a considerably large value, the resulting data is stored in a lower rank of the boundary proximity degree if the proximity degree of the same type of ink is small, whereby the execution of dot substitution can be avoided.

A flow chart illustrating this embodiment is shown in FIG. 19, which is comprised of FIGS. 19A to 19C.

When a start printing instruction is given (S500), data items of the respective colors Y, M, C and Bk are stored in the work buffers of the respective Y, M, C and Bk colors (S501 and S503). Subsequently, calculations are made to the boundary proximity-degrees of the respective color dots around a given Bk dot in a peripheral n×m-pixel (9×9-pixel in this embodiment) region (S504). The boundary proximity-degrees (Y, M, C) of the respective colors are added to obtain the overall boundary proximity-degree of the given dot (S505).

Then, the number of Bk dots present in a peripheral n×m-pixel (5×5-pixel in this embodiment) region around the given dot is counted to obtain the Bk proximity degree (S506). Although in this embodiment the number of Bk dots present in 5×5 pixels is simply determined to be the Bk proximity degree, a weight coefficient may further be assigned to each pixel in the same region. If the boundary proximity-degree of the given dot is greater than 4.675 (S507), but if the Bk proximity degree is smaller than 5 (S508), the data is stored in the boundary proximity-degree storing buffer 1 (S510). In other cases, the boundary proximity-degree of the given dot is stored in the corresponding rank of the boundary proximity-degree storing buffers 1 to 4 (S509).

Upon completion of processing for one line (S511), the logical AND between the respective colors of the PCBk conversion masks (1 to 4) and the data stored in the respective ranks of buffers is carried out (S512). The logical OR among the resulting AND of the respective ranks of the colors (Y,M,C) is further carried out, and the resulting recording data is added to the respective colors of the original print buffers (S513). The logical OR among the resulting AND of the respective ranks of Bk buffer is executed, and the resulting recording data is substituted for data stored in the original Bk print buffer (S514).

In the manner described above, even though the boundary proximity-degree of a given dot with respect to a dot of a different type of ink is considerably large, dot substitution is not performed if the proximity degree of the same type of ink is small. According to this method, dot substitution can be performed only for dots requiring such processing, thereby enabling high-quality recording.

In this embodiment, all the above-described control means centrally exercise control in the control unit within the recording apparatus. However, the foregoing data processing method may be expanded to a method in which all the control means may be executed by use of a printer driver stored in external unit resources so that the actual data to be recorded which has been subjected to dot substitution can be received in the recording apparatus. In most cases, the external device connected to a recording apparatus is a personal computer which is dominant over the recording apparatus in the CPU's throughput and RAM capacity required for executing the foregoing processing.

Accordingly, the present invention is applicable not only to ink jet recording apparatuses, but also to processing means of external devices which exhibit excellent throughput, such as personal computers (host computers) and so on.

The construction and the operation other than hardware processing means for actuating the boundary proximity-degree detection means and the boundary-pixel conversion means are similar to those used in the foregoing embodiments. An explanation thereof will thus be omitted.

As is clearly seen from the foregoing description, the foregoing embodiments offer the following advantages.

The proximity degree between adjacent different types of inks in a boundary therebetween is detected. Original recording pixels are substituted with pixels of another type of ink in accordance with the detected proximity-degree, i.e., the degree of positional proximity between different types of ink pixels. This makes it possible to offer improved quality of recorded images even though different types of inks are adjacent to each other.

Also, mask processing is performed only when dots required to be substituted are present, thereby preventing the undesired matching between a mask and an image pattern. Moreover, boundary proximity-degrees are calculated on a plurality of pixel areas obtained by dividing a pixel region around a given dot, whereby the overall boundary proximity-degree between different types of inks can be assessed with higher precision. Further, the proximity degree of the same type of ink, in addition to the boundary proximity-degree between different types of inks, is assessed, and upon this assessment, dot substitution is not performed on an isolated dot and a dot forming a ruled line. According to these arrangements, improved quality of recorded images can be offered while different types of inks are adjacent to each other.

Eighth Embodiment

Figure 24:
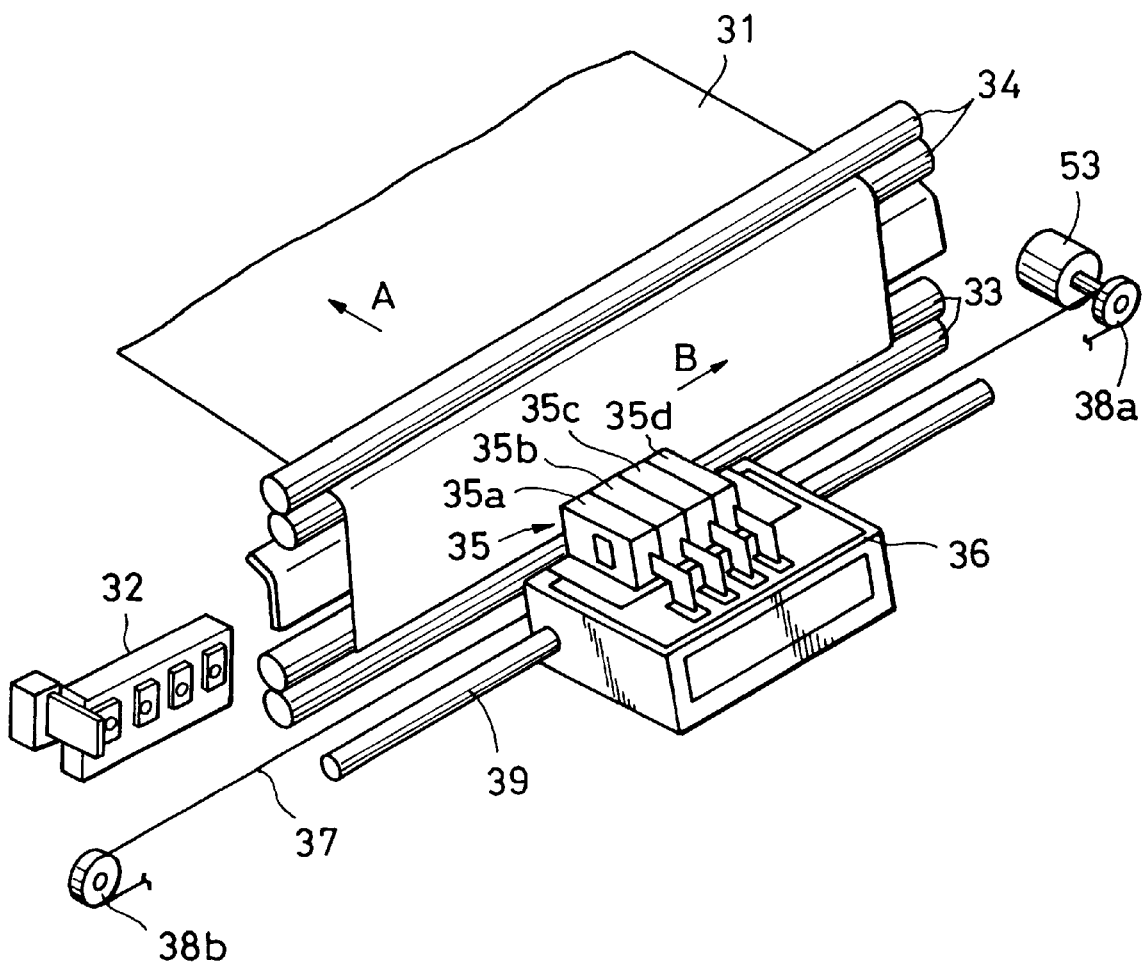
FIG. 24 is a perspective view of the essential portion of the construction of a recording apparatus to which the present invention is applicable.

FIG. 24 is a perspective view illustrating an ink jet recording apparatus to which the present invention is applicable.

An explanation will first be given of the overall construction of the apparatus. Referring to FIG. 24, a plurality of recording sheets 31 formed of paper or plastic sheets and stacked in a cassette are supplied one by one by a paper-feed roller (not shown). Then, the sheets 31 are fed in the direction indicated by the arrow A by a pair of first feed rollers 33 and a pair of second feed rollers 34, the two pairs of rollers 33 and 34 being located at a predetermined pitch and being driven by respective stepping motors (not shown).

An ink jet recording head 35 for performing recording on the recording sheet 31 is loaded with four head units 35a–35d. Ink is supplied from an ink cartridge (not shown) and is ejected from nozzles based on ejection signals. The recording head 35 and the ink cartridge are mounted on a carriage 36 which is interconnected to a carriage motor 53 via a belt 37 and pulleys 38a and 38b. Accordingly, the carriage 36 is adapted to scan in a reciprocating manner along a guide shaft 39 when the carriage motor 53 is driven.

With this construction, the recording head 35 ejects ink onto the recording sheet 31 while moving in the direction indicated by the arrow B so as to record an ink image onto the sheet 31. If necessary, the head 35 returns to the home position so as to recover nozzle clogging by an ink recovery device 32. At the same time, the feed rollers 33 and 34 are driven to feed the recording sheet 31 for one line in the direction indicated by the arrow A. This process is repeated to perform predetermined recording on the recording sheet 31.

An explanation will now be given of a control system for driving the respective elements of the above-described recording apparatus.

Figure 25:
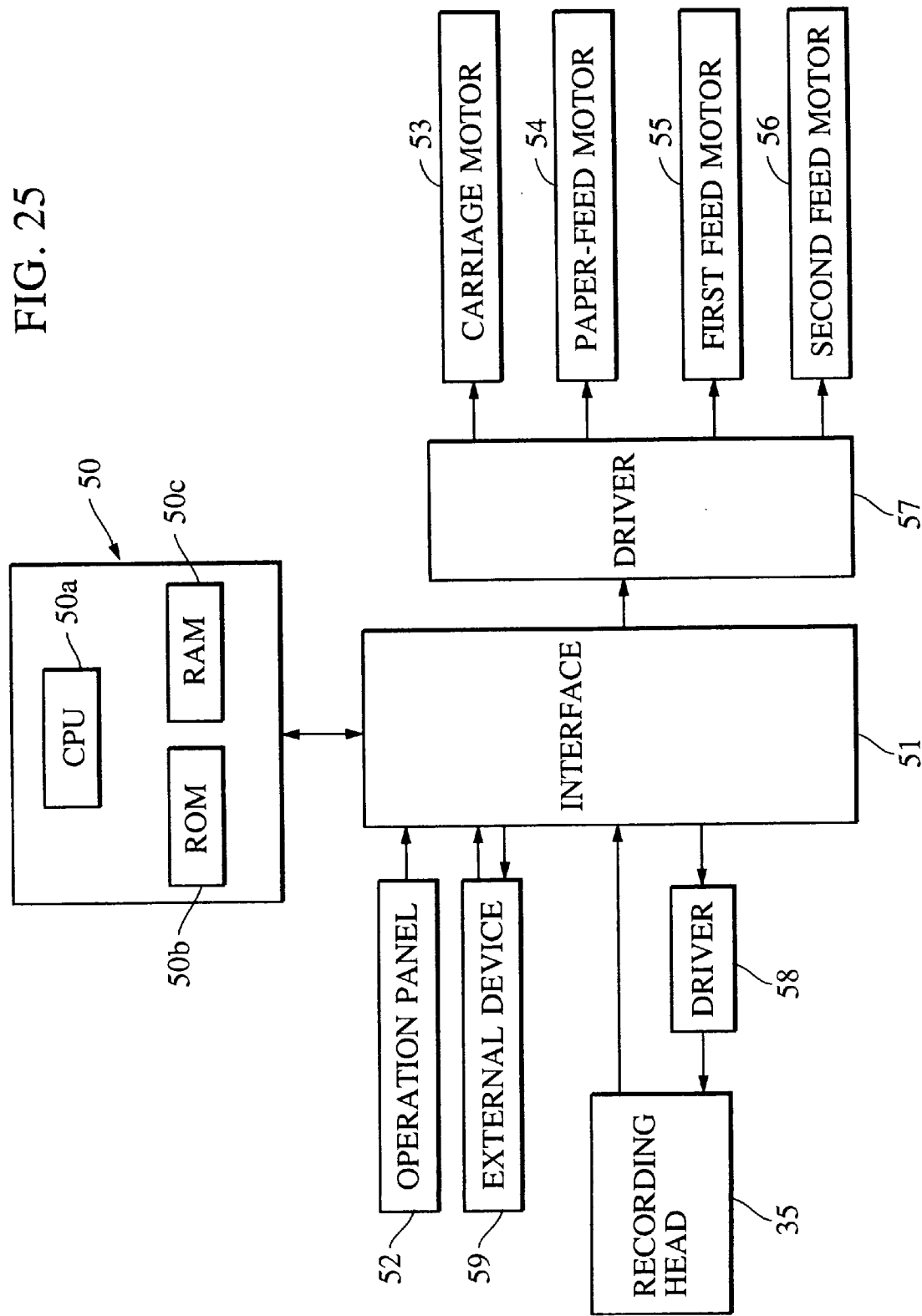
FIG. 25 is a block diagram illustrating the logic of a recording apparatus to which the present invention is applicable.

As illustrated in FIG. 25, this control system comprises: a control unit 50 including a CPU 50a, for example, a microprocessor, a ROM 50b for storing a control program of the CPU 50a, various types of data and various conditions, etc., and a RAM 50c which is used as a work area for the CPU 50a and temporarily stores various types of data therein, and so on; an interface 51; an operation panel 52; a driver 57 for driving various motors (a carriage-driving motor 53, a paper-feed motor 54, a first feed roller-driving motor 55, and a second feed roller-driving motor 56); and a recording head driver 58.

The control unit 50 receives various information (for example, character pitch and character type) from the operation panel 52 and inputs/outputs (I/O) image signals from/to an external device 59 via the interface 51. Further, the control unit 50 outputs ON/OFF signals and image signals for driving the respective motors 52–56 via the interface 51, whereby the respective elements are driven based on the output image signals.

When the foregoing penetrating-type color ink and the drying-type Bk ink are used for the ink jet recording head to perform color printing, Bk images may disadvantageously be excessively subjected to PCBk conversion.

Figure 26A:
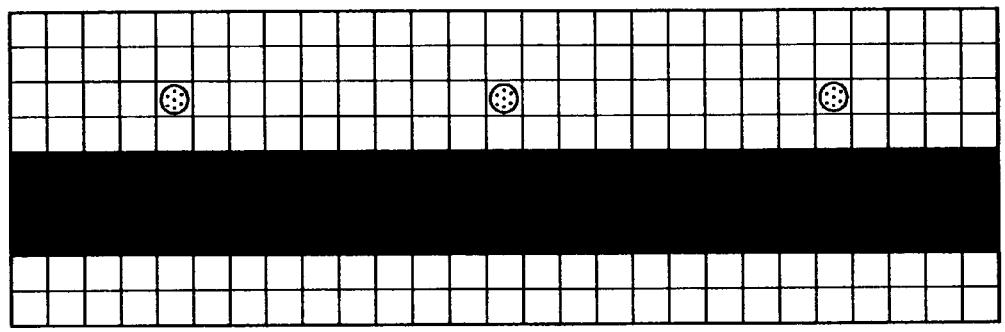
FIGS. 26(a) to 26(f) illustrate steps of converting an image boundary.

An example of this excessive PCBk conversion will be given with reference to FIG. 26. FIG. 26(a) is an original image in which a belt-like solid region is an original Bk image region, while portions indicated by round dots above the original Bk image are a color image region. The ink jet recording apparatus used in this embodiment has 360 DPI (dot per inch) resolution, and the dot size is approximately 100 μm. For obtaining a 100-μm recording dot, the ejection amount of the penetrating-type color ink (Y, M, C) is approximately 40 ng/dot, while the ejection amount of the drying-type Bk ink is approximately 80 ng/dot.

A PCBk region required for inhibiting bleeding in a boundary in which a high-duty color image region and a Bk image region are adjacent to each other is formed of about a four-dot-width region. The ratio of the Bk dots which should be subjected to PCBk conversion to the Bk dots which do not need to undergo PCBk conversion for making the PCBk image appear as close as possible to the BK image printed in Bk ink is 50:50. Although in this embodiment PCBk conversion is performed by use of only C ink for simple explanation, the other types of inks, i.e., Y and M inks, are also preferably used for PCBk conversion, as has been discussed above. Since a region required for PCBk conversion is a 4-dot-width region, boundary detection and boundary conversion are carried out based on a bold-faced image obtained by expanding each of the above-described color dots to an amount equivalent to four dots in each of left, right, upward and downward directions from the color dot, i.e., peripheral 9×9 dots around the color dot.

Figure 26B:
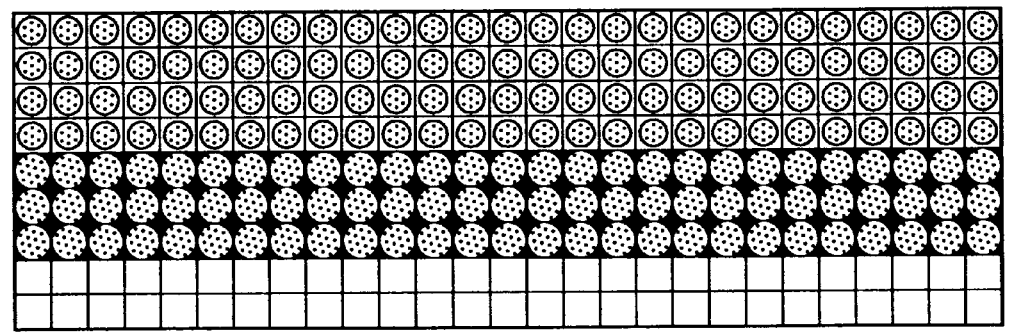
Figure 26C:
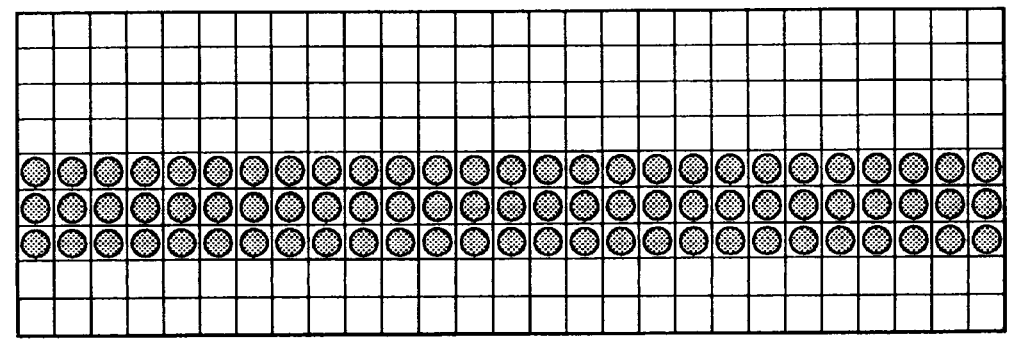

FIG. 26(b) is a bold-faced color image obtained by expanding each of the above-described color dots to peripheral 9×9 dots around each color dot. The resulting bold-faced color image is partially overlapped with the Bk image region. The logical AND is executed between the bold-faced color image and the Bk image for detecting the boundary results in the boundary shown in FIG. 26(c), which will be subjected to PCBk conversion.

Figures 26D, 26E, 26F:
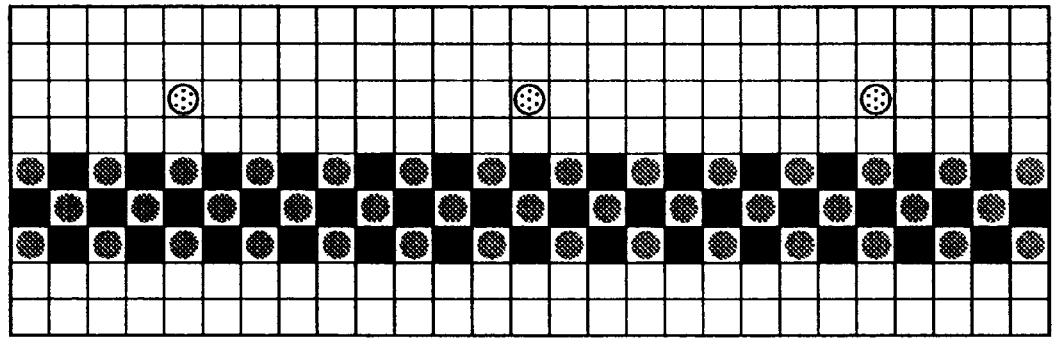

FIG. 26(f) illustrates a PCBk mask, and such a mask pattern is repeatedly expanded to result in the pattern shown in FIG. 26(d). As a result of the logical AND between the dots to be subjected to PCBk conversion shown in FIG. 26(c) and the mask pattern shown in FIG. 26(d), the significant image dots are formed into a C image, and are also removed from the Bk image, thus producing a final recording image shown in FIG. 26(e).

FIGS. 26(a) to 26(f) show that a half of the Bk original image is substituted for the C image, but it is apparently not necessary to effect PCBk conversion at such a conversion ratio on a Bk image adjacent to a very-low duty color image as to result in the image shown in FIG. 26(e), which causes the previously-discussed various problems inherent in PCBk conversion.

In this embodiment, the aforementioned problems are solved by controlling the extent of PCBk conversion in accordance with the degree of bleeding. This will be specifically explained with reference to the drawings.

Figure 27:
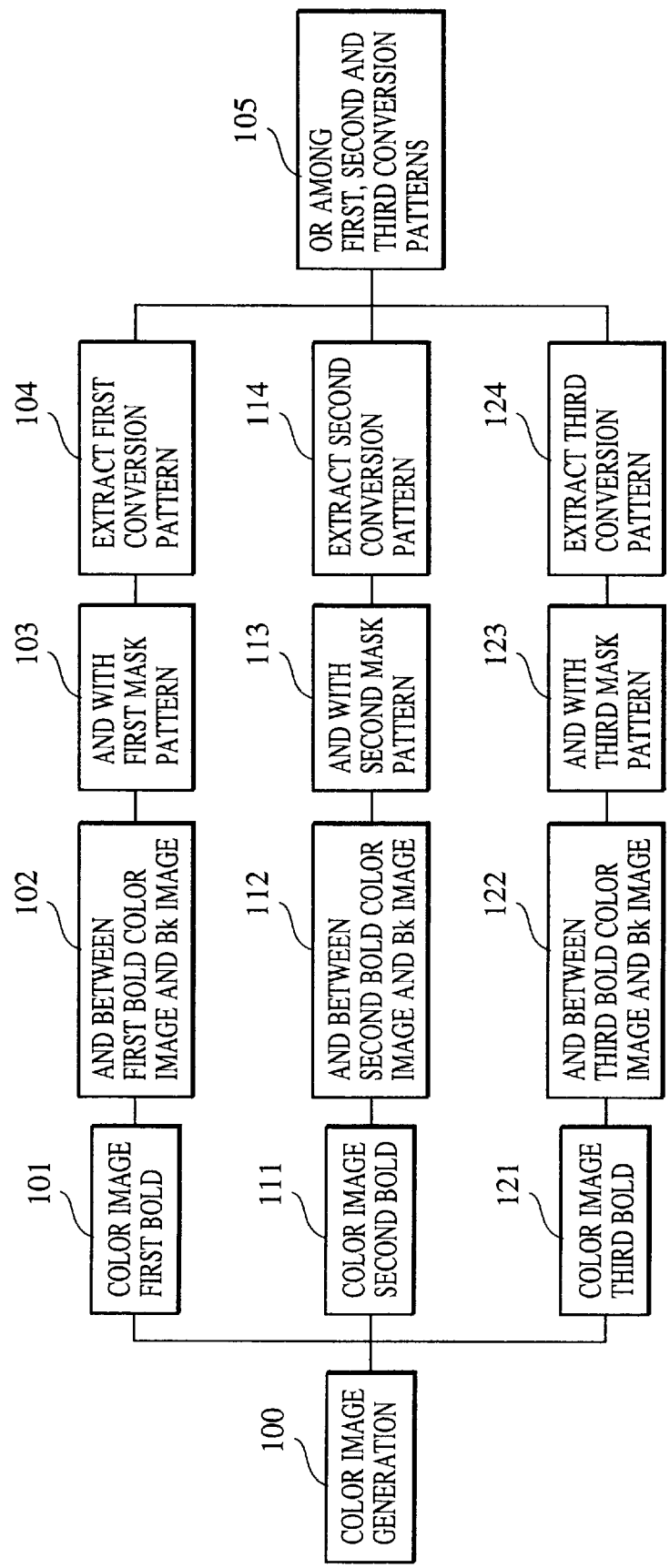
FIG. 27 is a block diagram illustrating an eighth embodiment.

FIG. 27 is a block diagram of a control structure illustrating the essential portion of this embodiment. FIG. 27 shows that boundary detection and boundary conversion are each performed three times, and the region subjected to boundary detection changes every time. As will be described below with reference to FIGS. 28–30, for the smaller region provided for boundary detection, a PCBk mask having a larger conversion ratio from Bk dots to color dots (C dots in this embodiment) will be employed.

Figure 28A:
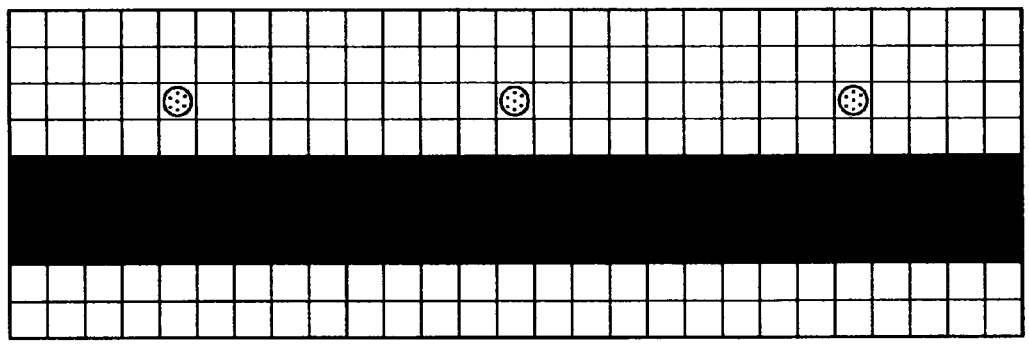
FIGS. 28(a) to 28(f) illustrate a first step of converting an image boundary according to the eighth embodiment.
Figure 28B:
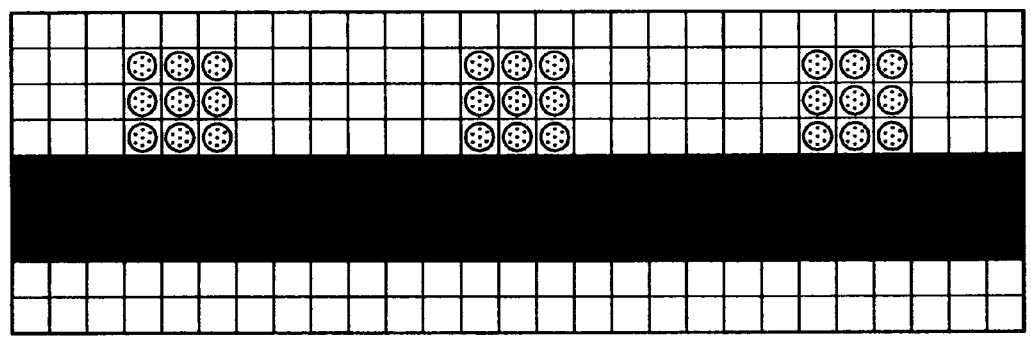

Referring to FIG. 27, the respective Y, M and C original images are subjected to the logical OR to obtain a color image (100). First extraction of PCBk conversion dots is carried out with respect to the color image. FIG. 28 illustrates in detail the first extraction of conversion dots. FIG. 28(a) illustrates an original image which is similar to that shown in FIG. 26(a). First boundary detection is performed on the original image shown in FIG. 28(a) by expanding each color dot to one-dot width in each of left, right, upward and downward directions, i.e., peripheral 3×3 dots around the color dot, resulting in the image shown in FIG. 28(b) (101 of FIG. 27).

Figure 28C:
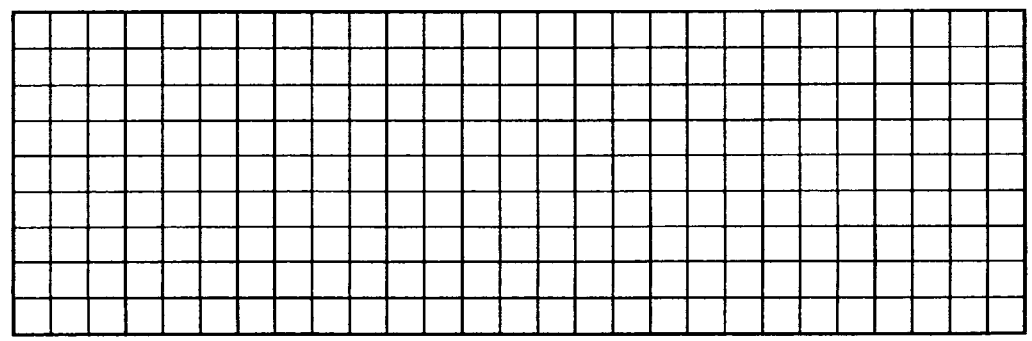
Figures 28D, 28E, 28F:
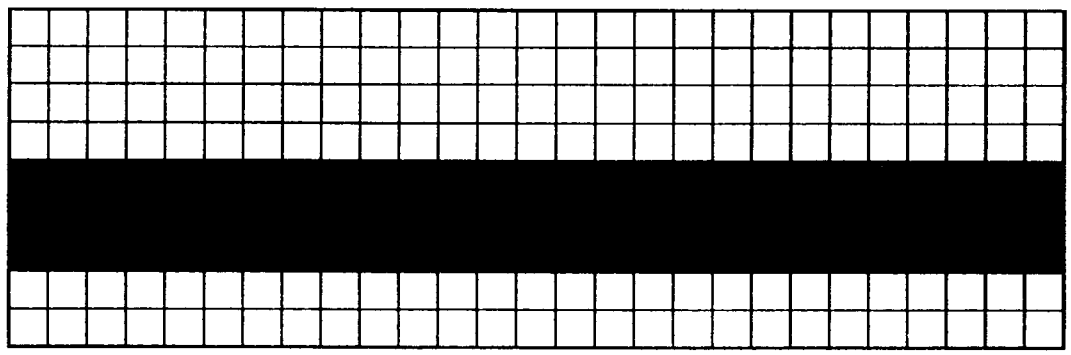

In this embodiment, a boundary cannot be extracted by bold-facing peripheral 3×3 dots around each color dot (see FIG. 28(c)), which inevitably does not obtain a portion to be converted, as a result of the logical AND with the pattern shown in FIG. 28(d) obtained by expanding the PCBk mask pattern shown in FIG. 28(f). Hence, PCBk conversion is not performed (102–104 of FIG. 27). The PCBk mask shown in FIG. 28(f) is a conversion mask pattern which is applicable to a portion which is most susceptible to bleeding when a boundary can be detected by bold-facing the peripheral 3×3 dots around the color pixel, thus exhibiting a higher conversion ratio (50:50) than the other PCBk masks.

The signals 1 appearing in the dots shown in FIG. 28(d), that is, signals forming a significant image as a result of carrying out the logical AND between the signals and the boundary image, indicate Bk pixels to be converted into C ink pixels in this embodiment, while the signals 0 represent Bk dots which are detected in a boundary but will not be subjected to PCBk conversion and will thus be recorded in Bk ink.

FIG. 29 illustrates in detail second extraction of conversion dots. FIG. 29(a) shows the original image. Second boundary detection is performed by bold-facing two-dot width in each of left, right, upward and downward directions, i.e., peripheral 5×5 dots around the color dot, resulting in the image shown in FIG. 29(b) (111 of FIG. 27).

Figure 29A:
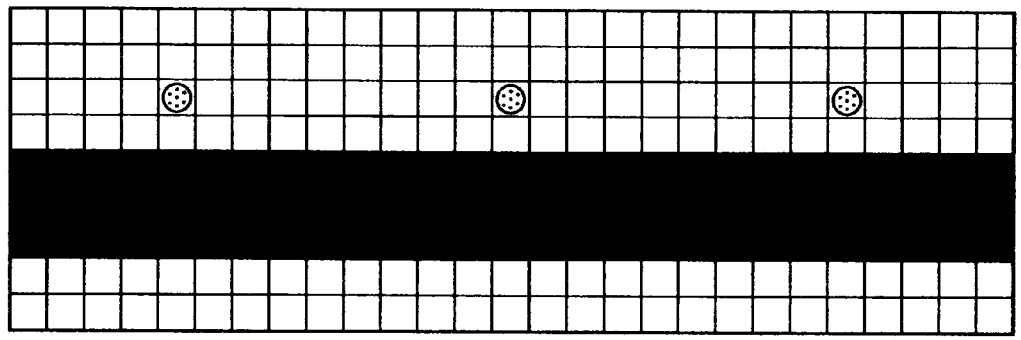
FIGS. 29(a) to 29(f) illustrate a second step of converting an image boundary according to the eighth embodiment.
Figure 29B:
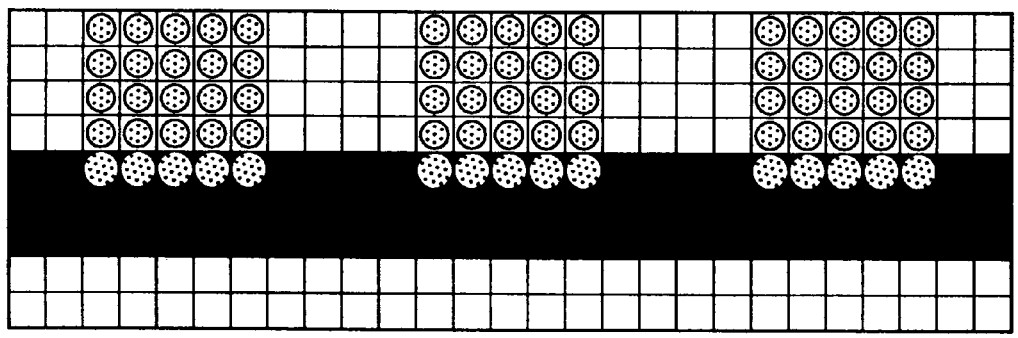
Figure 29C:
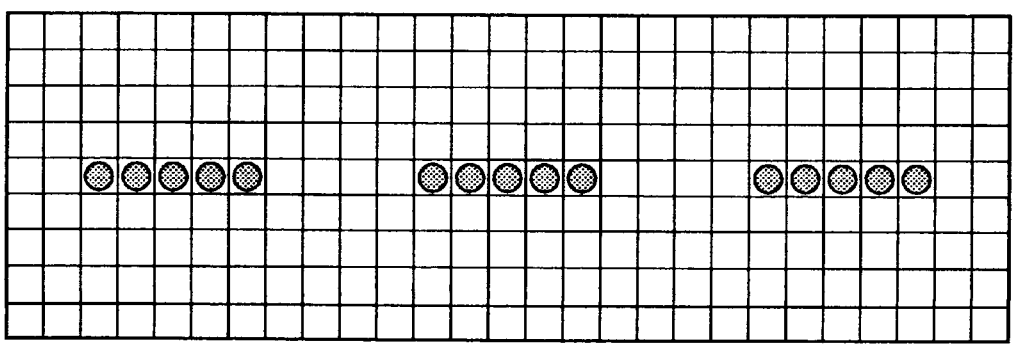
Figures 29D, 29E, 29F:
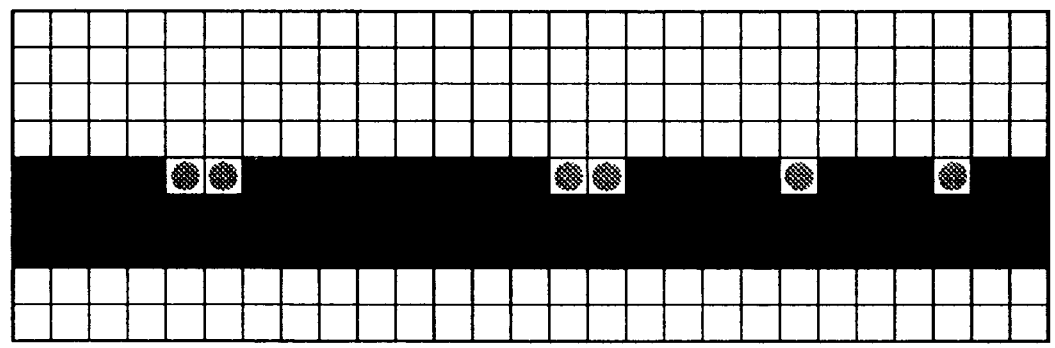

FIG. 29(b) shows that the image obtained by bold-facing the peripheral 5×5 dots around the color dot is partially overlapped with the Bk original image, whereby the boundary can be extracted, as indicated by FIG. 29(c) (112 of FIG. 27). The boundary shown in FIG. 29(c) and the pattern shown in FIG. 29(d) obtained by expanding the PCBk mask pattern shown in FIG. 29(f) are subjected to the logical AND to obtain a PCBk conversion portion (113 of FIG. 27). In the second PCBk conversion step, the Bk original image is partially subjected to PCBk conversion (conversion to C pixels in this embodiment), as shown in FIG. 29(e) (114 of FIG. 27). The second conversion mask pattern is applicable when a boundary can be detected by bold-facing the peripheral 5×5 pixels around each pixel of the color image and also applicable when a color image and a Bk image are adjacent to each other across a distance equivalent to one-dot width, thus exhibiting a slightly lower conversion ratio of black pixels to color pixels (3:7) than the PCBk mask used in the first conversion.

FIG. 30 illustrates in detail final extraction of conversion dots in this embodiment. FIG. 30(a) shows the original image. Third boundary detection is performed by bold-facing four-dot width in each of left, right, upward and downward directions around each color dot, i.e., peripheral 9×9 dots around the color dot, as shown in FIG. 30(b) (121 of FIG. 27).

Figure 30A:
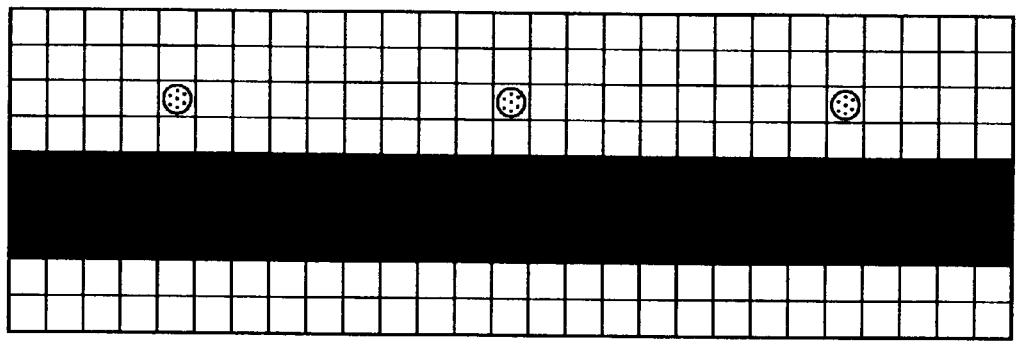
FIGS. 30(a) to 30(f) illustrate a third step of converting an image boundary according to the eighth embodiment.
Figure 30B:
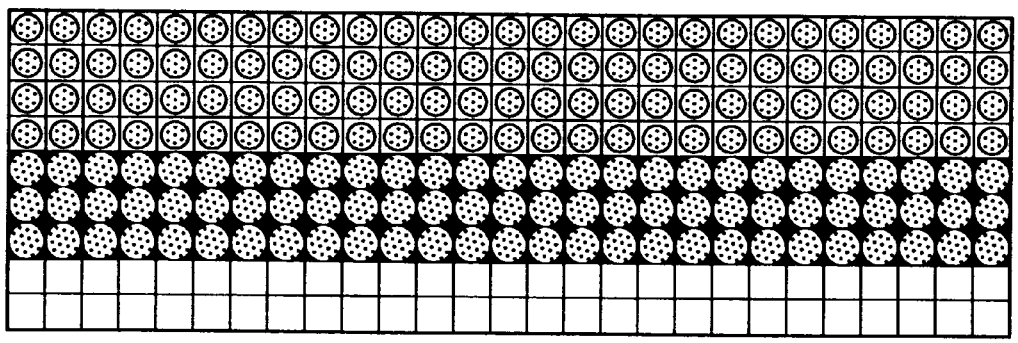
Figure 30C:
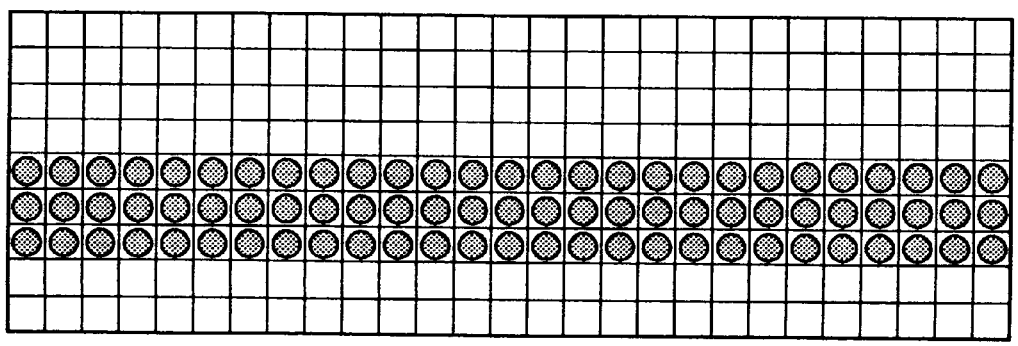
Figures 30D, 30E, 30F:
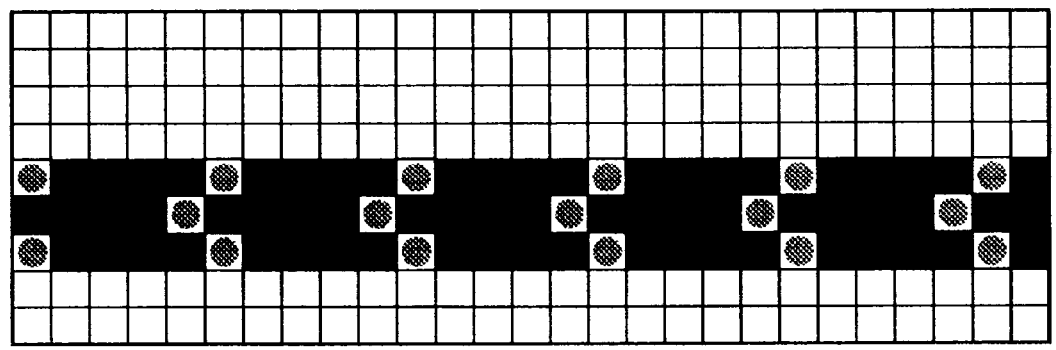

As illustrated in FIG. 30(b), the resulting bold-faced image is completely overlapped with the Bk original image, whereby a boundary can be extracted, as shown in FIG. 30(c) (122 of FIG. 27). The detected boundary shown in FIG. 30(c) and the pattern obtained by expanding the PCBk mask pattern shown in FIG. 30(f) is subjected to the logical AND to obtain a PCBk conversion portion shown in FIG. 30(e) (123 of FIG. 27). In the third PCBk conversion step, a considerable number of Bk original image dots are subjected to PCBk conversion, as shown in FIG. 30(e) (124 of FIG. 27). The final conversion mask pattern is applicable when a boundary can be detected by bold-facing the peripheral 9×9 dots around each color dot and also applicable when a color image and a Bk image are located across a larger distance. Accordingly, the mask pattern exhibits an even lower conversion ratio of black pixels to color pixels (2:8) than the first and second PCBk masks.

FIG. 31 illustrates steps for correcting to a final recording image the conversion images extracted in a plurality of PCBk conversion steps described above.

Figure 31A:
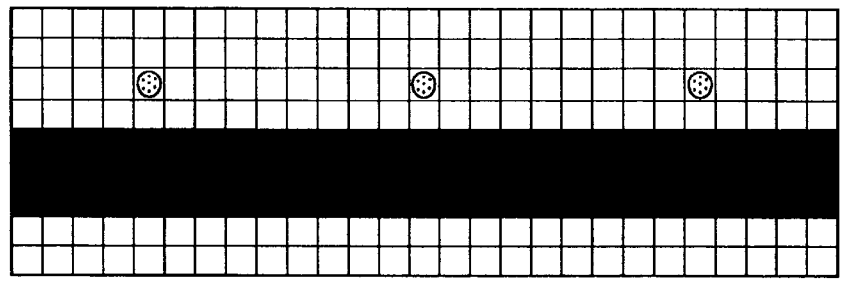
FIGS. 31(a) to 31(e) illustrate steps of converting an image boundary.
Figure 31B:
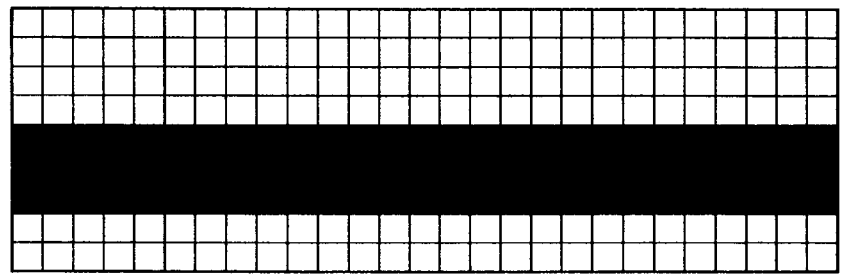
Figure 31C:
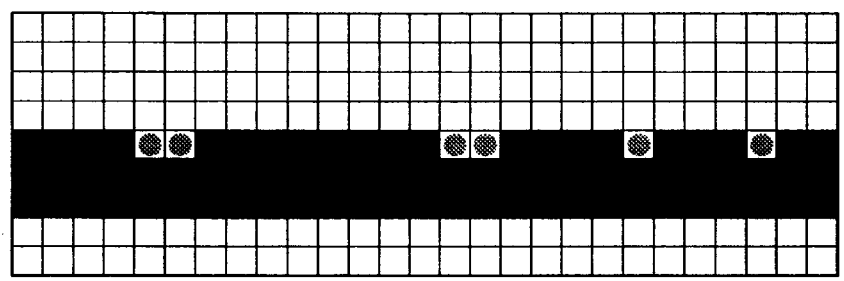
Figure 31D:
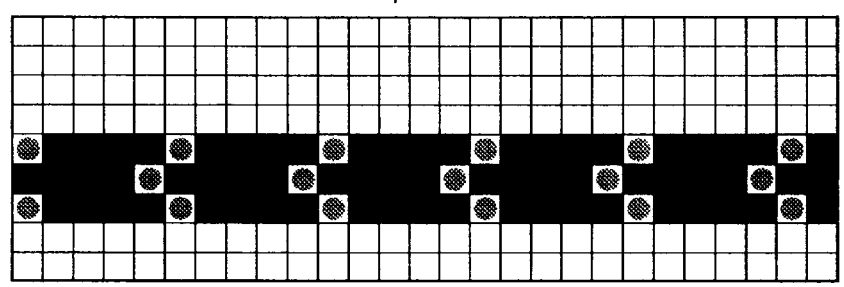
Figure 31E:
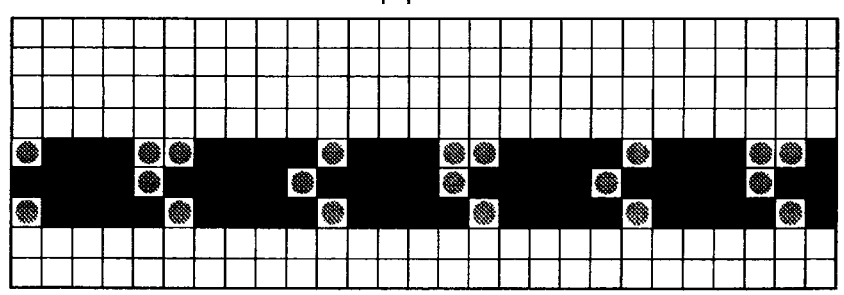

FIG. 31(a) illustrates the original image, and FIGS. 31(b), 31(c) and 31(d) show the conversion pixels extracted by the first, second and third detection steps, respectively. In this embodiment, conversion pixels are not detectable by the first detection step. The Bk pixels shown in FIG. 31(a) are substituted with C pixels through the conversion steps shown in FIG. 31(b), 31(c) and 31(d), and further converted to the final image (105 of FIG. 27).

It is apparent that the number of PCBk-converted pixels are smaller than the number of pixels subjected to PCBk conversion according to the previously-proposed method shown in FIG. 26(e). However, if an original image has a higher color duty than the image shown in FIG. 31, or if an original image is constructed such that a color pixel is more adjacent to a Bk original pixel than the image shown in FIG. 31, though both images have the same color duty, the larger number of original Bk image pixels are subjected to PCBk conversion according to the above-described algorithm under the same mask conditions of this embodiment. In other words, according to this method, PCBk conversion can be precisely performed in accordance with the color duty and the position of color pixels with respect to black pixels.

In this embodiment, boundary detection is performed a plurality of times in different detection regions, that is, under different conditions. The smaller a region provided for boundary detection, the greater possibility of converting Bk pixels to color pixels, that is, PCBk conversion is conducted at the higher PCBk conversion ratio. With this arrangement, the PCBk conversion ratio can be optimally controlled according to the needs, such as print duty conditions in a boundary, thus minimizing the problems inherent in PCBk conversion.

For converting a Bk image, a Bk region more adjacent to a color image is converted to color dots at a higher PCBk conversion ratio, whereby the PCBk conversion region can be presented in gradations, thereby minimizing PCBk conversion. Hence, it is possible to reduce PCBk conversion to a minimum required level according to the needs of the degree of conversion, thus offering improved quality of recorded images, without being influenced by the characteristics of recording ink.

Although in this embodiment boundary detection is carried out from a smaller region to a larger region, the order of detection steps may be reversed.

Ninth Embodiment

An explanation will further be given of a method of performing PCBk conversion more effectively.

In the eighth embodiment, the PCBk mask patterns of the same size are used for the respective step of PCBk conversion. Under the conditions for the eighth embodiment, since bold-facing is effected on peripheral one dot-width pixels, i.e., 3×3 pixels around each color pixel for the first step of PCBk conversion, the extracted boundary is restricted to only a one dot-width region when a color pixel and a Bk pixel are directly adjacent to each other. Accordingly, a (2*5)-pixel mask used in the eighth embodiment is not necessary for this conversion.

On the other hand, since bold-facing is effected on four dot-width pixels, i.e., peripheral 9×9 pixels around each color pixel for the third step of PCBk conversion, the extracted boundary results in a one dot-width region when a color pixel and a Bk pixel are separated from each other across a three-pixel width. However, when a color pixel and a Bk pixel are directly adjacent to each other, the boundary results in a four dot-width region. Consequently, it is preferable to employ a mask equivalent to or larger than a (4*9)-pixel mask rather than the (2*5)-pixel mask used in the eighth embodiment, which makes it possible to convert a boundary detected with respect to one pixel by use of only one mask, thereby minimizing errors of expanding a mask pattern. That is, for performing a plurality of times of boundary detection for different regions so as to carry out PCBk conversion, the PCBk mask used for boundary detection with respect to a larger region is preferably larger than the PCBk mask for carrying out boundary detection with respect to a smaller region.

In this embodiment, the different sizes of masks are used in accordance with the regions provided for boundary detection, as shown in FIG. 32. A (1×4)-pixel size mask is employed for effecting bold-facing on one dot-width color pixels, as shown in FIG. 32(a). A (2×5)-pixel size mask is used for effecting bold-facing on two dot-width color pixels, as illustrated in FIG. 32(b). A (4×9)-pixel size mask is employed for effecting bold-facing on four dot-width color pixels, as illustrated in FIG. 32(c).

In the manner described above, in this embodiment, for carrying out a plurality of boundary detections for different regions to perform PCBk conversion, the PCBk mask size used for performing boundary detection for a larger region is set larger than the mask size used for boundary detection for a smaller region. With this arrangement, a boundary extracted with respect to one color pixel will be most probably converted by use of only one mask, thus realizing more efficient and precise PCBk conversion. Additionally, since a plurality of sizes of mask patterns are used, an occurrence of matching between a mask pattern and an image pattern discussed above can be reduced, thereby obtaining improved quality of recorded PCBk images.

Although in this embodiment PCBk conversion masks are employed to perform boundary conversion, the following means may be used, instead. In place of determining dots to be converted by the logical AND between the detected boundary and the mask pattern, signals 1 and 0 may be generated in a prescribed order every time a boundary is extracted, and only pixels provided with the signals 1 may be subjected to PCBk conversion.

For example, boundary detection is performed by effecting bold conversion on one dot-width color pixels. If the conversion ratio of the resulting boundary subjected to PCBk conversion is 50%, as in the eighth embodiment, raster search may be performed on the boundary so that signals 1 and 0 may be alternately generated every time dots to be converted are produced, and only pixels provided with signals 1 may be subjected to PCBk conversion. In this modification, too, the following arrangement is preferably set. That is, the larger the region for boundary detection, the lower the probability of generating the signals 1, i.e., the frequency of PCBk conversion from Bk pixels to color pixels. Additionally, instead of alternately generating signals 1 and 0, random number generating means for generating signals 1 at a prescribed probability may be used to generate signals 1 and 0.

The constructions other than the PCBk conversion mask and advantages are similar to those obtained in the eighth embodiment, and an explanation thereof will thus be omitted.

Tenth Embodiment

An explanation will now be given of controlling the PCBk conversion ratio depending on external factors other than the image pattern, such as the temperature of a recording head.

In the foregoing embodiment, the boundary PCBk mask patterns are primarily determined by the image pattern in a boundary. However, since PCBk conversion is performed for the purpose of preventing ink bleeding, a method of PCBk conversion, i.e., PCBk conversion masks, are preferably optimized depending on various conditions for recording.

In view of this background, in this embodiment the selection of PCBk conversion masks is corrected in accordance with the temperature of a recording head which produces an influence on the ejection amount per dot ejected from the recording head. When the temperature of the recording head is increased, the following control is exercised. The temperature rise of the recording head increases the ejection amount so as to disadvantageously deteriorate the degree of bleeding in the boundary. Accordingly, the ratio of Bk ink during PCBk conversion is reduced, while the ratio of another color of ink is increased, thereby preventing bleeding.

Figure 33:
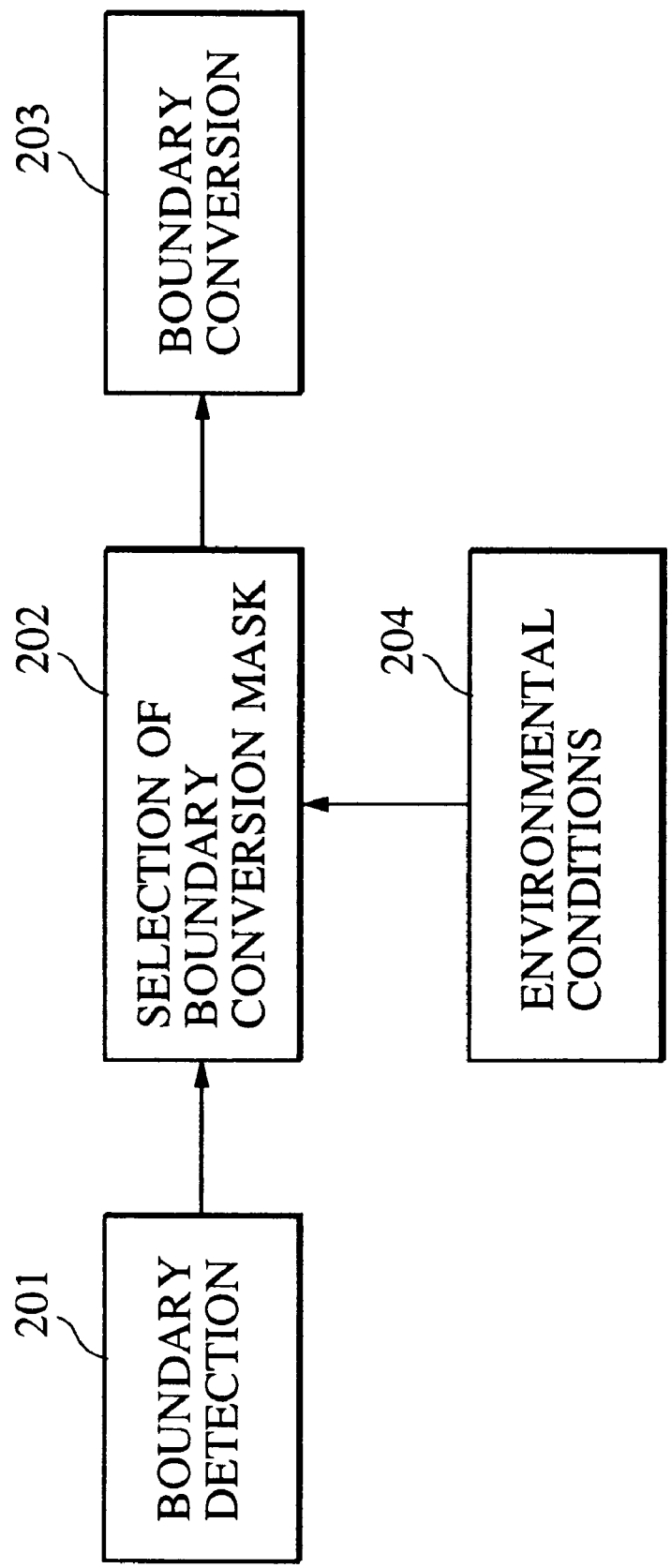
FIG. 33 is a block diagram illustrating a tenth.

FIG. 33 is a block diagram illustrating a control structure of this embodiment. Referring to FIG. 33, boundary detection is performed from original image data in 201 in a manner similar to the foregoing embodiments. Then, a conversion mask used for partially converting a Bk image in the boundary detected in 201 to a Y, M and C image is selected in 202. The conversion mask is selected in consideration of the area size (detection region) during boundary detection, as has been performed in the foregoing embodiments. In this embodiment, however, information on environmental condition (in this embodiment the temperature of the recording head) which may produce an influence on boundary bleeding is further input from 204 and added to 202. Upon selection of the conversion mask, control is exercised over conversion of a boundary image in 203 in a manner similar to the foregoing embodiments.

The detection of the temperature of the recording head is performed by detecting a change in resistance of a thermistor disposed on a base having a recording device mounted thereon. Many reports have been given on detection means for detecting the temperature of a recording head used in a recording method employed by the aid of heat emission, such as not only an ink jet method but also a thermal transfer method. Accordingly, such detection means is a known technique, and an explanation thereof will thus be omitted.

As described above, the conversion mask selection means selects the boundary conversion means for converting a boundary image, in consideration of environmental conditions which may affect the above-described boundary bleeding, such as the temperature of the recording head. The constructions other than the mask selection means and advantages are similar to those obtained in the foregoing embodiments, and an explanation thereof will thus be omitted.

The foregoing eighth, ninth and tenth embodiments have been explained in which all the above-described control means centrally exercise control in the control unit within the recording apparatus. However, the foregoing data processing method may be expanded to a method in which all the control means may be executed by use of a printer driver stored in external unit resources so that the actual recording data which has been subjected to dot substitution can be received in the recording apparatus. In most cases, the external device connected to a recording apparatus is a personal computer which is dominant over the recording apparatus in the CPU's throughput and RAM capacity required for executing the foregoing processing.

Accordingly, the present invention is applicable not only to ink jet recording apparatuses, but also to processing means of external devices which exhibit excellent throughput, such as personal computers (host computers) and so on.

The constructions and operations other than hardware processing means for actuating means for detecting the boundary proximity-degree between different types of ink pixels and also for actuating the boundary-pixel conversion means are similar to those used in the eighth, ninth and tenth embodiments. An explanation thereof will thus be omitted.

As will be clearly understood from the foregoing description, the eighth, ninth and tenth embodiments offer the following advantages.

The boundary conversion ratio can be optimally controlled in accordance with the print duty of a boundary, thus inhibiting the problems inherent in conversion boundary. Further, with respect to a Bk image to be converted, a Bk region more adjacent to a color image is converted to color dots at a higher PCBk conversion ratio, whereby the PCBk conversion region can be presented in gradations, thereby reducing PCBk conversion to a minimum required level. Hence, it is possible to perform minimum PCBk conversion according to the needs of the degree of conversion, thus offering high quality of recorded images regardless of the characteristics of recording ink.

The present invention is particularly suitable for use in an ink jet recording head and recording apparatus wherein thermal energy generated by an electrothermal transducer, a laser beam or the like is used to cause a change of state of the ink to eject or discharge the ink. This is because high density of the picture elements and high resolution of recording are possible.

The typical structure and the operational principle of such devices are preferably the ones disclosed in U.S. Pat. Nos. 4,723,129 and 4,740,796. The principle and structure are applicable to a so-called on-demand type recording system and a continuous type recording system. Particularly, however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the driving signals. By the production, development and contraction of the bubble, the liquid (ink) is ejected through an ejection outlet to produce at least one droplet.

The driving signal is preferably in the form of a pulse, because the development and contraction of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion, as well as the structure of the combination of the ejection outlet, liquid passage and the electrothermal transducer as disclosed in the above-mentioned patents. In addition, the present invention is applicable to the structure disclosed in Japanese Laid-Open Patent Application No. 59-123670 wherein a common slit is used as the ejection outlet for plural electrothermal transducers, and to the structure disclosed in Japanese Laid-Open Patent Application No. 59-138461 wherein an opening for absorbing pressure waves of the thermal energy is formed corresponding to the ejecting portion. This is because the present invention is effective to perform the recording operation with certainty and at high efficiency regardless of the type of recording head.

In addition, the present invention is applicable to a serial type recording head wherein the recording head is fixed on the main assembly, to a replaceable chip type recording head which is connected electrically with the main apparatus and which can be supplied with the ink when it is mounted in the main assembly, or to a cartridge type recording head having an integral ink container.

The provisions of recovery means and/or auxiliary means for the preliminary operation are preferable, because they can further stabilize the effects of the present invention. Examples of such means include a capping means for the recording head, cleaning means therefor, pressurizing or suction means, and preliminary heating means, which may be the electrothermal transducer, an additional heating element or a combination thereof. Also, means for effecting preliminary ejection (not for the recording operation) can stabilize the recording operation.

As regards the variation of the recording head, it may be a single head corresponding to a single color ink, or may be plural heads corresponding to the plurality of ink materials having different recording colors or densities. The present invention is effectively applied to an apparatus having at least one of a monochromatic mode for recording mainly with black ink, a multi-color mode for recording with different color ink materials and/or a full-color mode for using a mixture of the colors, which may be an integrally formed recording unit or a combination of plural recording heads.

Furthermore, in the foregoing embodiments, the ink has been liquid. It also may be ink material which is solid below room temperature but liquid at room temperature. Since the ink is kept within a temperature between 30° C. and 70° C., in order to stabilize the viscosity of the ink to provide the stabilized ejection in the usual recording apparatus of this type, the ink may be such that it is liquid within the temperature range when the recording signal is applied. The present invention is also applicable to other types of ink. In one of them, the temperature rise due to the thermal energy is positively prevented by consuming it for the state change of the ink from the solid state to the liquid state. Another ink material is solidified when it is left unused, to prevent the evaporation of the ink. In either of the cases, in response to the application of the recording signal producing thermal energy, the ink is liquefied, and the liquefied ink may be ejected. Another ink material may start to e solidified at the time when it reaches the recording material.

The present invention is also applicable to such, an ink material as is liquefied by the application of the thermal energy. Such an ink material may be retained as a liquid or solid material in through holes or recesses formed in a porous sheet as disclosed in Japanese Laid-Open Patent Application No. 54-56847 and Japanese Laid-Open Patent Application No. 60-71260. The sheet is faced to the electrothermal transducers. The most effective one of the techniques described above is the film boiling system.

The ink jet recording apparatus may be used as an output terminal of an information processing apparatus such as a computer or the like, as a copying apparatus combined with an image reader or the like, or as a facsimile machine having information sending and receiving functions.

Figure 34:
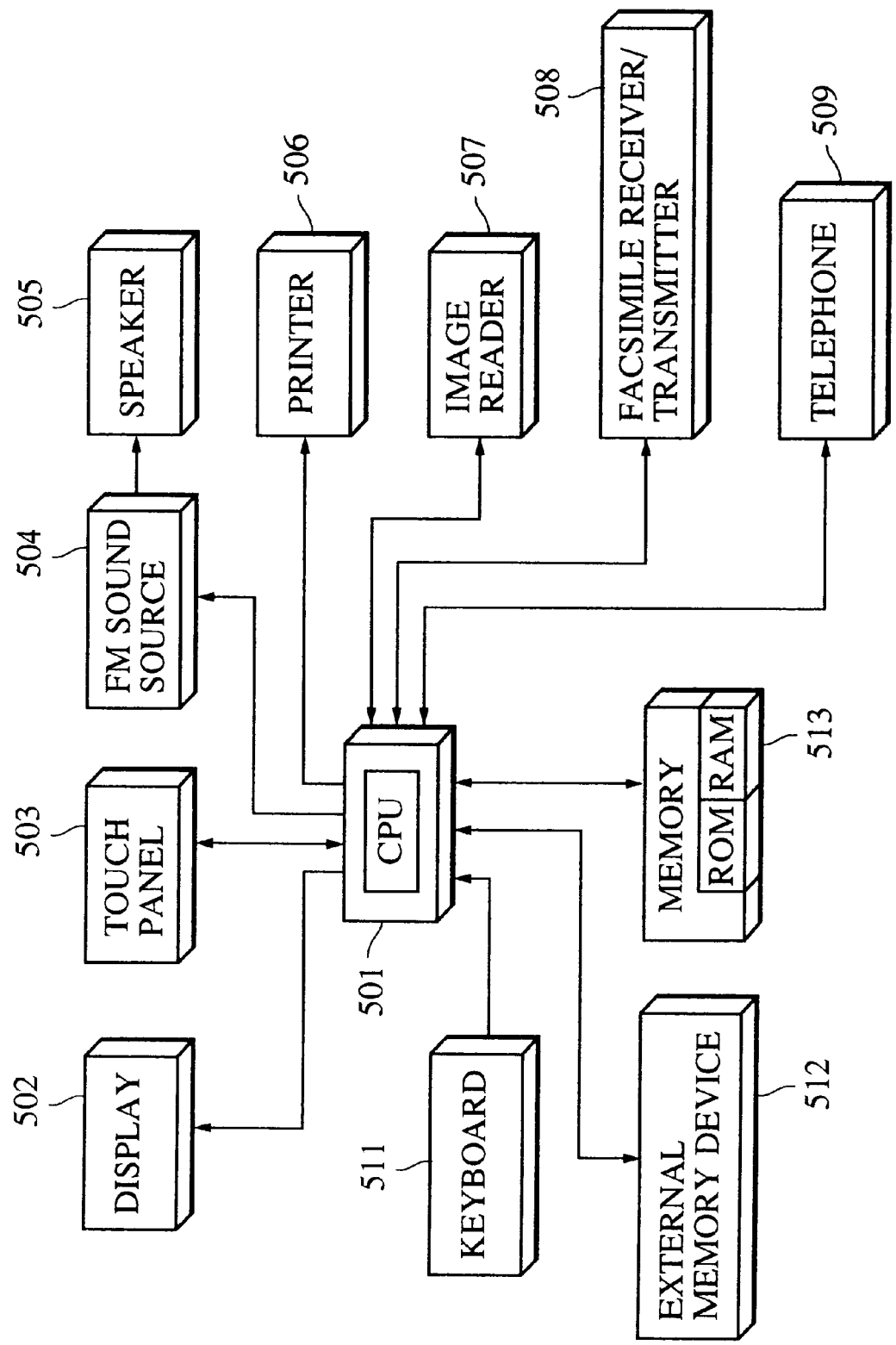
FIG. 34 is a block diagram showing a schematic configuration of an information processing apparatus in which the recording apparatus of the present invention is incorporated.

FIG. 34 is a block diagram showing a schematic configuration in which a recording apparatus of the present invention is applied to the information processing apparatus having the feature of word processor, personal computer, facsimile terminal equipment, and copying machine.

In the figure, 501 is a control unit for controlling the whole apparatus, wherein it comprises CPU such as a microprocessor or various I/O ports, and controls by outputting or inputting control or data signals to or from each of sections, respectively. 502 is a display section, which displays various menus, document information, and image data read with an image reader 507 on the display screen. 503 is a transparent, pressure sensitive touch panel provided on the display section 502, which enables the entry of items or coordinate values on the display section 502 by depressing its surface with a finger or the like.

504 is a FM (Frequency Modulation) sound source section, which makes the FM modulation for the music information created with the music editor, which is stored in the memory 510 and the external storage device 512 as the digital data. An electrical signal from the FM sound source section 504 is converted into an audible sound by a speaker section 505. A printer section 506 is useful as the output terminal for a personal computer, a facsimile equipment, or a copying machine, to which the present invention is applied.

507 is an image reader section which inputs by reading original data photoelectrically, and is provided midway on the conveying path of original to read facsimile or copying original, and other various types of originals. 508 is a facsimile (FAX) transmission or reception section for transmitting original data read by the image reader section 507 with the facsimile or receiving and decoding facsimile signals that are transmitted, having an interface facility with the outside. 509 is a telephone section, comprising various telephone features, such as ordinary telephone function or automatic answering telephone function.

510 is a memory section comprising a ROM for storing system programs, manager programs and other application programs, character fonts, and dictionary, as well as application programs loaded from the external storage device 512, document information, and a video RAM.

511 is a keyboard section for inputting document information or various commands.

512 is an external storage device, which is a storage medium consisting of the floppy disk or hard disk, is used to store document information, music or audio data, and user's application programs.

Figure 35:
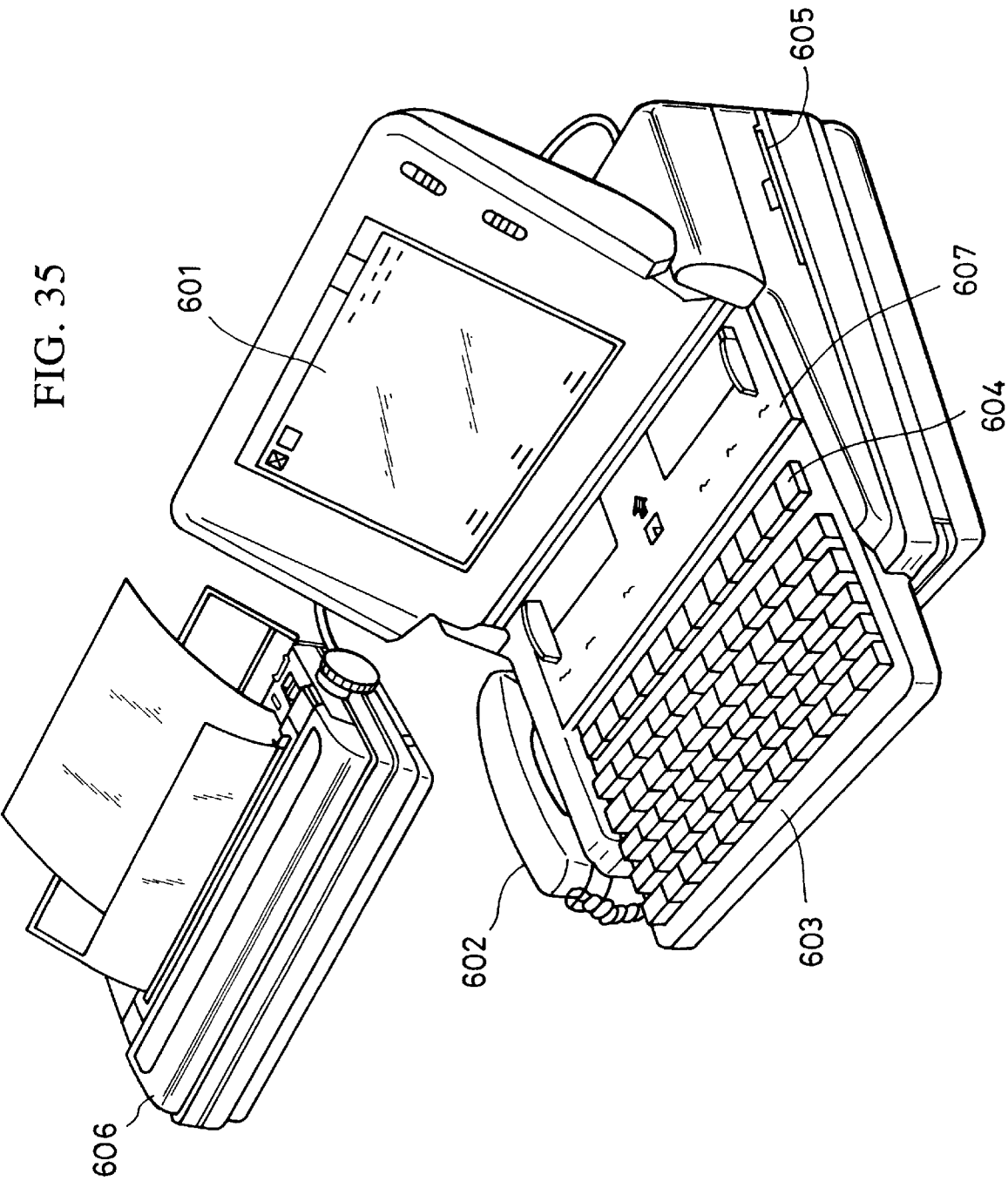
FIG. 35 is a schematic perspective view of one embodiment of an information processing apparatus shown in FIG. 34.

FIG. 35 is a typical appearance view of the information processing apparatus as shown in FIG. 34.

In the figure, 601 is a flat panel display, for displaying various menus, graphic data or documents. On this display 601 is installed the touch panel 503, which enables the entry of coordinates or item specifications by depressing a surface of the touch panel 503 with a finger or the like. 602 is a handset to be used when the apparatus functions as a telephone.

The keyboard 603 is detachably connected via a cord to the main body, and is used to input various documents or data. The keyboard 603 is also provided with various types of function keys 604. 605 is an opening for insertion of the floppy disk into the external storage device 512.

607 is a paper stack section for stacking papers to be read by the image reader section 507, in which a read paper is exhausted from the rear portion of device. In the facsimile reception, received data is recorded by the ink jet printer 607.

It should be noted that the display section 502 as above described may be CRT, but is preferably a flat panel of the liquid crystal display using a ferroelectric liquid crystal. This is because it can be more compact, thinner, and lighter.

When the above mentioned information processing unit functions as a personal computer or word processor, various information input from the keyboard 511 are processed according to a predetermined program in the control section 501, and output to the printer 506 as images.

When it functions as a receiver for the facsimile terminal equipment, the facsimile information input from the FAX transmission and reception section 508 via the transmission line are received and processed according to a predetermined program in the control section 501, and output to the printer section 506 as received images.

And when it functions as a copying machine, an original is read by the image reader section 507, and original data that was read is output via the control section 501 to the printer section 506 as copied image. Note that it functions as a transmitter for the facsimile terminal equipment, original data that was read by the image reader section 507 is processed for transmission according to a predetermined program in the control section 501, and transmitted via the FAX transmission and reception section 508 to the transmission line.

Figure 36:
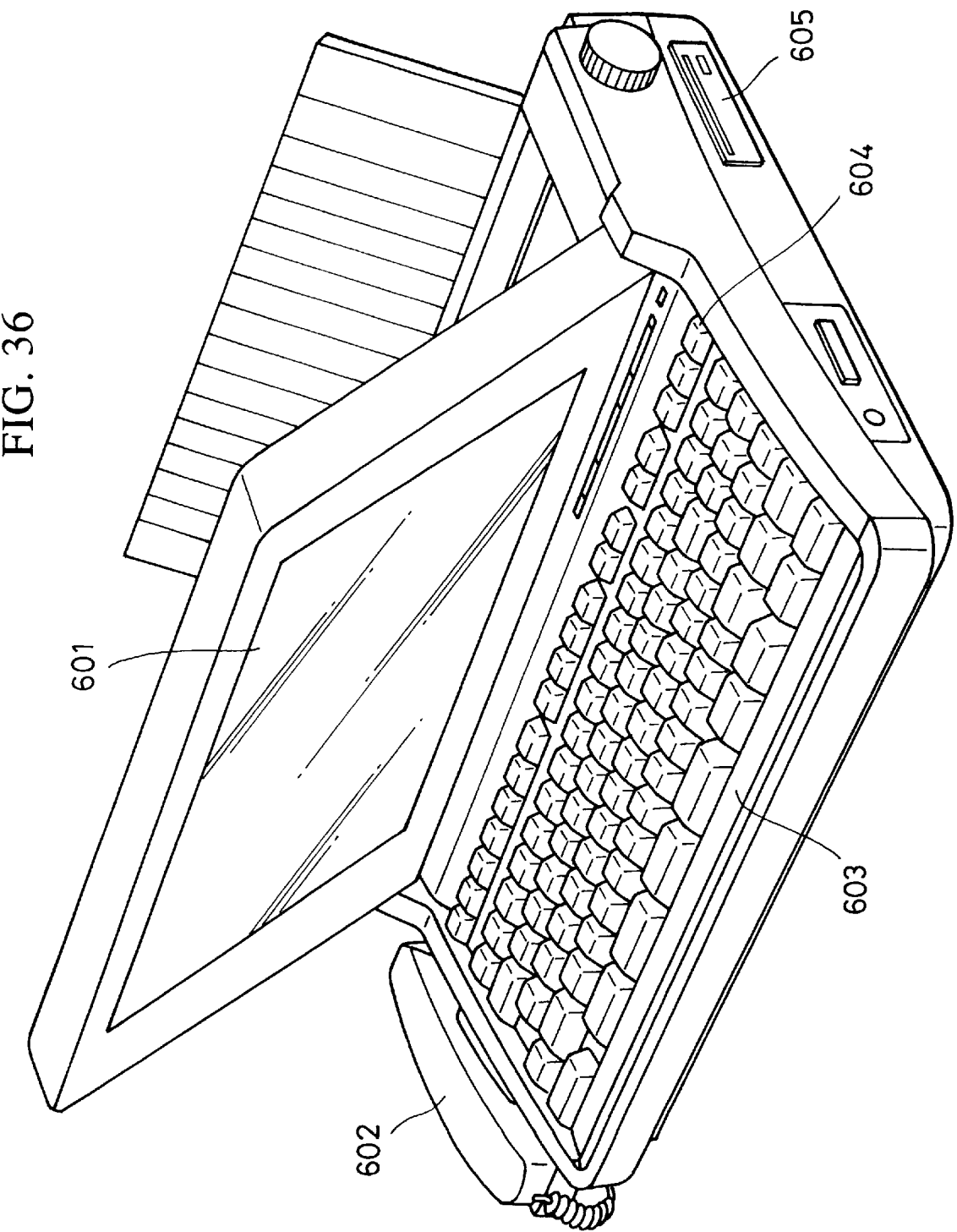
FIG. 36 is a schematic perspective view illustrating another embodiment of the information processing apparatus shown in FIG. 34.

It should be noted that the above mentioned information processing device can be an integral type containing an ink jet printer within the main body, as shown in FIG. 36, in which its portability can be enhanced. In the same figure, like reference numerals are affixed to parts having the same functions as those in FIG. 35.

As above described, if a recording apparatus according to the present invention is applied to the multifunction information processing device as above described, higher quality recording images can be obtained so that the functions of the information processing device can be further improved.

The individual components shown in outline or designated by blocks in the drawings are all well-known in the image processing and recording arts, and their specific instruction and operation are not critical to the operation or best mode for carrying out the invention.

While the invention has been described with reference to the structures disclosed herein, it is not confined to the details set forth and this application is intended to cover such modifications or changes as may come within the purposes of the improvements or the scope of the following claims.

What is claimed is:

1. An ink jet recording apparatus in which plural types of ink are discharged from a recording head onto a recording medium in accordance with record data so as to form record dots, thereby recording an image represented by image pixels formed by the record dots, said apparatus comprising:

boundary proximity degree detecting means for detecting a degree of positional proximity between a predetermined record dot to be formed by a predetermined type of ink and other record dots to be formed by different types of ink at a boundary between the predetermined record dot and the other record dots, the degree of positional proximity corresponding to a value obtained by adding weighted coefficients corresponding to record dots around the predetermined record dot, wherein a coefficient for each respective record dot is individually weighted in accordance with a distance between the predetermined record dot and the respective record dot such that the values of coefficients decrease with increasing distance between the predetermined record dot and the respective record dot;

substituting means for generating substitute record data corresponding to a substitute record dot to be formed with a different type of ink in accordance with the degree of positional proximity detected by said boundary proximity degree detecting means, and for substituting predetermined record data corresponding to the predetermined record dot to be formed with the predetermined type of ink with the substitute record data; and recording means for recording the image by driving said recording head based on the substitute record data.

2. An ink jet recording apparatus according to claim 1, wherein said boundary proximity degree detecting means sets a weight coefficient on each of the image pixels contained in a pixel region n×m, wherein n≧1 and m≧1, defined around a given image pixel, and counts, while performing correction based on the weight coefficients set on the image pixels, the pixels corresponding to record dots to be formed by the different type of ink in the pixel region, thereby detecting the degree of positional proximity of the image pixels corresponding to record dots to be formed by the different ink with respect to the given pixel.

3. An ink jet recording apparatus according to claim 2, wherein said substituting means ranks the image pixels corresponding to record dots to be formed with a given color ink into at least two ranks according to the degree of positional proximity, and performs the substitution separately for each of the ranks so as to substitute the image pixels corresponding to record dots of the given color with substitute pixels corresponding to record dots of a different color ink at a proportion which is predetermined for each of the ranks.

4. An ink jet recording apparatus according to claim 3, further comprising:

a plurality of substitution mask patterns prepared for each of the colors of image pixels which are to be subjected to the substitution performed by said substituting means, the number of the mask patterns being at least equal to the number of the ranks;

logical product means for determining the logical product of the substitution mask pattern of a given ink data for each of the ranks and dot substitution positions; and logical sum means for determining the logical sum of the logical products of the dot substitution positions obtained for the at least two ranks.

5. An ink jet recording apparatus according to claim 1, wherein said boundary proximity degree detecting means sets, for each of the different types of ink, a weight coefficient on each of image pixels contained in a pixel region n×m, wherein n≧1 and m≧1, defined around a given pixel, and counts, while performing correction based on the weight coefficients set on the image pixels, the image pixels corresponding to record dots to be formed by each of the different types of ink in the pixel region, thereby detecting the degree of positional proximity of the image pixels corresponding to the record dots to be formed by each different type of ink with respect to the given pixel, said boundary proximity degree detecting means further determines the sum of the positional proximity degrees obtained for the plurality of types of ink, thereby determining the positional proximity degrees of the plurality of types of ink with respect to the given pixel.

6. An ink jet recording apparatus according to claim 1, further comprising data receiving means for receiving binary record data indicative of presence or absence of record signals representing each of the image pixels, wherein said boundary proximity degree detecting means and said substituting means perform the detection and the substitution on the binary record data received by said data receiving means.

7. An ink jet recording apparatus according to claim 1, further comprising ranking means for ranking ink pixel data into a plurality of ranks based on the positional proximity degree and pixel position detecting means for detecting positions of image pixels for the ink pixel data of each rank, said substituting means performing the substitution of the image pixels by using a mask pattern of a predetermined area proportion only when said position detecting means has detected an image pixel position.

8. An ink jet recording apparatus according to claim 7, wherein said boundary proximity degree detecting means sets a weight coefficient on each of image pixels contained in a pixel region n×m, wherein n≧1 and m≧1, defined around a given image pixel, divides the pixel region into at least two sub-regions, and counts, while performing correction based on the weight coefficients set on the image pixels, the image pixels corresponding to the record dots to be formed by the different type of ink in each sub-region, thereby detecting the degree of positional proximity of the image pixels corresponding to the record dots to be formed by the different ink with respect to the given image pixel.

9. An ink jet recording apparatus according to claim 8, wherein said boundary proximity degree detecting means determines, as the degree of positional proximity with respect to the given pixel, the greatest of the boundary proximity degrees obtained for the at least two sub-regions.

10. An ink jet recording apparatus according to claim 8, wherein said boundary proximity degree detecting means determines, as the degree of positional proximity with respect to the given pixel, the difference between the greatest and the smallest of the boundary proximity degrees obtained for the at least two sub-regions.

11. An ink jet recording apparatus according to claim 1, further comprising akin ink dot proximity degree detecting means for detecting the degree of positional proximity between image pixels corresponding to record dots to be formed by the same type of ink, wherein said substituting means performs the substitution of the substitute image pixels to be formed with record dots of the different ink based on both the degree of positional proximity between image pixels corresponding to record dots of different types of ink detected by said boundary proximity degree detecting means and the degree of positional proximity between image pixels corresponding to record dots of the same type of ink detected by said akin ink dot proximity degree detecting means.

12. An ink jet recording apparatus according to claim 11, wherein said akin ink dot proximity degree detecting means counts, within a pixel region n×m, wherein $n \geq 1$ and $m \geq 1$, defined around a given image pixel, the image pixels corresponding to record dots to be formed of the same type of ink as a record dot for the given image pixel, thereby detecting the degree of positional proximity of image pixels to be formed as record dots of the same type of ink with respect to a record dot for the given image pixel.

13. An ink jet recording apparatus according to claim 11, wherein said substituting means performs the substitution in accordance with the degree of positional proximity of image pixels to be formed as record dots of the same type of ink determined by said akin ink dot proximity degree detecting means.

14. An ink jet recording apparatus according to claim 1, further comprising said recording head, wherein said recording head discharges inks utilizing heat.

15. An ink jet recording apparatus according to claim 1, further comprising mounting means, wherein said recording head is interchangeably mounted on said mounting means.

16. An ink jet recording apparatus according to claim 1, further comprising a carriage for carrying said recording head.

17. An ink jet recording apparatus according to claim 1, further comprising conveying means for conveying a recording medium on which recording is to be performed by said recording head.

18. An ink jet recording apparatus according to claim 1, wherein said recording apparatus is incorporated in a copying apparatus.

19. An ink jet recording apparatus according to claim 1, wherein said recording apparatus is incorporated in a facsimile apparatus.

20. An ink jet recording apparatus according to claim 1, wherein said recording apparatus is incorporated in a computer terminal.

21. An ink jet recording method in which plural types of ink are discharged from a recording head onto a recording medium so as to form record dots in accordance with record data, thereby recording an image represented by image pixels, said method comprising the steps of:

detecting a degree of positional proximity between a predetermined record dot to be formed by a predetermined type of ink and other record dots to be formed by different types of ink at a boundary between the predetermined record dot and the other record dots, the degree of positional proximity corresponding to a value obtained by adding weighted coefficients corresponding to record dots around the predetermined record dot, wherein a coefficient for each respective record dot is individually weighted in accordance with a distance between the predetermined record dot and the respective record dot such that the values of the coefficients decrease with increasing distance between the predetermined record dot and the respective record dot;

generating substitute record data corresponding to a substitute record dot to be formed with a different type of ink in accordance with the detected degree of positional proximity and substituting predetermined record data corresponding to the predetermined record dot to be formed with the predetermined type of ink with the substitute record data; and discharging inks in accordance with the predetermined record data and the substitute record data after said step of substituting.

22. An ink jet recording method according to claim 21, wherein the step of detecting the positional proximity degree includes setting a weight coefficient on each of the image pixels contained in a pixel region n×m, wherein $n \geq 1$ and $m \geq 1$, defined around a given pixel, and counting, while performing correction based on the weight coefficients set on the image pixels, the pixels corresponding to record dots to be formed by the different type of ink in the pixel region, thereby detecting the degree of positional proximity of the image pixels corresponding to the record dots to be formed by the different ink with respect to the given pixel.

23. An ink jet recording method according to claim 22, wherein said substituting step includes ranking the image pixels corresponding to record dots to be formed with a given color ink into at least two ranks according to the degree of positional proximity, and performing the substitution separately for each of the ranks so as to substitute the image pixels corresponding to the record dots of the given color with substitute pixels corresponding to record dots of a different color ink at a proportion which is predetermined for each of the ranks.

24. An ink jet recording method according to claim 21, wherein said step of detecting the positional proximity degree includes setting, for each of the different types of ink, a weight coefficient on each of image pixels contained in a pixel region n×m, wherein $n \geq 1$ and $m \geq 1$, defined around a given pixel, and counting, while performing correction based on the weight coefficients set on the image pixels, the image pixels corresponding to the record dots to be formed by each of different types of ink in the pixel region, thereby detecting the degree of positional proximity of the image pixels corresponding to the record dots to be formed by each different type of ink with respect to the given pixel; and determining the sum of the positional proximity degrees obtained for the plurality of types of ink, thereby determining the positional proximity degrees of the plurality of types of ink with respect to the given pixel.

25. An ink jet recording method according to claim 21, further comprising the step of receiving binary record data indicative of presence or absence of record signals representing each of the image pixels, wherein said boundary proximity degree detecting step and said substituting step perform the detection and the substitution on the binary record data received in said data receiving step.

26. An ink jet recording method according to claim 21, further comprising the steps of ranking ink pixel data into a plurality of ranks based on the positional proximity degree, and detecting positions of image pixels for the ink pixel data of each rank, said substituting step performing the substitution of the image pixels by using a mask pattern of a predetermined area proportion only when presence of an image pixel is detected in said detecting step.

27. An ink jet recording method according to claim 26, wherein said step of detecting the positional proximity degree includes setting a weight coefficient on each of image pixels contained in a pixel region n×m, wherein n≧1 and m≧1, defined around a given image pixel, dividing the pixel region into at least two sub-regions, and counting, while performing correction based on the weight coefficients set on the image pixels, image pixels of the record dots to be formed by the different type of ink in each sub-region, thereby detecting the degree of positional proximity of the image pixels corresponding to the record dots to be formed by the different type of ink with respect to the given pixel.

28. An ink jet recording method according to claim 27, wherein said step of detecting the positional proximity degree includes determining, as the degree of positional proximity with respect to the given pixel, the greatest of the boundary proximity degrees obtained for the at least two sub-regions.

29. An ink jet recording method according to claim 27, wherein said step of detecting the positional proximity degree includes determining, as the degree of positional proximity with respect to the given pixel, the difference between the greatest and the smallest of the boundary proximity degrees obtained for the at least two sub-regions.

30. An ink jet recording method according to claim 21, further comprising the step of detecting the degree of positional proximity between record pixels to be formed as record dots of the same type of ink, wherein said substituting step performs the substitution of the record pixels with pixels indicating record dots of the different type of ink based on both the degree of positional proximity between record pixels to be formed as record dots of the different types of ink detected in said step of detecting boundary proximity degree and the degree of positional proximity between record dots of the same type of ink detected in said step of detecting the degree of positional proximity between record dots of the same type of ink.

31. An ink jet recording method according to claim 30, wherein said step of detecting the degree of positional proximity between record pixels to be formed as record dots of the same type of ink includes counting, within a pixel region n×m, wherein n≧1 and m≧1, defined around a given pixel, the record pixels to be formed as record dots of the same type of ink as a record dot indicated by the given pixel, thereby detecting the degree of positional proximity of the record pixels to be formed as the record dots of the same type of ink with respect to the given pixel.

32. An ink jet recording method according to claim 30, wherein said substituting step performs substitution with the different type of ink in accordance with the degree of positional proximity of record pixels to be formed as dots of the same type of ink.

33. A record data processing method for recording an image based on image pixels by forming corresponding record dots with plural types of ink discharged from a recording head in accordance with record data, said method comprising the steps of:

detecting a degree of positional proximity between a predetermined record dot to be formed by a predetermined type of ink and other record dots to be formed by different types of ink at a boundary between the predetermined record dot and the other record dots, the degree of positional proximity corresponding to a value obtained by adding weighted coefficients corresponding to record dots around the predetermined record dot, wherein a coefficient for each respective record dot is individually weighted in accordance with a distance between the predetermined record dot and the respective record dot such that the values of coefficients decrease with increasing distance between the predetermined record dot and the respective record dot; and generating substitute record data corresponding to a substitute record dot to be formed with a different type of ink in accordance with the detected degree of positional proximity, and substituting predetermined record data corresponding to the predetermined record dot to be formed with the predetermined type of ink with the substitute record data.

34. A record data processing method according to claim 33, wherein the step of detecting the boundary proximity degree includes setting a weight coefficient on each of image pixels contained in a pixel region n×m, wherein n≧1 and m≧1, defined around a given image pixel, and counting, while performing correction based on the weight coefficients set on the image pixels, the image pixels corresponding to record dots to be formed by the different type of ink in the pixel region, thereby detecting the degree of positional proximity of the image pixels corresponding to the record dots to be formed by the different type of ink with respect to the given image pixel.

35. A record data processing method according to claim 34, wherein said substituting step includes ranking the image pixels of a given color into at least two ranks according to the degree of positional proximity, and performing the substitution separately for each of the ranks so as to substitute the image pixels of the given color with substitute image pixels representing record dots to be from a different type of ink at a proportion which is predetermined for each of the ranks.

36. A record data processing method according to claim 33, wherein said step of detecting the positional proximity degree includes setting, for each of the plural types of ink, a weight coefficient on each of the image pixels contained in a pixel region n×m, wherein n≧1 and m≧1, defined around a given image pixel, and counting, while performing correction based on the weight coefficients set on the image pixels, image pixels corresponding to the record dots formed by each type of ink in the pixel region, thereby detecting the degree of positional proximity of the image pixels corresponding to the record dots to be formed by each of the types of ink with respect to the given image pixel, and determining the sum of the positional proximity degrees obtained for the plurality of types of ink, thereby determining the positional proximity degrees of the plurality of types of ink with respect to the given image pixel.

37. A record data processing method according to claim 33, further comprising the steps of ranking image pixel data into a plurality of ranks based on the boundary proximity degree, and detecting positions of image pixels for the image pixel data of each rank, wherein said substituting step performs the substitution of the image pixels by using a mask pattern of a predetermined area proportion only when presence of an image pixel is detected in said detecting step.

38. A record data processing method according to claim 37, wherein said step of detecting the positional proximity degree includes setting a weight coefficient on each of the image pixels contained in a pixel region n×m, wherein n≧1 and m≧1, defined around a given image pixel, dividing the pixel region into at least two sub-regions, and counting, while performing correction based on the weight coefficients set on the image pixels, the record dots to be formed by a different type of ink in each sub-region, thereby detecting the degree of positional proximity of the image pixels corresponding to the record dots to be formed by the different ink with respect to the given image pixel.

39. A record data processing method according to claim 38, wherein said step of detecting the positional proximity degree includes determining, as the degree of positional proximity with respect to the given image pixel, the greatest of the positional proximity degrees obtained for the at least two sub-regions.

40. A record data processing method according to claim 38, wherein said step of detecting the positional proximity degree includes determining, as the degree of positional proximity with respect to the given image pixel, the difference between the greatest and the smallest of the positional proximity degrees obtained for the at least two sub-regions.

41. A record data processing method according to claim 33, further comprising the step of detecting the degree of positional proximity between image pixels corresponding to record dots to be formed of the same type of ink, wherein said substituting step performs the substitution of the image pixels with substitute image pixels corresponding to record dots of the different ink based on both the degree of positional proximity between image pixels corresponding to record dots of different types of ink detected in said step of detecting the positional proximity degree and the degree of positional proximity between image pixels corresponding to record dots of the same type of ink detected in said step of detecting the degree of positional proximity between image pixels corresponding to record dots of the same type of ink.

42. A record data processing method according to claim 41, wherein said step of detecting the degree of positional proximity between image pixels corresponding to record dots of the same type of ink includes counting, within a pixel region n×m, wherein n≧1 and m≧1, defined around a given image pixel, image pixels corresponding to the record dots of the same type of ink as a record dot corresponding to the given image pixel, thereby detecting the degree of positional proximity of image pixels corresponding to the record dots of the same type of ink with respect to the record dot corresponding to the given image pixel.

43. A record data processing method according to claim 41, wherein said substituting step effects substitution with the different type of ink in accordance with the degree of positional proximity of image pixels corresponding to dots of the same type of ink.

44. An ink jet recording apparatus which records an image represented by image pixels by discharging a plurality of types of inks of different colors from a recording head, said recording apparatus comprising:
 boundary detecting means for performing a detecting operation for detecting a degree of positional proximity between image pixels corresponding to record pixels to be formed by inks of different colors, said boundary detecting means repeating the detecting operation a plurality of times under a corresponding number of different detecting conditions; and
 boundary converting means for substituting an ink for forming record pixels corresponding to the image pixels with an ink of a different color, in accordance with a result of the detecting operation repeatedly performed by said boundary detecting means.

45. An ink jet recording apparatus according to claim 44, wherein said boundary converting means performs substitution of a black ink for forming a black record pixel with an ink of a different color.

46. An ink jet recording apparatus according to claim 44, wherein said boundary detecting means detects the degree of positional proximity over different detection areas for a given original image region.

47. An ink jet recording apparatus according to claim 46, wherein said boundary converting means performs substitution of an ink for forming a record pixel with the ink of a different color at conversion ratios corresponding to sizes of the detection areas.

48. An ink jet recording apparatus according to claim 46, wherein said boundary converting means performs substitution of an ink for forming a record pixel with the ink of a different color by applying a relatively larger conversion ratio to a boundary zone detected by said boundary detecting means through detection over a narrower detection area than a conversion ratio applied to a boundary zone detected through detection over a wider detection area.

49. An ink jet recording apparatus according to claim 46, wherein said boundary converting means performs substitution of an ink for forming a record pixel with the ink of a different color by applying a relatively smaller conversion ratio to a boundary zone detected by said boundary detecting means through detection over a narrower detection area than a conversion ratio applied to a boundary zone detected through detection over a wider detection area.

50. An ink jet recording apparatus according to claim 49, wherein said boundary converting means performs substitution of an ink for forming a record pixel with the ink of a different color by employing a relatively smaller boundary conversion mask to the boundary zone detected by said boundary detecting means through detection over the narrower detection area than a boundary conversion mask employed to the boundary zone detected through detection over the wider detection area.

51. An ink jet recording apparatus according to claim 44, wherein said boundary converting means employs a plurality of boundary converting conditions and selectively uses the plurality of converting conditions based on conditions necessary for eliminating factors which cause bleeding of inks at a boundary.

52. An ink jet recording apparatus according to claim 44, further comprising said recording head, wherein said recording head discharges ink by utilizing heat.

53. An ink jet recording apparatus according to claim 44, further comprising mounting means, wherein said recording head is interchangeably mounted on said mounting means.

54. An ink jet recording apparatus according to claim 44, further comprising a carriage for carrying said recording head.

55. An ink jet recording apparatus according to claim 44, further comprising conveying means for conveying a recording medium on which recording is to be performed by said recording head.

56. An ink jet recording apparatus according to claim 44, wherein said recording apparatus is incorporated in a copying apparatus.

57. An ink jet recording apparatus according to claim 44, wherein said recording apparatus is incorporated in a facsimile apparatus.

58. An ink jet recording apparatus according to claim 44, wherein said recording apparatus is incorporated in a computer terminal.

59. An ink jet recording method in which an image represented by image pixels is recorded by a plurality of types of inks of different colors discharged from a recording head, said recording method comprising the steps of:
 performing a detecting operation for detecting a degree of positional proximity between image pixels corresponding to record pixels to be formed by inks of different colors, and repeating the detection operation a plurality of times under a corresponding number of different detecting conditions,
 substituting an ink for forming record pixels corresponding to the image pixels with an ink of a different color, in accordance with a result of the detecting operation repeatedly performed in the detecting operation performing step; and
 discharging inks in accordance with the substitution performed in the substituting step.

60. An ink jet recording method according to claim 59, wherein said substituting step performs substitution of a black ink for forming a black record pixel with an ink of a different color.

61. An ink jet recording method according to claim 59, wherein said detecting step detects the degree of positional proximity over different detection areas for a given original image region.

62. An ink jet recording method according to claim 61, wherein said substituting step performs substitution of an ink for forming a record pixel with the ink of a different color, at conversion ratios corresponding to sizes of the detection areas.

63. An ink jet recording method according to claim 61, wherein said substituting step performs substitution of an ink for forming a record pixel with ink of a different color by applying a relatively larger conversion ratio to a boundary zone detected through detection over a narrower detection area than a conversion ratio applied to a boundary zone detected through detection over a wider detection area.

64. An ink jet recording method according to claim 61, wherein said substituting step performs substitution of an ink for forming a record pixel with the ink of a different color by applying a relatively smaller conversion ratio to a boundary zone detected through detection over a narrower detection area than a conversion ratio applied to a boundary zone detected through detection over a wider detection area.

65. An ink jet recording method according to claim 64, wherein said boundary converting means performs substitution of an ink for forming a record pixel with the ink of a different color by employing a relatively smaller boundary conversion mask to the boundary zone detected through detection over the narrower detection area than a boundary conversion mask employed to the boundary zone detected through detection over the wider detection area.

66. An ink jet recording method according to claim 59, wherein said substituting step employs a plurality of boundary converting conditions and selectively uses the plurality of converting conditions based on conditions necessary for eliminating factors which cause bleeding of inks at a boundary.

67. A record data processing method for recording an image based on image pixels with a plurality of types of inks of different colors discharged from a recording head, said processing method comprising the steps of:

performing a detecting operation for detecting a degree of positional proximity between image pixels corresponding to record pixels to be formed by inks of different colors, and repeating the detecting operation a plurality of times under a corresponding number of different detecting conditions; and substituting image pixels corresponding to record pixels to be formed by ink of one color with substitute pixels corresponding to record pixels to be formed by ink of a different color, in accordance with a result of the detecting operation repeatedly performed in the detecting operation performing step.

68. A record data processing method according to claim 67, wherein said substituting step performs substitution of a black image pixel corresponding to a black record pixel to be formed with a black ink with a substitute pixel corresponding to a record pixel to be formed by an ink of a different color.

69. A record data processing method according to claim 67, wherein said detecting step detects the degree of positional proximity over different detection areas for a given original image region.

70. A record data processing method according to claim 69, wherein said substituting step performs substitution of the substitute pixel for forming a record pixel with the ink of a different color at conversion ratios corresponding to sizes of the detection areas.

71. A record data processing method according to claim 69, wherein said substituting step performs substitution of the substitute pixel for forming a record pixel with the ink of a different color by applying a relatively larger conversion ratio to a boundary zone detected through detection over a narrower detection area than a conversion ratio applied to a boundary zone detected through detection over a wider detection area.

72. A record data processing method according to claim 69, wherein said substituting step performs substitution of the substitute pixel for forming a record pixel with the ink of a different color by applying a relatively smaller conversion ratio to a boundary zone detected through detection over a narrower detection area than a conversion ratio applied to a boundary zone detected through detection over a wider detection area.

73. A record data processing method according to claim 72, wherein said boundary converting means performs substitution of the substitute pixel for forming a record pixel with the ink of a different color by employing a relatively smaller boundary conversion mask to the boundary zone detected through detection over the narrower detection area than a boundary conversion mask employed to the boundary zone detected through detection over the wider detection area.

74. A record data processing method according to claim 67, wherein said substituting step employs a plurality of boundary converting conditions and selectively uses the plurality of converting conditions based on conditions necessary for eliminating factors which cause bleeding of inks at a boundary.

75. An ink jet recording apparatus in which plural types of ink are discharged from a recording head onto a recording medium in accordance with record data so as to form image pixels, thereby recording an image represented by the image pixels, said apparatus comprising:

boundary proximity degree detecting means for detecting a degree of positional proximity between a predetermined image pixel to be formed by a predetermined type of ink and other image pixels to be formed by different types of ink at a boundary between the predetermined image pixel and the other image pixels, the degree of positional proximity corresponding to a value obtained by adding weighted coefficients corresponding to image pixels around the predetermined image pixel, wherein a coefficient for each respective image pixel is individually weighted in accordance with a distance between the predetermined image pixel and the respective image pixel such that the values of coefficients decrease with increasing distance between the predetermined image pixel and the respective image pixel;

substituting means for generating substitute record data corresponding to a substitute image pixel to be formed with a different type of ink in accordance with the degree of positional proximity detected by said boundary proximity degree detecting means, and for substituting predetermined record data corresponding to the predetermined image pixel to be formed with the predetermined type of ink with the substitute record data; and recording means for recording the image by driving the recording head based on the substitute record data.

* * * * *

UNITED STATES PATENT AND TRADEMARK OFFICE
CERTIFICATE OF CORRECTION

PATENT NO. : 5,975,678
DATED : November 2, 1999
INVENTOR(S) : Kanematsu et al.

Page 1 of 2

It is certified that error appears in the above-identified patent and that said Letters Patent is hereby corrected as shown below:

[56] TITLE Page, item
  U.S. PATENT DOCUMENTS, Line 4, "Avata et al." should read
--Ayata et al.--, and the following should be inserted
--4,953,015  8/1990  Hayasaki et al. . . . . . . . 358/5--
--5,428,377  6/1995  Stoffel et al. . . . . . . . . . 347--
--5,550,569  8/1996  Wright . . . . . . . . . . . . 347--.

FOREIGN PATENT DOCUMENTS, the following should be inserted
--0 595 657  5/1994  European Pat. Off.--.

COLUMN 3:
  Line 58, "FIG." should read --FIGS.--.

COLUMN 8:
  Line 37, "tenth." should read --tenth embodiment;--.

COLUMN 19:
  Line 10, "is" should read --are--.

COLUMN 25:
  Line 47, "dots ." should read --dots.--.

COLUMN 31:
  Line 17, "e" should read --be--.
  Line 19, "such," should read --such--.

UNITED STATES PATENT AND TRADEMARK OFFICE
CERTIFICATE OF CORRECTION

PATENT NO. : 5,975,678
DATED : November 2, 1999
INVENTOR(S) : Kanematsu et al.

It is certified that error appears in the above-identified patent and that said Letters Patent is hereby corrected as shown below:

<u>COLUMN 38</u>:
  Line 27, "be" should read --be formed--.

Signed and Sealed this

Fifth Day of December, 2000

*Attest:*

Q. TODD DICKINSON

*Attesting Officer*          *Director of Patents and Trademarks*